(12) United States Patent
Shinozaki et al.

(10) Patent No.: US 9,451,143 B2
(45) Date of Patent: Sep. 20, 2016

(54) IMAGE RECEPTION DEVICE, IMAGE CAPTURE DEVICE, IMAGE CAPTURE SYSTEM, IMAGE RECEPTION METHOD, AND NON-TRANSITORY MEDIUM SAVING PROGRAM

(71) Applicant: Olympus Corporation, Hachioji-shi, Tokyo (JP)

(72) Inventors: Arata Shinozaki, Tokyo (JP); Kensuke Ishii, Tokyo (JP); Saori Matsumoto, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/701,047

(22) Filed: Apr. 30, 2015

(65) Prior Publication Data
US 2015/0237250 A1 Aug. 20, 2015

Related U.S. Application Data

(63) Continuation of application No. PCT/JP2014/076788, filed on Oct. 7, 2014.

(30) Foreign Application Priority Data

Dec. 13, 2013 (JP) .................. 2013-258563

(51) Int. Cl.
*H04N 5/232* (2006.01)
*H04N 1/21* (2006.01)

(52) U.S. Cl.
CPC ........ *H04N 5/23203* (2013.01); *H04N 1/2112* (2013.01); *H04N 5/23245* (2013.01); *H04N 5/23293* (2013.01)

(58) Field of Classification Search
CPC ............. H04N 5/23203; H04N 5/23245; H04N 5/23293; H04N 1/2112
USPC ............... 348/333.01, 333.07, 222.1, 211.1, 348/211.2, 375, 207.11
See application file for complete search history.

(56) References Cited

U.S. PATENT DOCUMENTS

| | | | | |
|---|---|---|---|---|
| 6,052,509 A * | 4/2000 | Abe | ........... | H04N 5/232 386/230 |
| 7,961,217 B2 * | 6/2011 | Yamagishi | ......... | H04N 5/23241 348/211.2 |

(Continued)

FOREIGN PATENT DOCUMENTS

| | | |
|---|---|---|
| EP | 2624464 | 8/2013 |
| JP | 2005-099531 | 4/2005 |

(Continued)

OTHER PUBLICATIONS

Written Opinion of the International Searching Authority (PCT/ISA/237) (3 pgs.) for PCT/JP2014/076788 mailed Jan. 6, 2015 (3 pgs.), with translation ( 3 pgs.).

(Continued)

*Primary Examiner* — Nhan T Tran
(74) *Attorney, Agent, or Firm* — John C. Pokotylo; Straub & Pokotylo

(57) ABSTRACT

An image reception device includes a storage module that associates and stores first identification information which is used for identifying an image capture device or a lens module and second identification information which is used for visually identifying establishment of communication connection between the image capture device and the image reception device; an information acquisition unit that acquires the first identification information from the image capture device; a second communication module that transmits, to the image capture device, first control information which instructs the first display interface to display first information after the communication connection with the image capture device is established and receives image data from the image capture device; and an information output unit that outputs second control information which instructs a second display interface to display second information to the second display interface after the communication connection with the image capture device is established.

24 Claims, 31 Drawing Sheets

(56) References Cited

U.S. PATENT DOCUMENTS

| | | | | |
|---|---|---|---|---|
| 8,036,469 | B2* | 10/2011 | Shiomi | H04N 5/23209 348/211.2 |
| 8,704,944 | B1* | 4/2014 | Wierzoch | H04N 5/23203 348/207.99 |
| 2006/0159447 | A1* | 7/2006 | Watanabe | H04N 5/232 396/529 |
| 2007/0147815 | A1* | 6/2007 | Tanaka | H04N 5/23209 348/211.2 |
| 2012/0301099 | A1 | 11/2012 | Hirano | |
| 2013/0141640 | A1* | 6/2013 | Kim | H04N 5/23245 348/375 |

FOREIGN PATENT DOCUMENTS

| JP | 2005-151601 | 6/2005 |
|---|---|---|
| JP | 2007-116474 | 5/2007 |
| JP | 2007-243986 | 9/2007 |
| JP | 2012-100108 | 5/2012 |

OTHER PUBLICATIONS

International Search Report to PCT/JP2014/076788 (2 pgs.), with translation (1 pg.), Jan. 6, 2015.

Notification of Transmittal of International Search Report (ISR) and the Written Opinion of the International Searching Authority (ISA) (PCT/ISA/220) (2 pgs.), ISR (PCT/ISA/210) (3 pgs.) and Written Opinion of the ISA (PCT/ISA/237) (3 pgs.) for PCT/JP2014/076788, Jan. 6, 2015.

\* cited by examiner

| FIRST IDENTIFICATION INFORMATION (IDENTIFICATION INFORMATION OF IMAGE CAPTURE DEVICE) | SECOND IDENTIFICATION INFORMATION (COLOR INFORMATION OF RGB) |
|---|---|
| AP-1111 | 0xff0000 |
| AP-2222 | 0x00ff00 |
| AP-3333 | 0x0000ff |

| FIRST IDENTIFICATION INFORMATION (IDENTIFICATION INFORMATION OF IMAGE CAPTURE DEVICE) | SECOND IDENTIFICATION INFORMATION (IMAGE INFORMATION) |
|---|---|
| AP-1111 | IMAGE DATA 1 |
| AP-2222 | IMAGE DATA 2 |
| AP-3333 | IMAGE DATA 3 |

| FIRST IDENTIFICATION INFORMATION (IDENTIFICATION INFORMATION OF IMAGE CAPTURE DEVICE) | SECOND IDENTIFICATION INFORMATION (PATTERN INFORMATION) |
|---|---|
| AP-1111 | DISPLAY PERIOD OF ONE SECOND, NON-DISPLAY PERIOD OF ONE SECOND |
| AP-2222 | DISPLAY PERIOD OF TWO SECONDS, NON-DISPLAY PERIOD OF TWO SECONDS |

| FIRST IDENTIFICATION INFORMATION (IDENTIFICATION INFORMATION OF LENS MODULE) | SECOND IDENTIFICATION INFORMATION (IMAGE INFORMATION) |
|---|---|
| LENS MODULE 1 | IMAGE DATA 1 |
| LENS MODULE 2 | IMAGE DATA 2 |
| LENS MODULE 3 | IMAGE DATA 3 |

FIG. 17A

| FIRST IDENTIFICATION INFORMATION || SECOND IDENTIFICATION INFORMATION (IMAGE INFORMATION) |
|---|---|---|
| IDENTIFICATION INFORMATION OF IMAGE CAPTURE DEVICE | IDENTIFICATION INFORMATION OF LENS MODULE | |
| AP-1111 | LENS MODULE 1 | IMAGE DATA 1 |
| AP-2222 | LENS MODULE 2 | IMAGE DATA 2 |
| AP-3333 | LENS MODULE 3 | IMAGE DATA 3 |

FIG. 17B

| FIRST IDENTIFICATION INFORMATION || SECOND IDENTIFICATION INFORMATION (IMAGE INFORMATION) |
|---|---|---|
| IDENTIFICATION INFORMATION OF IMAGE CAPTURE DEVICE | IDENTIFICATION INFORMATION OF LENS MODULE | |
| AP-1111 | LENS MODULE 1 | IMAGE DATA 1 |
| AP-1111 | LENS MODULE 2 | IMAGE DATA 2 |
| AP-1111 | LENS MODULE 3 | IMAGE DATA 3 |

FIG. 17C

| FIRST IDENTIFICATION INFORMATION || SECOND IDENTIFICATION INFORMATION (IMAGE INFORMATION) |
|---|---|---|
| IDENTIFICATION INFORMATION OF IMAGE CAPTURE DEVICE | IDENTIFICATION INFORMATION OF LENS MODULE | |
| AP-1111 | LENS MODULE 1 | IMAGE DATA 1 |
| AP-2222 | LENS MODULE 1 | IMAGE DATA 2 |
| AP-3333 | LENS MODULE 1 | IMAGE DATA 3 |

FIG. 19A

| FIRST IDENTIFICATION INFORMATION (IDENTIFICATION INFORMATION OF IMAGE CAPTURE DEVICE) | OPERATION MODE OF IMAGE CAPTURE DEVICE | SECOND IDENTIFICATION INFORMATION | |
|---|---|---|---|
| | | COLOR INFORMATION OF RGB | PATTERN INFORMATION |
| AP-1111 | CAPTURE MODE | 0xff0000 | BLINKING |
| AP-1111 | VIEW MODE | 0xff0000 | LIGHTING |
| AP-2222 | CAPTURE MODE | 0x00ff00 | BLINKING |
| AP-2222 | VIEW MODE | 0x00ff00 | LIGHTING |

FIG. 19B

| FIRST IDENTIFICATION INFORMATION (IDENTIFICATION INFORMATION OF IMAGE CAPTURE DEVICE) | OPERATION MODE OF IMAGE CAPTURE DEVICE | SECOND IDENTIFICATION INFORMATION | |
|---|---|---|---|
| | | COLOR INFORMATION OF RGB | PATTERN INFORMATION |
| AP-1111 | CAPTURE MODE | 0xff0000 | BLINKING |
| AP-1111 | VIEW MODE | 0x00ff00 | BLINKING |
| AP-2222 | CAPTURE MODE | 0xff0000 | LIGHTING |
| AP-2222 | VIEW MODE | 0x00ff00 | LIGHTING |

IMAGE RECEPTION DEVICE, IMAGE CAPTURE DEVICE, IMAGE CAPTURE SYSTEM, IMAGE RECEPTION METHOD, AND NON-TRANSITORY MEDIUM SAVING PROGRAM

BACKGROUND OF THE INVENTION

1. Field of the Invention

The present invention relates to a technique of allowing an image capture device to transmit image data and allowing an image reception device to receive the image data.

This application claims the benefit of priority based on Japanese Patent Application No. 2013-258563, filed Dec. 13, 2013 and is a continuation application based on International Patent Application PCT/JP2014/076788, filed Oct. 7, 2014, and the entire contents of both Japanese Application and PCT International Application are incorporated herein by reference.

2. Description of Related Art

A technique of allowing a video image captured by a camera to be displayed by another video image reception device other than the camera is disclosed in Japanese Patent Application Publication No. 2005-151601. In this technique, the video image reception device displays video images captured by a plurality of cameras together with camera identification information so that the correspondence between a camera and a video image reception device can be understood easily. The camera identification information is a camera name. Moreover, in this technique, the video image reception device displays the camera identification information (camera name) and video image reception device identification information (video image reception device name) together.

A technique of allowing the connection of an image display device such as a projector used for projection display to be checked easily is disclosed in Japanese Patent Application Publication No. 2005-99531. In this technique, the image display device generates identification information (for example, color information) automatically and displays the identification information. An image transmitting device such as a PC receives the identification information from the image display device and displays a list of identification information. The image transmitting device transmits image information to an image display device selected by a user.

In a system including a camera (image capture device) that connects to another device wirelessly and a terminal (image reception device) that receives image data from the camera, it is necessary to understand the correspondence between the camera and the terminal.

SUMMARY OF THE INVENTION

According to a first aspect of the present invention, an image reception device includes a storage module that associates and stores first identification information which is used for identifying an image capture device having an image capture module, a first display interface, and a first communication module, or a lens module electrically connected to the image capture device and second identification information which is used for visually identifying establishment of communication connection between the image capture device and the image reception device; an information acquisition unit that acquires the first identification information from the image capture device; a second communication module that transmits, to the image capture device, first control information which instructs the first display interface to display first information corresponding to the second identification information stored in the storage module and associated with the first identification information acquired by the information acquisition unit after the communication connection with the image capture device is established and receives image data from the image capture device; and an information output unit that outputs second control information which instructs a second display interface to display second information corresponding to the second identification information stored in the storage module and associated with the first identification information acquired by the information acquisition unit to the second display interface after the communication connection with the image capture device is established when the image reception device includes the second display interface or the second display interface is electrically connected to the image reception device.

According to a second aspect of the present invention, in the image reception device according to the first aspect, the image reception device may include the second display interface that displays the second information and an image based on the image data; or the image reception device may include a third display interface that displays an image based on the image data, and the second display interface is electrically connected to the image reception device, or the image reception device may include the second display interface and a third display interface that displays an image based on the image data.

According to a third aspect of the present invention, in the image reception device according to the first aspect, the second communication module may transmit the first control information to the image capture device after the communication connection with the image capture device is established and before the communication connection with the image capture device expires. The information output unit may output the second control information to the second display interface after the communication connection with the image capture device is established and before the communication connection with the image capture device expires.

According to a fourth aspect of the present invention, in the image reception device according to the first aspect, the storage module may associate and store the first identification information which is used for identifying a combination the image capture device and the lens module electrically connected to the image capture device and the second identification information.

According to a fifth aspect of the present invention, in the image reception device according to the first aspect, the image capture device may include a plurality of operation modes. The storage module may store the second identification information for each operation mode of the image capture device. The second communication module may transmit, to the image capture device, the first control information which instructs the first display interface to display the first information according to the operation mode of the image capture device. The information output unit may output, to the second display interface, the second control information which instructs the second display interface to display the second information according to the operation mode of the image capture device.

According to a sixth aspect of the present invention, in the image reception device according to the first aspect, the image reception device may further include a setting unit which instructs the storage module to store the first identification information acquired by the information acquisition unit and another second identification information associated with the first identification information and different from the second identification information stored in the storage module and associated with the first identification information.

According to a seventh aspect of the present invention, in the image reception device according to the sixth aspect, the information output unit may further output, to the second display interface, configuration screen information which instructs the second display interface to display a configuration screen including a plurality of items of second identification information different from the second identification information stored in the storage module and associated with the first identification information. After the second display interface displays the configuration screen, the setting unit may select the second identification information based on a select instruction to select any one of the plurality of items of second identification information displayed on the configuration screen and may cause the selected second identification information to be stored in the storage module and associated with the first identification information acquired by the information acquisition unit.

According to an eighth aspect of the present invention, in the image reception device according to the first aspect, the image reception device may further include a setting unit which instructs the storage module to store the first identification information and the second identification information. The second communication module may further transmit request information indicating a request for the second identification information to a server that stores the second identification information and may receive the second identification information from the server which received the request information. The setting unit may cause the second identification information received by the second communication module to be stored in the storage module and associated with the first identification information acquired by the information acquisition unit.

According to a ninth aspect of the present invention, in the image reception device according to the eighth aspect, the information acquisition unit may further acquire position information. The second communication module may transmit the request information and the position information to the server and receives the second identification information corresponding to the position information from the server which received the request information.

According to a tenth aspect of the present invention, in the image reception device according to the first aspect, the second identification information may include color information. The second communication module may transmit the first control information which instructs the first display interface to display a first color corresponding to the color information included in the second identification information to the image capture device. The information output unit may output the second control information which instructs the second display interface to display a second color corresponding to the color information included in the second identification information to the second display interface.

According to an eleventh aspect of the present invention, in the image reception device according to the first aspect, the second identification information may include image information. The second communication module may transmit the first control information which instructs the first display interface to display a first image corresponding to the image information included in the second identification information to the image capture device. The information output unit may output the second control information which instructs the second display interface to display a second image corresponding to the image information included in the second identification information to the second display interface.

According to a twelfth aspect of the present invention, in the image reception device according to the first aspect, the second identification information may include pattern information which is used for identifying a pattern indicated by a combination of a display period in which predetermined information is displayed and a non-display period in which the predetermined information is not displayed. The second communication module may transmit the first control information which instructs the first display interface to display a first pattern corresponding to the pattern information included in the second identification information to the image capture device after the communication connection with the image capture device is established. The information output unit may output the second control information which instructs the second display interface to display a second pattern corresponding to the pattern information included in the second identification information to the second display interface after the communication connection with the image capture device is established.

According to a thirteenth aspect of the present invention, in the image reception device according to the twelfth aspect, the information output unit may output, to the second display interface, the second control information which instructs the second display interface to display the second pattern so that a first display period of the first pattern displayed by the first display interface and a second display period of the second pattern corresponding to the second identification information occur simultaneously or sequentially after the communication connection with the image capture device is established.

According to a fourteenth aspect of the present invention, in the image reception device according to the twelfth aspect, the second identification information may include first time information indicating the display period and second time information indicating the non-display period.

According to a fifteenth aspect of the present invention, in the image reception device according to the first aspect, the second communication module may be capable of establishing communication connection with only one image capture device that transmits the first control information to the image capture device capable of establishing communication connection with only one image reception device and receives image data from the image capture device.

According to a sixteenth aspect of the present invention, an image capture device includes an image capture module that captures an image to generate image data; a first display interface; a first communication module that receives, from an image reception device, first control information which instructs the first display interface to display first information corresponding to second identification information for visually identifying establishment of communication connection between the image capture device and the image reception device after a communication connection with the image reception device is established, and transmits image data to the image reception device, wherein the image reception device includes a second communication module and a second display interface, or the image reception device is electrically connected to the second display interface; and a display control unit which instructs the first display interface to display the first information based on the first control information after the communication connection with the image reception device is established.

According to a seventeenth aspect of the present invention, in the image capture device according to the sixteenth aspect, the first communication module may further receive, from another image capture device, first identification information which is used for identifying the image capture device or a lens module electrically connected to the other image capture device and may transmit the received first identification information to the image reception device.

According to an eighteenth aspect of the present invention, in the image capture device according to the sixteenth aspect, the image capture device may further include an information allocating unit that allocates different items of second identification information to a plurality of image reception devices. The first communication module may further transmit the second identification information allocated by the information allocating unit to the plurality of image reception devices.

According to a nineteenth aspect of the present invention, in the image capture device according to the sixteenth aspect, the image capture device may further include a connection terminal configured to electrically connect to an external device.

According to a twentieth aspect of the present invention, in the image capture device according to the nineteenth aspect, the connection terminal may be allocated on a surface of the image capture device facing a direction opposite to an image capture direction of the image capture module.

According to a twenty-first aspect of the present invention, in the image capture device according to the nineteenth aspect, the first display interface may be allocated on a surface of the image capture device facing the same direction as a connection surface of the connection terminal.

According to a twenty-second aspect of the present invention, an image capture system includes an image capture device and an image reception device. The image capture device includes an image capture module that captures an image to generate image data; a first display interface; a first communication module that receives, from the image reception device, first control information which instructs the first display interface to display first information corresponding to second identification information for visually identifying establishment of a communication connection between the image capture device and the image reception device, after the communication connection with the image reception device is established, and transmits the image data to the image reception device; and a display control unit which instructs the first display interface to display the first information based on the first control information after the communication connection with the image reception device is established. The image reception device includes a storage module that associates and stores first identification information which is used for identifying the image capture device or a lens module electrically connected to the image capture device and the second identification information; an information acquisition unit that acquires the first identification information from the image capture device; a second communication module that transmits, to the image capture device, the first control information which instructs the first display interface to display the first information corresponding to the second identification information stored in the storage module and associated with the first identification information acquired by the information acquisition unit after the communication connection with the image capture device is established and receives the image data from the image capture device; and an information output unit that outputs second control information which instructs a second display interface to display second information corresponding to the second identification information stored in the storage module and associated with the first identification information acquired by the information acquisition unit to the second display interface after the communication connection with the image capture device is established when the image reception device includes one of the second display interface and the second display interface is electrically connected to the image reception device.

According to a twenty-third aspect of the present invention, an image reception method includes a step in which an information acquisition unit acquires first identification information from an image capture device, wherein the first identification is used for identifying the image capture device having an image capture module, a first display interface, and a first communication module, or a lens module electrically connected to the image capture device; a step in which a second communication module transmits first control information which instructs the first display interface to display first information corresponding to second identification information for visually identifying establishment of communication connection between the image capture device and the image reception device, stored in the storage module and associated with the first identification information acquired by the information acquisition unit to the image capture device after the communication connection with the image capture device is established; a step in which an information output unit outputs second control information which instructs a second display interface to display second information corresponding to the second identification information stored in the storage module and associated with the first identification information acquired by the information acquisition unit to the second display interface after communication connection with the image capture device is established when the image reception device includes the second display interface or the second display interface is electrically connected to the image reception device; and a step in which the second communication module receives image data from the image capture device.

According to a twenty-fourth aspect of the present invention, a non-transitory medium saving a program to execute the steps of: acquiring first identification information from an image capture device which is used for identifying the image capture device having an image capture module, a first display interface, and a first communication module, or a lens module electrically connected to the image capture device; transmitting first control information by a second communication module after the communication connection with the image capture device is established, wherein the first control information is used for instructing the first display interface to display first information corresponding to second identification information for visually identifying establishment of the communication connection between the image capture device and the image reception device, stored in the storage module and associated with the acquired first identification information to the image capture device; outputting second control information which instructs a second display interface to display second information corresponding to the second identification information stored in the storage module and associated with the acquired first identification information to the second display interface after communication connection with the image capture device is established when the image reception device includes the second display interface or the second display interface is electrically connected to the image reception device; and receiving image data from the image capture device by the second communication module.

BRIEF DESCRIPTION OF THE DRAWINGS

FIG. 17A is a reference diagram showing an example of first identification information and second identification information stored in a storage module in a modified example of the fifth embodiment of the present invention;

FIG. 17B is a reference diagram showing an example of first identification information and second identification information stored in a storage module in a modified example of the fifth embodiment of the present invention;

FIG. 17C is a reference diagram showing an example of first identification information and second identification information stored in a storage module in a modified example of the fifth embodiment of the present invention;

FIG. 19A is a reference diagram showing an example of first identification information and second identification information stored in a storage module in a sixth embodiment of the present invention;

FIG. 19B is a reference diagram showing an example of first identification information and second identification information stored in a storage module in the sixth embodiment of the present invention;

DETAILED DESCRIPTION OF THE INVENTION

Hereinafter, embodiments of the present invention will be described with reference to the drawings.

First Embodiment

First Configuration Example

Figure 1:
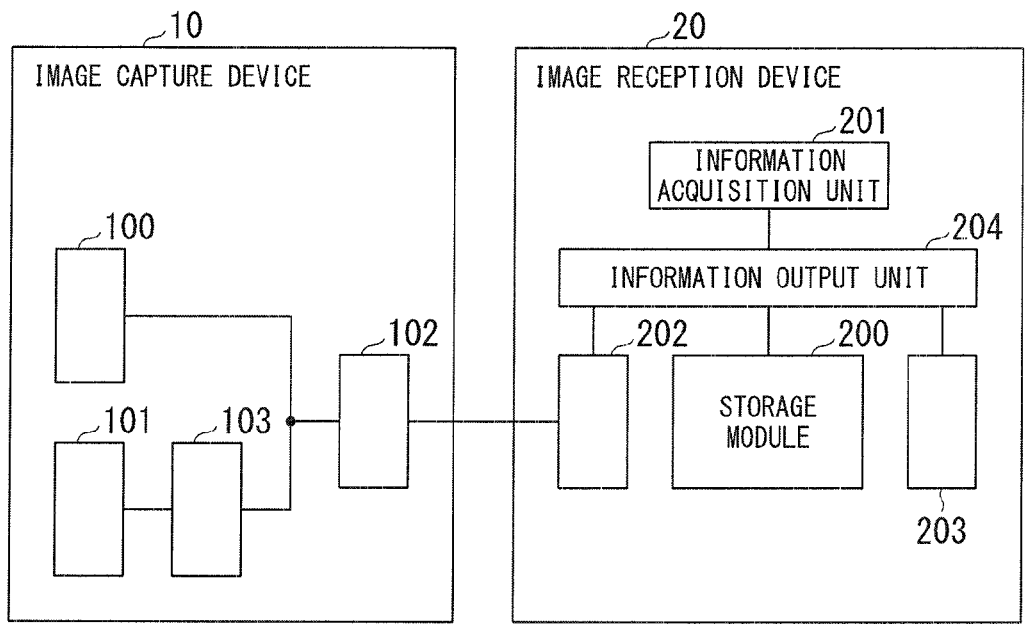
FIG. 1 is a block diagram showing a first configuration example of an image capture system according to a first embodiment of the present invention.

First, a first embodiment of the present invention will be described. FIG. 1 shows a first configuration example of an image capture system according to the present embodiment. The image capture system shown in FIG. 1 includes an image capture device 10 and an image reception device 20. Although FIG. 1 shows one image capture device 10 and one image reception device 20, the image capture system may include two or more image capture devices 10 or two or more image reception devices 20.

The image capture device 10 includes an image capture module 100, a first display interface 101, a first communication module 102, and a display control unit 103. The image capture module 100 captures an image to generate image data. For example, the image capture module 100 is integrated with a lens module. Alternatively, a lens module can be attached to the image capture module 100 to connect the lens module to the image capture module 100 electrically and the lens module can be detached from the image capture module 100. The first display interface 101 (first display module or first display device) displays first information indicating a combination of the image capture device 10 and the image reception device 20 which are connected by communication according to control of the display control unit 103.

After communication connection with the image reception device 20 is established, the first communication module 102 (first communication device) receives first control information which instructs the first display interface 101, from the image reception device 20 and transmits image data to the image reception device 20. The first control information instructs the first display interface 101 to display first information corresponding to second identification information which is used for identifying display content. After communication connection with the image reception device 20 is established, the display control unit 103 (control module or control device) allows the first display interface 101 to display the first information based on the first control information.

The image reception device 20 includes a storage module 200, an information acquisition unit 201, a second communication module 202, a second display interface 203, and an information output unit 204. The storage module 200 (storage device) is a nonvolatile recording medium or a volatile recording medium such as a memory included in the image reception device 20. The storage module 200 associates and stores first identification information and second identification information. The first identification information is used for identifying the image capture device 10 or a lens module electrically connected to the image capture device 10. The second identification information is used for visually identifying establishment of communication connection between the image capture device 10 and the image reception device 20.

The information acquisition unit 201 acquires the first identification information from the image capture device 10. For example, the information acquisition unit 201 acquires the first identification information by receiving the first identification information from the image capture device 10 via the second communication module 202.

After communication connection with the image capture device 10 is established, the second communication module 202 (second communication device) transmits first control information which instructs the first display interface 101 to display first information to the image capture device 10 and receives image data from the image capture device 10. The first information corresponds to the second identification information stored in the storage module 200 and associated with the first identification information acquired by the information acquisition unit 201. The communication between the image capture device 10 and the image reception device 20 performed by the first communication module 102 and the second communication module 202 may be wireless communication or cable communication.

The second display interface 203 (second display module or second display device) displays second information indicating a combination of the image capture device 10 and the image reception device 20 connected by communication. After communication connection with the image capture device 10 is established, the information output unit 204 outputs second control information to the second display interface 203 to instruct the second display interface 203 to display second information corresponding to the second identification information. The second identification information is correlated with the first identification information acquired by the information acquisition unit 201 and is stored in the storage module 200.

The information acquisition unit 201 may acquire second identification information correlated with the first identification information acquired by the information acquisition unit 201 from the storage module 200 among the items of second identification information stored in the storage module 200. Moreover, the image reception device 20 may include an information generating unit that generates first control information and second control information based on the second identification information acquired from the storage module 200.

The first identification information is information which is used for identifying the image capture device 10 or information which is used for identifying a lens module electrically connected to the image capture device 10. For example, the information which is used for identifying the image capture device 10 is an ID (SSID) of the image capture device 10. The information which is used for identifying the image capture device 10 may be information corresponding to performance (pixel count, sensitivity, or the like) of the image capture device 10. The information which is used for identifying the image capture device 10 may be arbitrary information as long as the information is allocated to a plurality of image capture devices in a non-redundant manner.

For example, the information which is used for identifying the lens module is an ID of the lens module. The information which is used for identifying the lens module may be information corresponding to performance (focal length, F-value, or the like) of the lens module. The information which is used for identifying the lens module may be arbitrary information as long as the information is allocated to a plurality of lens modules in a non-redundant manner.

The second identification information is information which is used for identifying the content of display performed by the first display interface 101 and the second display interface 203. The second identification information is information for visually identifying establishment of communication connection between the image capture device 10 and the image reception device 20. Display means presenting certain information (including a concept) for visual identification. The information presented by display includes colors, images, characters, symbols, figures, patterns, and the like.

When information is displayed by the first display interface 101 only or information is displayed by the second display interface 203 only, communication connection between the image capture device 10 and the image reception device 20 cannot always be specified. However, when the display by the first display interface 101 and the display by the second display interface 203 are correlated, the communication connection between the image capture device 10 and the image reception device 20 can be specified.

For example, when the first display interface 101 and the second display interface 203 display correlated colors, the communication connection between the image capture device 10 and the image reception device 20 is specified. In this case, the second identification information is information indicating the colors displayed by the first display interface 101 and the second display interface 203. For example, the first display interface 101 and the second display interface 203 display the same colors.

If the correlation between the colors displayed by the first display interface 101 and the second display interface 203 has been identified in advance, the colors displayed by the first display interface 101 and the second display interface 203 may be different. For example, the first display interface 101 may display a deep red color and the second display interface 203 may display a pale red color. Alternatively, the first display interface 101 may display the color blue and the second display interface 203 may display another color related to blue (for example, the color violet).

Moreover, for example, when the first display interface 101 and the second display interface 203 display correlated images, the communication connection between the image capture device 10 and the image reception device 20 is specified. In this case, the second identification information is information indicating the images displayed by the first display interface 101 and the second display interface 203. For example, the first display interface 101 and the second display interface 203 display the same image. When the image capture device 10 stores the image data generated by the image capture module 100, the images displayed by the first display interface 101 and the second display interface 203 may be the same image as the image stored in the image capture device 10.

If the correlation between the images displayed by the first display interface 101 and the second display interface 203 has been identified in advance, the images displayed by the first display interface 101 and the second display interface 203 may be different. For example, the images displayed by the first display interface 101 and the second display interface 203 may be images having different angles of view of the same subject.

Moreover, for example, when the first display interface 101 and the second display interface 203 display correlated patterns, the communication connection between the image capture device 10 and the image reception device 20 is specified. In this case, the second identification information is information indicating the patterns displayed by the first display interface 101 and the second display interface 203. For example, the displayed pattern is represented by a combination of a display period in which predetermined information is displayed and a non-display period in which the predetermined information is not displayed.

For example, the display period is a period in which a light emitting element such as an LED is lit (turned on). For example, the non-display period is a period in which a light emitting element such as an LED is unlit (turned off). In this case, the predetermined information displayed in the display period indicates lighting of the light emitting element. The pattern can be identified based on the lengths of the display period and the non-display period. Alternatively, the pattern can be identified based on the number of display periods (the number of times the light emitting element is turned on). The display period may be a period in which a predetermined character, figure, or the like is displayed. The non-display period may be a period in which the predetermined character, figure, or the like is not displayed.

For example, the first display interface 101 and the second display interface 203 display the same pattern. If the correlation between the patterns displayed by the first display interface 101 and the second display interface 203 has been identified in advance, the patterns displayed by the first display interface 101 and the second display interface 203 may be different.

The second identification information may be a character, a symbol, a figure, or the like. Moreover, the second identification information may be the number of light emitting elements that are turned on.

The first information corresponding to the second identification information and the second information corresponding to the second identification information are colors, images, characters, symbols, figures, patterns, and the like as described above. For example, the first information and the second information are the same information. Moreover, as described above, since there maybe a situation that the content displayed on the first display interface 101 is different from the content displayed on the second display interface 203, the first information and the second information may be different information. The image reception device 20 or 21 may display the first information and the second information continuously or periodically.

The storage module 200 may store a program and necessary data used for controlling the operation of the image reception device 20. The functions of the information acquisition unit 201 and the information output unit 204 can be realized by the function of software by causing a computer of the image reception device 20 to read and execute a program used for controlling the operation of a control module (control device) such as a central processing unit (CPU), for example. Moreover, this program may be provided by a "computer-readable recording medium" such as a flash memory, for example. Moreover, the program may be input to the image reception device 20 by transmitting the program from a computer storing the program in a storage device or the like to the image reception device 20 via a transmission medium or via transmission waves in the transmission medium. Here, the "transmission medium" that transmits a program is a medium having the function of transmitting information like a network (communication network) such as the Internet and a communication circuit (communication line) such as a telephone line. Moreover, the program may realize some of the above-described functions. Further, the program may be a so-called differential file (differential program) which can realize the above-described functions in combination with a program recorded in advance on a computer.

Second Configuration Example

Figure 2:
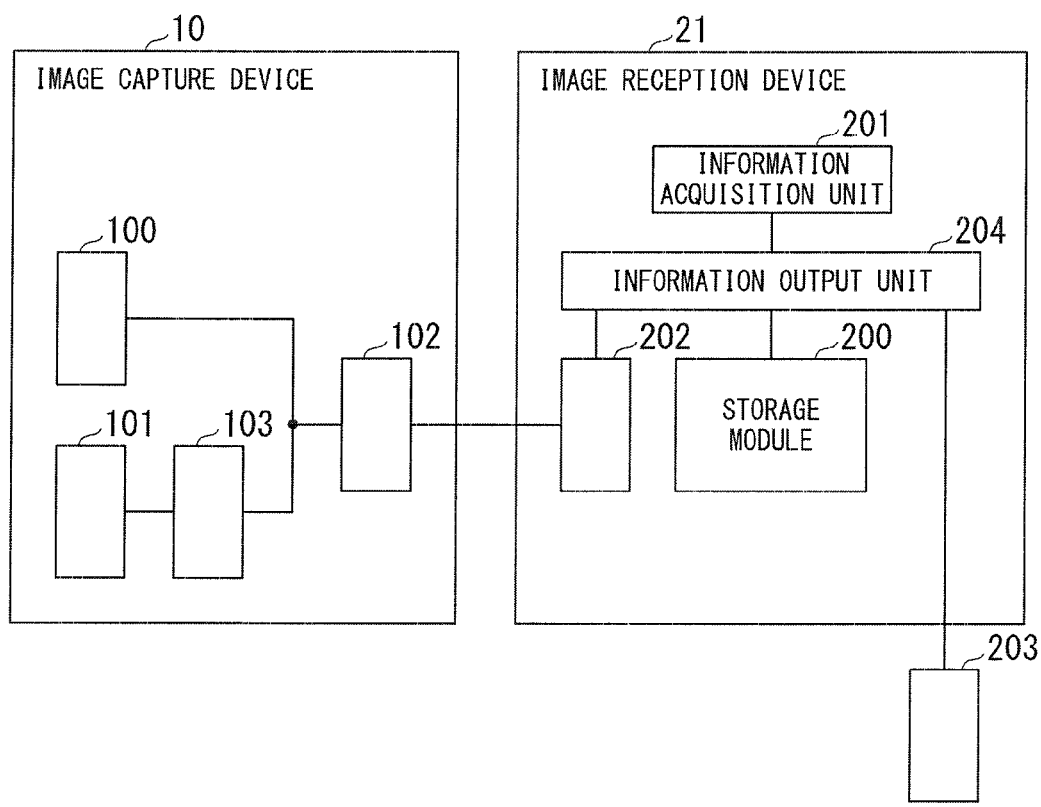
FIG. 2 is a block diagram showing a second configuration example of the image capture system according to the first embodiment of the present invention.

FIG. 2 shows a second configuration example of an image capture system according to the present embodiment. The image capture system shown in FIG. 2 includes an image capture device 10 and an image reception device 21. Although FIG. 2 shows one image capture device 10 and one image reception device 21, the image capture system may include two or more image capture devices 10 or two or more image reception devices 21. Since the configuration of the image capture device 10 has been described already, a description thereof will not be provided here.

The image reception device 21 include a storage module 200, an information acquisition unit 201, a second communication module 202, and an information output unit 204. Description of the configurations which have been described already will not be provided. The image reception device 20 shown in FIG. 1 includes the second display interface 203, whereas the image reception device 21 shown in FIG. 2 does not include the second display interface 203. The second display interface 203 is electrically connected to the image reception device 21. The second display interface 203 can be attached to the image reception device 21 and can be detached from the image reception device 21. When the second display interface 203 is attached to the image reception device 21, the second display interface 203 is electrically connected to the image reception device 21.

<Operation>

Figure 3:
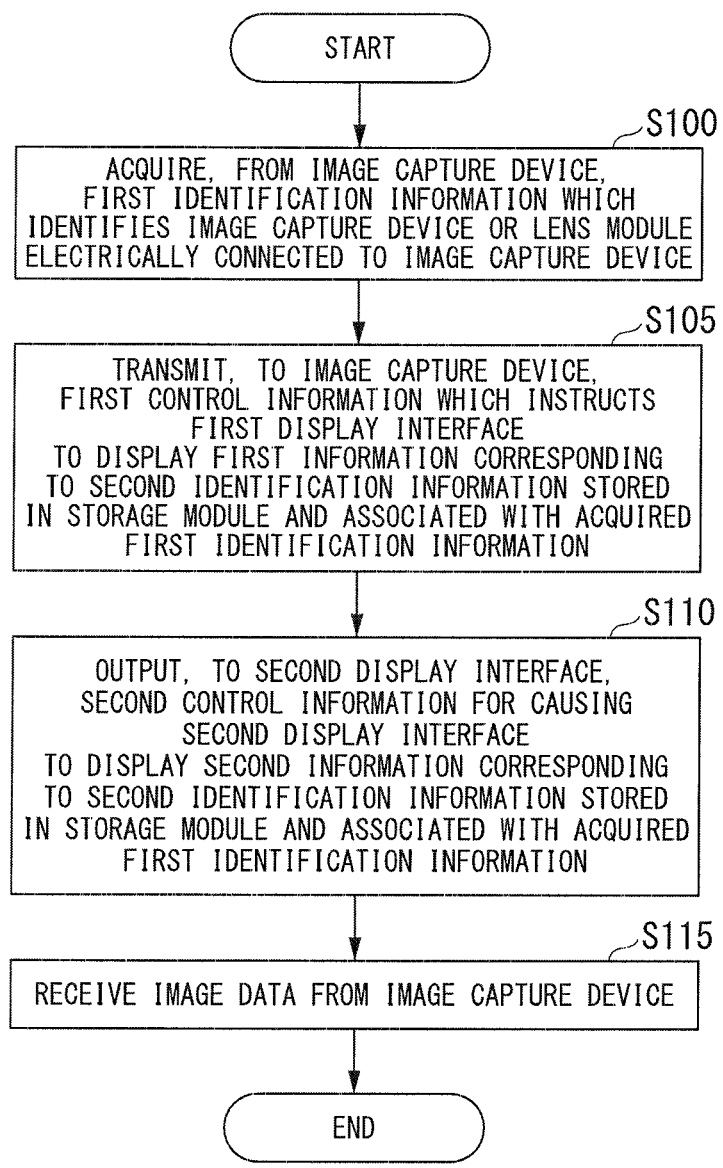
FIG. 3 is a flowchart showing an example of the flow of an operation of an image reception device according to the first embodiment of the present invention.

FIG. 3 shows an example of the flow of an operation of the image reception device 20 or 21. The operation of the image reception device 20 or 21 will be described with reference to FIG. 3.

The information acquisition unit 201 acquires first identification information which is used for identifying the image capture device 10 or a lens module electrically connected to the image capture device 10 from the image capture device 10 (step S100).

Subsequently, the second communication module 202 transmits the first control information which instructs the first display interface 101 to display first information to the image capture device 10 (step S105). The first information corresponds to the second identification information stored in the storage module 200 and associated with the first identification information acquired in step S100. When the storage module 200 stores wireless connection configuration information necessary for communication connection with the image capture device 10, the second communication module 202 can connect to the image capture device 10 automatically by communication once the image capture device 10 is powered on.

Subsequently, the information output unit 204 outputs second control information which instructs the second display interface 203 to display second information to the second display interface 203 (step S110). The second information corresponds to the second identification information stored in the storage module 200 and associated with the first identification information acquired in step S100.

Subsequently, the second communication module 202 receives image data from the image capture device 10 (step S115). For example, the image data received in step S115 is image data used for displaying a live view image (moving image or through image) or the like for determining composition. When the image capture device 10 has a storage module such as a memory for storing the image data generated by the image capture module 100, the image data received in step S115 may be image data stored in the storage module of the image capture device 10. For example, the image data is image data used for displaying an image which is viewed in a state in which no image is captured. The second display interface 203 may display an image based on the image data received in step S115.

At least after communication connection with the image capture device 10 is established, the second communication module 202 transmits the first control information to the image capture device 10 in step S105. After communication connection with the image capture device 10 is established, the second communication module 202 may preferably transmit the first control information to the image capture device 10 before the communication connection with the image capture device 10 expires.

At least after the communication connection with the image capture device 10 is established, the information output unit 204 outputs the second control information to the second display interface 203 in step S110. After the communication connection with the image capture device 10 is established, the information output unit 204 may preferably output the second control information to the second display interface 203 before the communication connection with the image capture device 10 expires.

The transmission (step S105) of the first control information and the output (step S110) of the second control information may preferably be performed earlier than the reception (step S115) of the image data. When image data is continuously transmitted in order to display a live view image for determining composition during image capture, the transmission (step S105) of the first control information and the output (step S110) of the second control information may be performed in the course of continuous transmission of the image data.

The first control information may be transmitted in step S105 after the second control information is output in step S110. Moreover, the transmission (step S105) of the first control information and the output (step S110) of the second control information may be performed in parallel.

The image reception device 20 or 21 may be in a waiting mode (standby mode or sleep mode) during execution of the operations of steps S100 to S110. In general, a waiting mode is a mode in which a smaller amount of power is consumed than in a normal operation mode. For example, in a waiting mode, the image reception device 20 or 21 does not display an image transmitted from the image capture device 10. When the operations of steps S100 to S110 are executed in a waiting mode, the operation mode of the image reception device 20 or 21 transitions from the waiting mode to a capturing mode or the like, and then the image data is received in step S115.

According to the present embodiment, the image reception device 20 or 21 includes the storage module 200 that associates and stores first identification information which is used for identifying the image capture device 10 having the image capture module 100, the first display interface 101, and the first communication module 102 or a lens module electrically connected to the image capture device 10 and second identification information which is used for visually identifying establishment of communication connection between the image capture device 10 and the image reception device 20 or 21; the information acquisition unit 201 that acquires the first identification information from the image capture device 10; the second communication module

202 that transmits, to the image capture device 10, first control information which instructs the first display interface 101 to display first information corresponding to the second identification information stored in the storage module 200 and associated with the first identification information acquired by the information acquisition unit 201 after the communication connection with the image capture device 10 is established and receives image data from the image capture device 10; and the information output unit 204 that outputs second control information which instructs the second display interface 203 to display second information corresponding to the second identification information stored in the storage module 200 and associated with the first identification information acquired by the information acquisition unit 201 to the second display interface 203 after the communication connection with the image capture device 10 is established when the image reception device 20 or 21 includes the second display interface 203 or the second display interface 203 is electrically connected to the image reception device 20 or 21.

According to the present invention, the image capture device 10 includes the image capture module 100 that captures an image to generate image data; the first display interface 101; the first communication module 102 that receives, from the image reception device 20 or 21, first control information which instructs the first display interface 101 to display first information corresponding to second identification information for visually identifying establishment of communication connection between the image capture device 10 and the image reception device 20 or 21 after communication connection with the image reception device 20 or 21 which includes the second communication module 202 and the second display interface 203 or to which the second display interface 203 is electrically connected is established and transmits image data to the image reception device 20 or 21; and the display control unit 103 which instructs the first display interface 101 to display the first information based on the first control information after the communication connection with the image reception device 20 or 21 is established.

According to the present embodiment, the image capture system includes the image capture device 10 and the image reception device 20 or 21, the image capture device 10 including: the image capture module 100 that captures an image to generate image data; the first display interface 101; the first communication module 102 that receives, from the image reception device 20 or 21, first control information which instructs the first display interface 101 to display first information corresponding to second identification information for visually identifying establishment of communication connection between the image capture device 10 and the image reception device 20 or 21 after communication connection with the image reception device 20 or 21 is established and transmits image data to the image reception device 20 or 21; and the display control unit 103 which instructs the first display interface 101 to display the first information based on the first control information after the communication connection with the image reception device 20 or 21 is established, and the image reception device 20 or 21 including: the storage module 200 that associates and stores first identification information which is used for identifying the image capture device 10 or a lens module electrically connected to the image capture device 10 and second identification information; the information acquisition unit 201 that acquires the first identification information from the image capture device 10; the second communication module 202 that transmits, to the image capture device 10, first control information which instructs the first display interface 101 to display first information corresponding to the second identification information stored in the storage module 200 and associated with the first identification information acquired by the information acquisition unit 201 after the communication connection with the image capture device 10 is established and receives image data from the image capture device 10; and the information output unit 204 that outputs second control information which instructs the second display interface 203 to display second information corresponding to the second identification information stored in the storage module 200 and associated with the first identification information acquired by the information acquisition unit 201 to the second display interface 203 after the communication connection with the image capture device 10 is established when the image reception device 20 includes the second display interface 203 or the second display interface 203 is electrically connected to the image reception device 21.

According to the present embodiment, an image reception method includes step S100 of allowing the information acquisition unit 201 to acquire first identification information which is used for identifying the image capture device 10 having the image capture module 100, the first display interface 101, and the first communication module 102 or a lens module electrically connected to the image capture device 10 from the image capture device 10; step S105 of allowing the second communication module 202 to transmit first control information which instructs the first display interface 101 to display first information corresponding to second identification information for visually identifying establishment of communication connection between the image capture device 10 and the image reception device 20 or 21, stored in the storage module 200 and associated with the first identification information acquired by the information acquisition unit 201 to the image capture device 10 after the communication connection with the image capture device 10 is established; step S110 of allowing the information output unit 204 to output second control information which instructs the second display interface 203 to display second information corresponding to the second identification information stored in the storage module 200 and associated with the first identification information acquired by the information acquisition unit 201 to the second display interface 203 after the communication connection with the image capture device 10 is established when the image reception device 20 includes the second display interface 203 or the second display interface 203 is electrically connected to the image reception device 21; and step S115 of allowing the second communication module 202 to receive image data from the image capture device 10.

According to the present embodiment, a program is provided to instruct a computer to execute: step S100 of acquiring first identification information which is used for identifying the image capture device 10 having the image capture module 100, the first display interface 101, and the first communication module 102 or a lens module electrically connected to the image capture device 10 from the image capture device 10; step S105 of allowing the second communication module 202 to transmit first control information which instructs the first display interface 101 to display first information corresponding to second identification information for visually identifying establishment of communication connection between the image capture device 10 and the image reception device 20 or 21, stored in the storage module 200 and associated with the acquired first identification information to the image capture device 10 after the communication connection with the image capture device 10 is established; step S110 of outputting second control information which instructs the second display interface 203 to display second information corresponding to the second identification information stored in the storage module 200 and associated with the acquired first identification information to the second display interface 203 after the communication connection with the image capture device 10 is established when the image reception device 20 includes the second display interface 203 or the second display interface 203 is electrically connected to the image reception device 21; and step S115 of allowing the second communication module 202 to receive image data from the image capture device 10.

In the present embodiment, after the communication connection with the image capture device 10 is established, the first information is displayed on the first display interface 101 of the image capture device 10, and the second information is displayed on the second display interface 203 of the image reception device 20 or 21. Due to this, it is easy to identify the correspondence between the image reception device 20 or 21 and the image capture device 10, or the correspondence between the image reception device 20 or 21 and the lens module electrically connected to the image capture device 10.

In the present embodiment, users can easily understand the correspondence between the image reception device 20 or 21 and the image capture device 10 or the lens module electrically connected to the image capture device 10 visually. For example, even when the image capture device 10 is present in a place that users do not approach, the users can understand the communication connection visually as long as the users can see the image capture device 10. When the image reception device 20 or 21 is in a waiting mode, a user can understand the correspondence before activating an image capture application.

The second communication module 202 may be able to transmit the first control information to the image capture device 10 capable of establishing communication connection with only one image reception device 20 (or the image reception device 21) and receive the image data from the image capture device 10, and the image reception device 20 (or the image reception device 21) may be able to establish communication connection with only one image capture device 10. That is, when one image reception device 20 (or the image reception device 21) is connected to the image capture device 10 by communication, the other image reception device may be unable to connect to the image capture device 10 by communication. Moreover, when the image reception device 20 (or the image reception device 21) is connected to one image capture device 10 by communication, the image reception device may be unable to connect to the other image capture device by communication. In other words, the communication connection of the image reception device 20 (or the image reception device 21) to one image capture device 10 may be exclusive, and the communication connection of the image capture device 10 to one image reception device 20 (or the image reception device 21) may be exclusive. In other words, the communication connection between the image capture device 10 and the image reception device 20 (or the image reception device 21) may be one-to-one correspondence. Therefore, it is easy to control the image capture system.

Second Embodiment

Figures 4, 5:
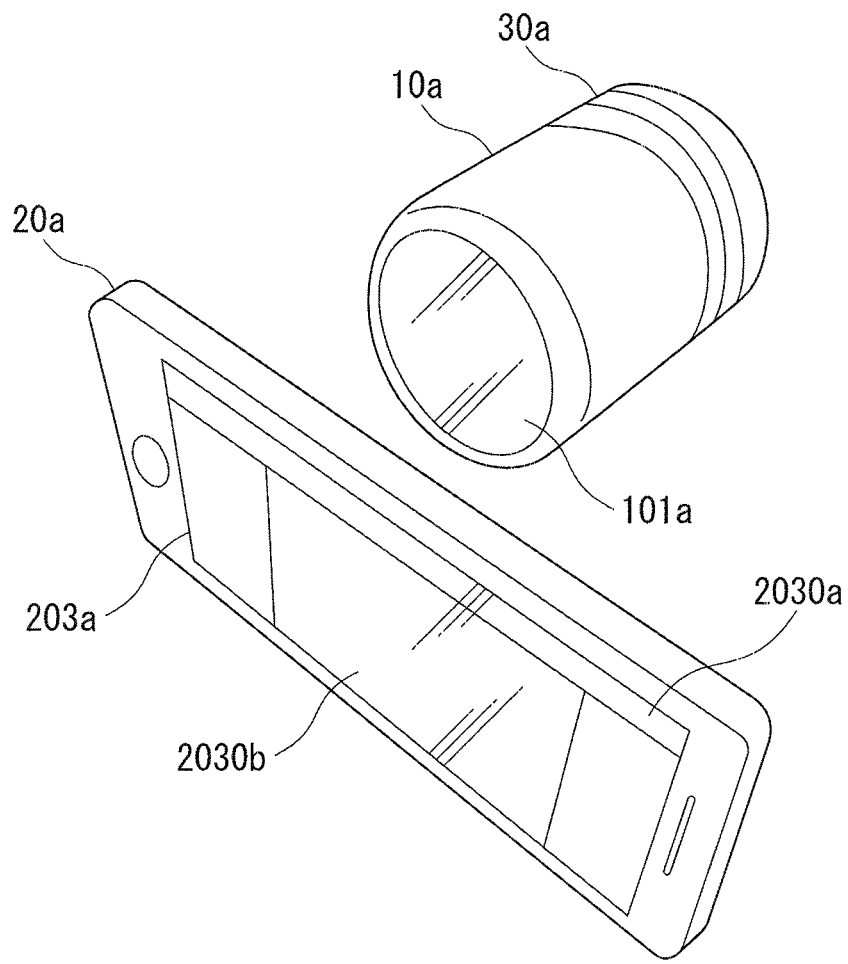
FIG. 4 is an external view showing a configuration example of an image capture system according to a second embodiment of the present invention.
FIG. 5 is a reference diagram showing an example of first identification information and second identification information stored in a storage module in the second embodiment of the present invention.

Next, a second embodiment of the present invention will be described. FIG. 4 shows a configuration example of an image capture system according to the present embodiment. The image capture system shown in FIG. 4 includes an image capture device 10a and an image reception device 20a.

A lens module 30a is electrically connected to the image capture device 10a. An LED 101a capable of emitting light of multiple colors is allocated on a surface of the image capture device 10a opposite to a surface to which the lens module 30a is connected. The LED may be provided on a curved side surface of the image capture device 10a. The LED 101a corresponds to the first display interface 101 shown in FIG. 1. In addition to the LED 101a, the image capture device 10a further includes the image capture module 100, the first communication module 102, and the display control unit 103 shown in FIG. 1. The image capture device 10a may be fixed to the image reception device 20a or may not be fixed thereto.

The image reception device 20a is a portable terminal such as a smartphone. A display 203a is allocated on a surface of the image reception device 20a. The same color as the color displayed by the LED 101a is displayed in a region 2030a of the display 203a. For example, the region 2030a is a title bar of an application. An image based on the image data received from the image capture device 10a is displayed in a region 2030b of the display 203a. The display 203a corresponds to the second display interface 203 shown in FIG. 1. That is, the image reception device 20a includes the display 203a that displays the second information corresponding to the second identification information stored in the storage module 200 and the image based on the image data. In addition to the display 203a, the image reception device 20a further includes the storage module 200, the information acquisition unit 201, the second communication module 202, and the information output unit 204 shown in FIG. 1.

FIG. 5 shows an example of the first identification information and the second identification information stored in the storage module 200 of the image reception device 20a. The first identification information and the second identification information are stored in the storage module 200 in a state in which they are correlated in one-to-one correspondence. When one of the first identification information and the second identification information is specified, the other correlated information can be specified.

In the example shown in FIG. 5, the first identification information is an ID (SSID) of an image capture device. Moreover, the second identification information is color information that designates lightness (brightness) of each color of RGB. In the example shown in FIG. 5, red (0xff0000) is correlated with an image capture device ID (AP-1111). Moreover, green (0x00ff00) is correlated with an image capture device ID (AP-2222). Further, blue (0x0000ff) is correlated with an image capture device ID (AP-3333).

In the present embodiment, the second identification information includes color information. Moreover, the second communication module 202 of the image reception device 20a transmits the first control information which instructs the LED 101 of the image capture device 10a, to the image capture device 10a. The first control information causes the LED 101a of the image capture device 10a to display a first color corresponding to the color information included in the second identification information. Moreover, the information output unit 204 of the image reception device 20a outputs the second control information which instructs the display 203a of the image reception device 20a, to the display 203a. The second control information causes the display 203a of the image reception device 20a to display a second color corresponding to the color information included in the second identification information. In the present embodiment, although the first color and the second color are the same color, the first color and the second color may be different colors if the correlation between the first color and the second color has been identified in advance.

Figure 6:
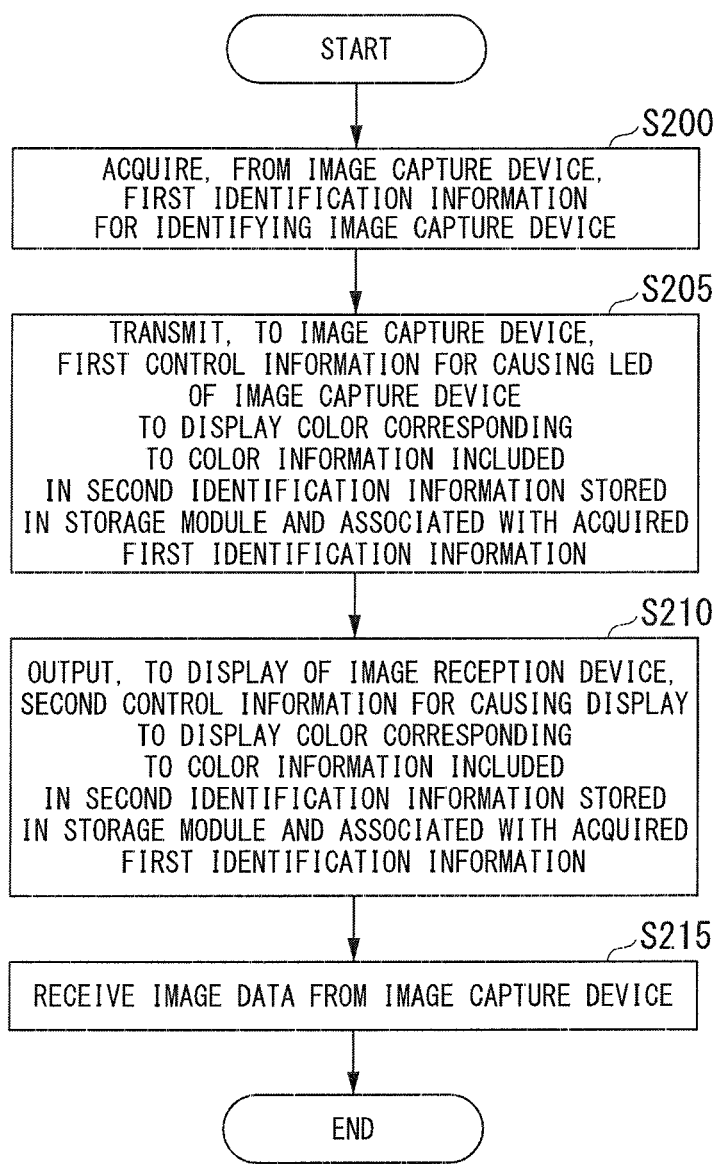
FIG. 6 is a flowchart showing an example of the flow of an operation of an image reception device according to the second embodiment of the present invention.

FIG. 6 shows an example of the flow of an operation of the image reception device 20a. The operation of the image reception device 20a will be described with reference to FIG. 6.

The information acquisition unit 201 acquires first identification information which is used for identifying the image capture device 10a from the image capture device 10a (step S200). For example, in step S200, the second communication module 202 receives the first identification information from the image capture device 10a when establishing communication connection with the image capture device 10a. The information acquisition unit 201 receives the first identification information that the second communication module 202 has received from the image capture device 10a from the second communication module 202. The first communication module 102 of the image capture device 10a transmits the first identification information to the image reception device 20a when establishing communication connection with the image reception device 20a.

Subsequently, the second communication module 202 transmits first control information which instructs the LED 101a of the image capture device 10a to display a color corresponding to the color information included in the second identification information to the image capture device 10a (step S205). The second identification information is stored in the storage module 200 and associated with the first identification information acquired in step S200. For example, in step S205, the information acquisition unit 201 retrieves the same first identification information as the first identification information acquired in step S200 from the items of first identification information stored in the storage module 200. When the same first identification information as the first identification information acquired in step S200 is found, the information acquisition unit 201 acquires the second identification information correlated with the first identification information from the storage module 200. The first control information corresponding to the acquired second identification information is transmitted to the image capture device 10a.

Subsequently, the information output unit 204 outputs second control information which instructs the display 203a of the image reception device 20a to display a color corresponding to the color information included in the second identification information to the display 203a (step S210). The second identification information is stored in the storage module 200 and associated with the first identification information acquired in step S200. For example, in step S210, the second control information corresponding to the second identification information acquired in step S205 is output to the display 203a.

Subsequently, the second communication module 202 receives image data from the image capture device 10a (step S215).

The LED 101a of the image capture device 10a displays a color corresponding to the color information included in the second identification information based on the first control information received from the image reception device 20a. Moreover, the display 203a of the image reception device 20a displays a color corresponding to the color information included in the second identification information based on the second control information. When the LED 101a of the image capture device 10a and the display 203a of the image reception device 20a display the same color, the correspondence between the image capture device 10a and the image reception device 20a can be identified.

In the present embodiment, although the LED 101a of the image capture device 10a and the display 203a of the image reception device 20a display colors, the display content is not limited to this. For example, the first display interface of the image capture device 10a and the second display interface of the image reception device 20a may display images, characters, symbols, figures, patterns, and the like.

In the present embodiment, users can easily understand the correspondence between the image capture device 10a and the image reception device 20a visually. Moreover, since the second information (color) is displayed by the display 203a used for displaying images in the image reception device 20a, the second information can be displayed using a configuration prepared for image display in the image reception device 20a.

Third Embodiment

Figure 7:
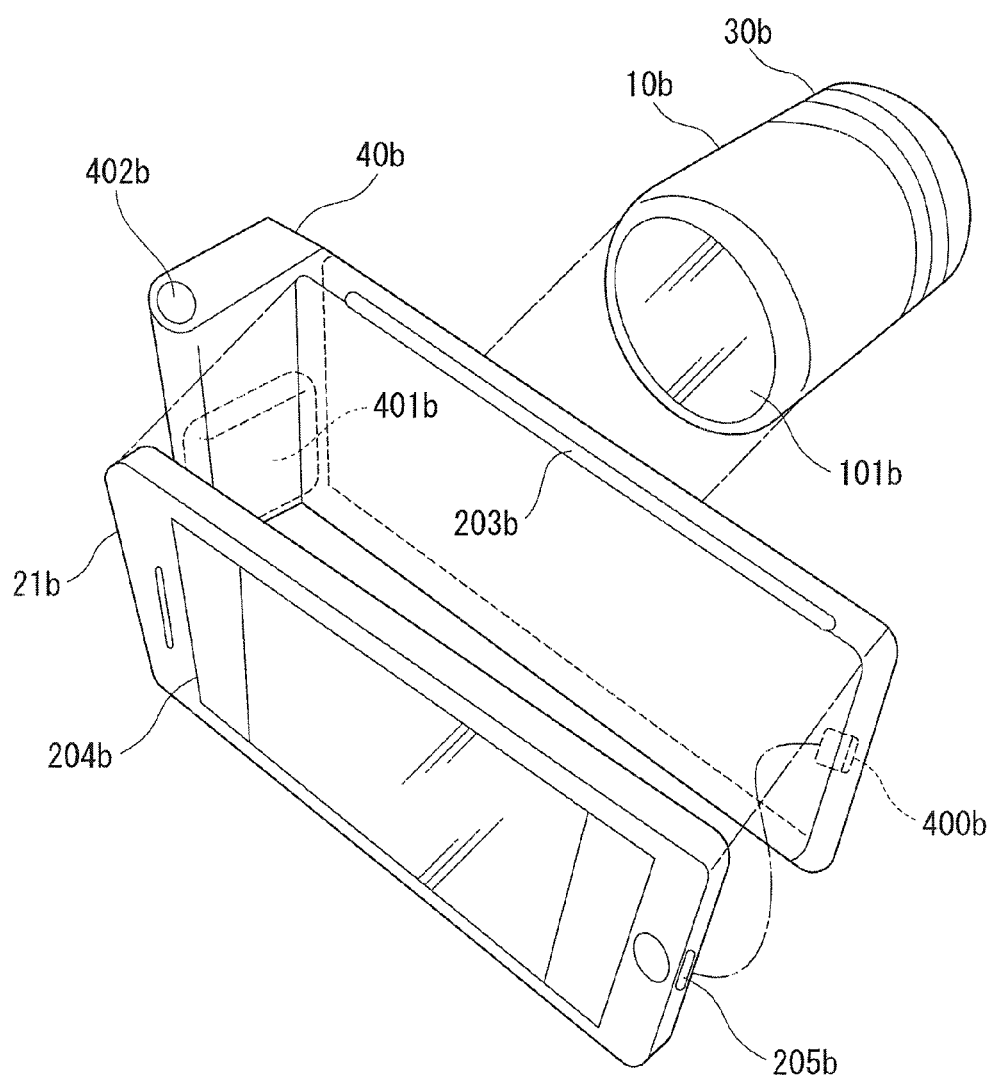
FIG. 7 is an external view showing a configuration example of an image capture system according to a third embodiment of the present invention.

Next, a third embodiment of the present invention will be described. FIG. 7 shows a configuration example of an image capture system according to the present embodiment. The image capture system shown in FIG. 7 includes an image capture device 10b, an image reception device 21b, and a cover 40b.

A lens module 30b is electrically connected to the image capture device 10b. An LED 101b capable of emitting light of multiple colors is allocated on a surface of the image capture device 10b opposite to a surface to which the lens module 30b is connected. The LED 101b corresponds to the first display interface 101 shown in FIG. 2. In addition to the LED 101b, the image capture device 10b further includes the image capture module 100, the first communication module 102, and the display control unit 103 shown in FIG. 2.

The image reception device 21b is a portable terminal such as a smartphone. A display 204b is allocated on a surface of the image reception device 21b. The display 204b displays an image based on the image data received from the image capture device 10b. A connecting unit 205b configured to electrically connect to the cover 40b is allocated in an end of the image reception device 21b. For example, the connecting unit 205b is an earphone jack or a data synchronization terminal. The connecting unit 205b may be connected to the cover 40b via near-field communication rather than being electrically connected to the cover 40b. In addition to the display 204b and the connecting unit 205b, the image reception device 21b further includes the storage module 200, the information acquisition unit 201, the second communication module 202, and the information output unit 204 shown in FIG. 2.

For example, the cover 40b is an accessory cover of a smartphone. The cover 40b can be fixed in contact with the image reception device 21b. An LED 203b capable of emitting light of multiple colors is allocated in an end of the cover 40b. The LED 203b corresponds to the second display interface 203 shown in FIG. 2. That is, in the present embodiment, the image reception device 21b includes the display 204b which is a third display interface that displays an image based on image data and the LED 203b is electrically connected to the image reception device 21b.

The second display interface is preferably in contact with the image reception device 21b in order to clarify that the second display interface (the LED 203b of the present embodiment) electrically connected to the image reception device 21b is provided in correspondence with the image reception device 21b. Alternatively, the second display interface is preferably in contact with a part (the cover 40b of the present embodiment) in contact with the image reception device 21b.

A control signal terminal 400b is provided in a position of the cover 40b corresponding to the connecting unit 205b of the image reception device 21b. A control signal output from the connecting unit 205b is input to the control signal terminal 400b. Moreover, an extension battery 401b is allocated inside the cover 40b. The extension battery 401b supplies power to the LED 203b and the like. Moreover, a shutter button 402b is allocated on a surface of the cover 40b. When a user presses the shutter button 402b, a control signal corresponding to a capturing instruction is output from the control signal terminal 400b to the connecting unit 205b of the image reception device 21b. This control signal is transmitted to the image capture device 10b by the second communication module 202 of the image reception device 21b and the image capture device 10b performs image capture.

Since the flow of an operation of the image reception device 21b is substantially the same as the flow shown in FIG. 6, the description of the flow of the operation of the image reception device 21b is not provided.

In the present embodiment, although the LED 101b of the image capture device 10b and the LED 203b of the cover 40b display colors, the display content is not limited to this. For example, the first display interface of the image capture device 10b and the second display interface of the cover 40b may display images, characters, symbols, figures, patterns, and the like.

In the present embodiment, users can easily understand the correspondence between the image capture device 10b and the image reception device 20b visually. Moreover, since the display 204b of the image reception device 21b may not be used for displaying the second information (color), the display 204b can be used for displaying images effectively.

Moreover, the position and type of the second display interface allocated in the cover 40b can be determined relatively freely.

Modified Example

Figure 8:
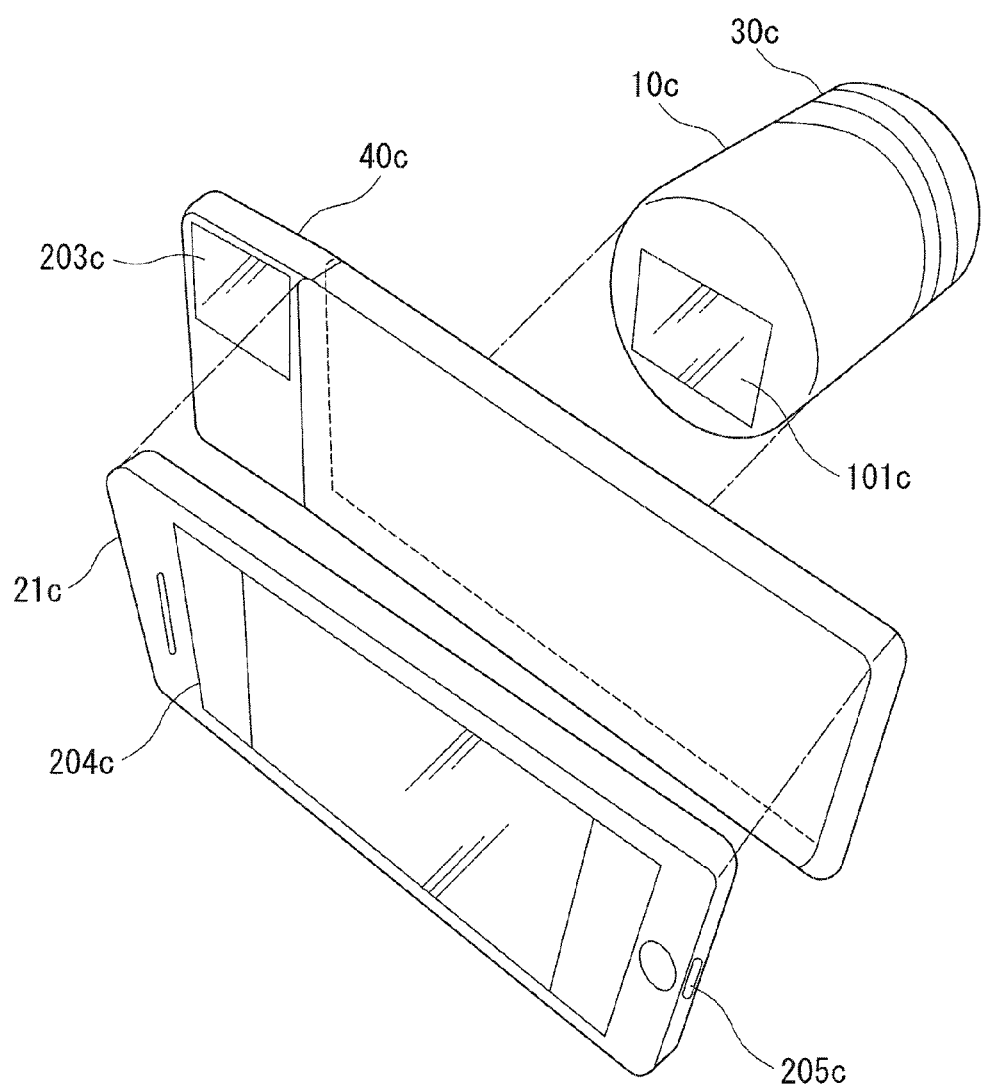
FIG. 8 is an external view showing a configuration example of an image capture system according to a modified example of the third embodiment of the present invention.

Next, a modified example of the third embodiment of the present invention will be described. FIG. 8 shows a configuration example of an image capture system according to the present modified example. The image capture system shown in FIG. 8 includes an image capture device 10c, an image reception device 21c, and a cover 40c.

A lens module 30c is electrically connected to the image capture device 10c. A display 101c is allocated on a surface of the image capture device 10c opposite to a surface to which the lens module 30c is connected. The display 101c corresponds to the first display interface 101 shown in FIG. 2. In addition to the display 101c, the image capture device 10c further includes the image capture module 100, the first communication module 102, and the display control unit 103 shown in FIG. 2. Moreover, the image capture device 10c includes a storage module that stores image data.

The image reception device 21c is a portable terminal such as a smartphone. A display 204c is allocated on a surface of the image reception device 21c. The display 204c displays an image based on the image data received from the image capture device 10c. A connecting unit 205c configured to electrically connect to the cover 40c is allocated in an end of the image reception device 21c. In addition to the display 204c and the connecting unit 205c, the image reception device 21c further includes the storage module 200, the information acquisition unit 201, the second communication module 202, and the information output unit 204 shown in FIG. 2.

For example, the cover 40c is an accessory cover of a smartphone, having the same function as the cover 40b. A portion of an end of the cover 40c does not overlap the image reception device 21c when the cover 40c is fixed to the image reception device 21c. The display 203c is allocated in the end of the cover 40c. The display 203c corresponds to the second display interface 203 shown in FIG. 2. That is, in the present modified example, the image reception device 21c includes the display 204c which is a third display interface that displays an image based on image data, and the display 203c is electrically connected to the image reception device 21c.

Figures 9, 10:
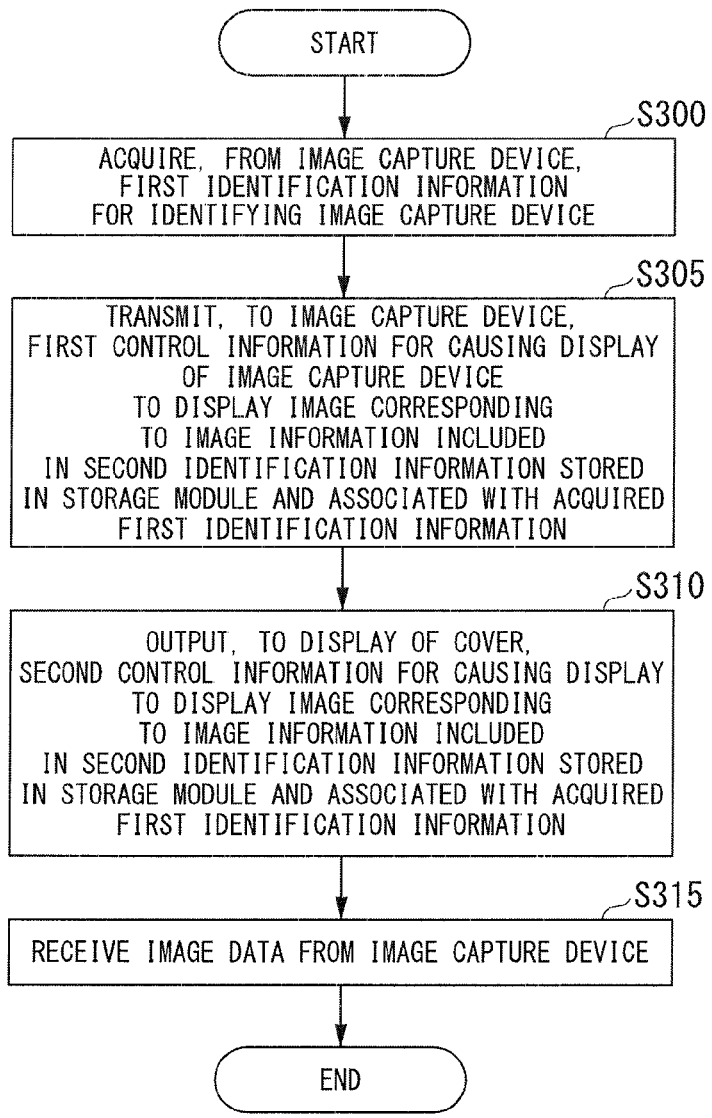
FIG. 9 is a reference diagram showing an example of first identification information and second identification information stored in a storage module in a modified example of the third embodiment of the present invention.
FIG. 10 is a flowchart showing an example of the flow of an operation of an image reception device according to a modified example of the third embodiment of the present invention.

FIG. 9 shows an example of the first identification information and the second identification information stored in the storage module 200 of the image reception device 21c. In the example shown in FIG. 9, the first identification information is an ID (SSID) of an image capture device. Moreover, the second identification information is image information indicating the image data. For example, the image information is a file name of the image data. In the example shown in FIG. 9, image data 1 is correlated with an image capture device ID (AP-1111). Moreover, image data 2 is correlated with an image capture device ID (AP-2222). Further, image data 3 is correlated with an image capture device ID (AP-3333).

For example, image data generated when image capture was performed by the image capture device 10c in the past are stored in the storage module of the image capture device 10c. Moreover, for example, the second communication module 202 of the image reception device 21c receives image data from the image capture device 10c when the second communication module 202 is connected to the image capture device 10c by communication in order to capture or view images. The image data received by the second communication module 202 is stored in the storage module 200. Moreover, the image information indicating the image data received by the second communication module 202 is stored in the storage module 200 and associated with the first identification information of the image capture device 10c. The first identification information of the image capture device 10c may be acquired from the image capture device 10c separately from the image data and may be acquired from the image data when the first identification information is appended to the image data.

The second communication module 202 of the image reception device 21c may connect to a network by communication to receive image data from a server on the network. The image data received by the second communication module 202 is stored in the storage module 200. Moreover, the image information indicating the image data received by the second communication module 202 is stored in the storage module 200 and associated with the first identification information of the image capture device 10c. The first identification information of the image capture device 10c may be acquired from the image capture device 10c separately from the image data and may be acquired from the image data when the first identification information is appended to the image data.

In the present modified example, the second identification information includes image information. Moreover, the second communication module 202 of the image reception device 21c transmits the first control information which instructs the display 101c of the image capture device 10c, to the image capture device 10c. The first control information causes the display 101c of the image capture device 10c to display a first image corresponding to the image information included in the second identification information. Moreover, the information output unit 204 of the image reception device 21c outputs second control information which instructs the display 203c of the cover 40c, to the display 203c. The second control information causes the display 203c of the cover 40c to display a second image corresponding to the image information included in the second identification information. In the present modified example, although the first image and the second image are the same image, the first image and the second image may be different images if the correspondence between the first image and the second image has been identified in advance.

FIG. 10 shows an example of the flow of an operation of the image reception device 21c. The operation of the image reception device 21c will be described with reference to FIG. 10.

The information acquisition unit 201 acquires first identification information which is used for identifying the image capture device 10c from the image capture device 10c (step S300).

Subsequently, the second communication module 202 transmits first control information which instructs the display 101c of the image capture device 10c to display an image corresponding to the image information included in the second identification information to the image capture device 10c (step S305). The second identification information is stored in the storage module 200 and associated with the first identification information acquired in step S300.

Subsequently, the information output unit 204 outputs second control information which instructs the display 203c of the cover 40c to display an image corresponding to the image information included in the second identification information to the display 203c (step S310). The second identification information is stored in the storage module 200 and associated with the first identification information acquired in step S300.

Subsequently, the second communication module 202 receives image data from the image capture device 10c (step S315).

The display 101c of the image capture device 10c displays an image corresponding to the second identification information based on the first control information received from the image reception device 20c. For example, the image data used for displaying the image is stored in the storage module of the image capture device 10c. Moreover, the display 203c of the cover 40c displays an image corresponding to the second identification information based on the second control information. For example, the image data used for displaying the image is stored in the storage module 200 of the image reception device 20c. The image data is output to the display 203c of the cover 40c via the connecting unit 205c. When the display 101c of the image capture device 10c and the display 203c of the cover 40c display the same image, the correspondence between the image capture device 10c and the image reception device 20c can be identified.

In the present modified example, although the display 101c of the image capture device 10c and the display 203c of the cover 40c display images, the display content is not limited to this. For example, the first display interface of the image capture device 10c and the second display interface electrically connected to the image reception device 21c may display colors, characters, symbols, figures, patterns, and the like.

Fourth Embodiment

Figures 11, 12:
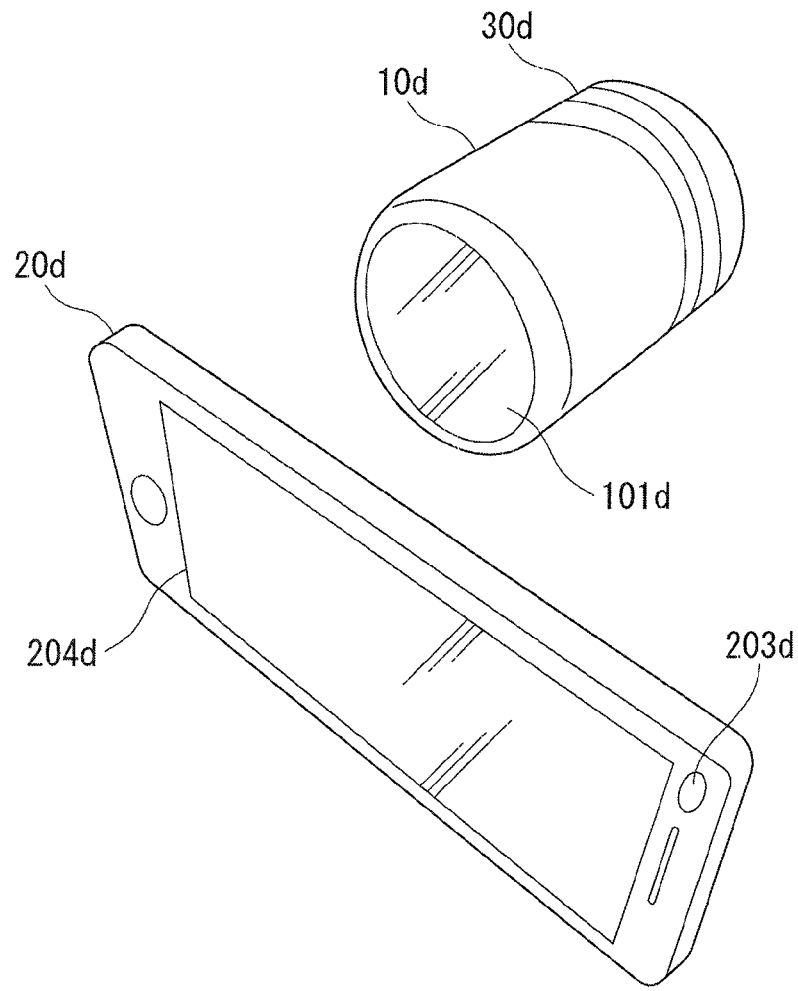
FIG. 11 is an external view showing a configuration example of an image capture system according to a fourth embodiment of the present invention.
FIG. 12 is a reference diagram showing an example of first identification information and second identification information stored in a storage module in the fourth embodiment of the present invention.

Next, a fourth embodiment of the present invention will be described. FIG. 11 shows a configuration example of an image capture system according to the present embodiment. The image capture system shown in FIG. 11 includes an image capture device 10d and an image reception device 20d.

A lens module 30d is electrically connected to the image capture device 10d. An LED 101d capable of emitting light of a single color is allocated on a surface of the image capture device 10d opposite to a surface to which the lens module 30d is connected. The LED 101d corresponds to the first display interface 101 shown in FIG. 1. In addition to the LED 101d, the image capture device 10d further includes the image capture module 100, the first communication module 102, and the display control unit 103 shown in FIG. 1.

The image reception device 20d is a portable terminal such as a smartphone. A display 204d is allocated on a surface of the image reception device 20d. The display 204d displays an image based on the image data received from the image capture device 10d. An LED 203d capable of emitting light of a single color is allocated in an end of the image reception device 20d. The LED 203d corresponds to the second display interface 203 shown in FIG. 1. That is, the image reception device 20d includes the LED 203d and the display 204d which is a third display interface that displays an image based on the image data. In addition to the display 204d and the LED 203d, the image reception device 20d further includes the storage module 200, the information acquisition unit 201, the second communication module 202, and the information output unit 204 shown in FIG. 1.

FIG. 12 shows an example of the first identification information and the second identification information stored in the storage module 200 of the image reception device 20d. In the example shown in FIG. 12, the first identification information is an ID (SSID) of an image capture device. Moreover, the second identification information is pattern information which is used for identifying a pattern. The pattern is identified by a combination of a display period (on period) in which predetermined information (lit state) is displayed and a non-display period (off period) in which predetermined information is not displayed. In the example shown in FIG. 12, a pattern in which a display period of one second and a non-display period of one second are repeated is correlated with an image capture device ID (AP-1111). Moreover, a pattern in which a display period of two seconds and a non-display period of two seconds are repeated is correlated with an image capture device ID (AP-2222).

In the present embodiment, the second identification information includes the pattern information which is used for identifying a pattern indicated by a combination of a display period in which predetermined information is displayed and a non-display period in which predetermined information is not displayed. Moreover, after communication connection with the image capture device 10d is established, the second communication module 202 of the image reception device 20d transmits first control information which instructs the LED 101d of the image capture device 10d, to the image capture device 10d. The first control information causes the LED 101d of the image capture device 10d to display a first pattern corresponding to the pattern information included in the second identification information. Moreover, after communication connection with the image capture device 10d is established, the information output unit 204 of the image reception device 20d outputs second control information which instructs the LED 203d of the image reception device 20d, to the LED 203d. The second control information causes the LED 203d of the image reception device 20d to display a second pattern corresponding to the pattern information included in the second identification information. In the present embodiment, although the first pattern and the second pattern are the same pattern, the first pattern and the second pattern may be different patterns if the correlation between the first pattern and the second pattern has been identified in advance.

Moreover, in the present embodiment, the second identification information includes first time information indicating the display period and second time information indicating the non-display period. In the example shown in FIG. 12, the first time information is information indicating a period (one or two seconds) in which an on state continues. In the example shown in FIG. 12, the second time information is information indicating a period (one or two seconds) in which an off state continues.

Moreover, in the present embodiment, after the communication connection with the image capture device 10d is established, the information output unit 204 outputs the second control information which instructs the LED 203d of the image reception device 20d, to the LED 101d. The second control information causes the LED 203d of the image reception device 20d to display a second pattern so that the first display period and the second display period occur simultaneously or sequentially. The first display period is a display period of the first pattern displayed by the LED 101d of the image capture device 10d. The second display period is a display period of the second pattern corresponding to the second identification information.

Figure 13A:
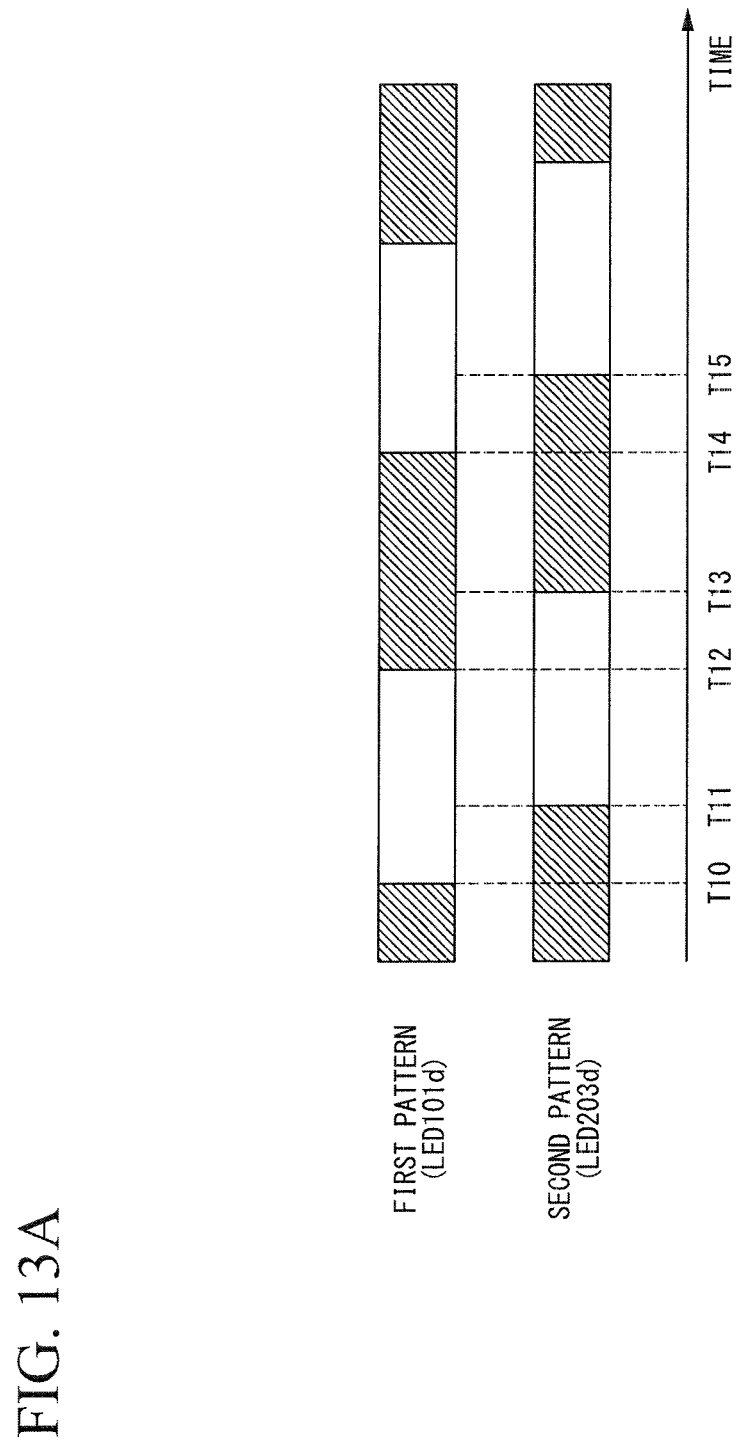
FIG. 13A is a reference diagram showing an example of a first pattern and a second pattern in the fourth embodiment of the present invention.
Figure 13B:
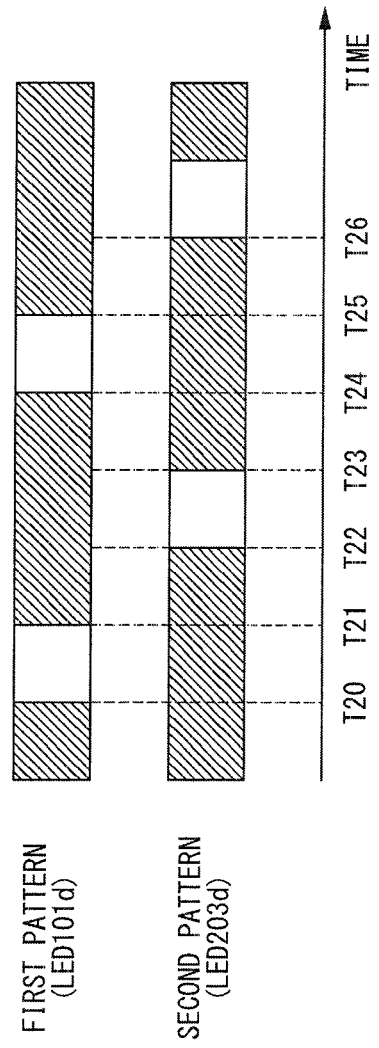
FIG. 13B is a reference diagram showing an example of a first pattern and a second pattern in the fourth embodiment of the present invention.

FIGS. 13A and 13B show examples of the first pattern displayed by the LED 101d of the image capture device 10d and the second pattern displayed by the LED 203d of the image reception device 20d. FIGS. 13A and 13B show the schedule of a display period and a non-display period of the respective patterns. In FIGS. 13A and 13B, time is shown to progress to the right.

In FIG. 13A, the LED 101d of the image capture device 10d is turned on at T10. Moreover, the LED 203d of the image reception device 20d is turned on at T11 later than T10. The LED 101d of the image capture device 10d maintains its on state for a certain period and is then turned off at T12 later than T11. The LED 203d of the image reception device 20d maintains its on state for a certain period and is then turned off at T13 later than T12. The LED 101d of the image capture device 10d maintains its off state for a certain period and is then turned on at T14 later than T13. The LED 203d of the image reception device 20d maintains its off state for a certain period and is then turned on at T15 later than T14. After that, the LED 101d of the image capture device 10d and the LED 203d of the image reception device 20d are repeatedly turned on and off alternately (periodically).

In FIG. 13A, in the period between T11 and T12, the LED 101d of the image capture device 10d and the LED 203d of the image reception device 20d maintain the on state simultaneously. That is, the on period (first display period) of the first pattern displayed by the LED 101d of the image capture device 10d and the on period (second display period) of the second pattern displayed by the LED 203d of the image reception device 20d occur simultaneously (these on periods overlap at least partially in time).

The on period of the LED 101d of the image capture device 10d and the on period of the LED 203d of the image reception device 20d may not occur simultaneously (these on periods may not overlap in time). In FIG. 13B, the LED 101d of the image capture device 10d is turned on at T20. The LED 101d of the image capture device 10d maintains its on state for a certain period and is then turned off at T21 later than T20. Moreover, the LED 203d of the image reception device 20d is turned on at T22 later than T21. The LED 203d of the image reception device 20d maintains its on state for a certain period and is then turned off at T23 later than T22.

The LED 101d of the image capture device 10d maintains its off state for a certain period and is then turned on at T24 later than T23. The LED 101d of the image capture device 10d maintains its on state for a certain period and is then turned off at T25 later than T24. The LED 203d of the image reception device 20d maintains its off state for a certain period and is then turned off at T26 later than T25. After that, the LED 101d of the image capture device 10d and the LED 203d of the image reception device 20d are repeatedly turned on and off alternately (periodically).

In FIG. 13B, the LED 101d of the image capture device 10d and the LED 203d of the image reception device 20d are not in the on state at the same time. That is, the on period (first display period) of the first pattern displayed by the LED 101d of the image capture device 10d and the on period (second display period) of the second pattern displayed by the LED 203d of the image reception device 20d occur sequentially (alternately).

Figure 14:
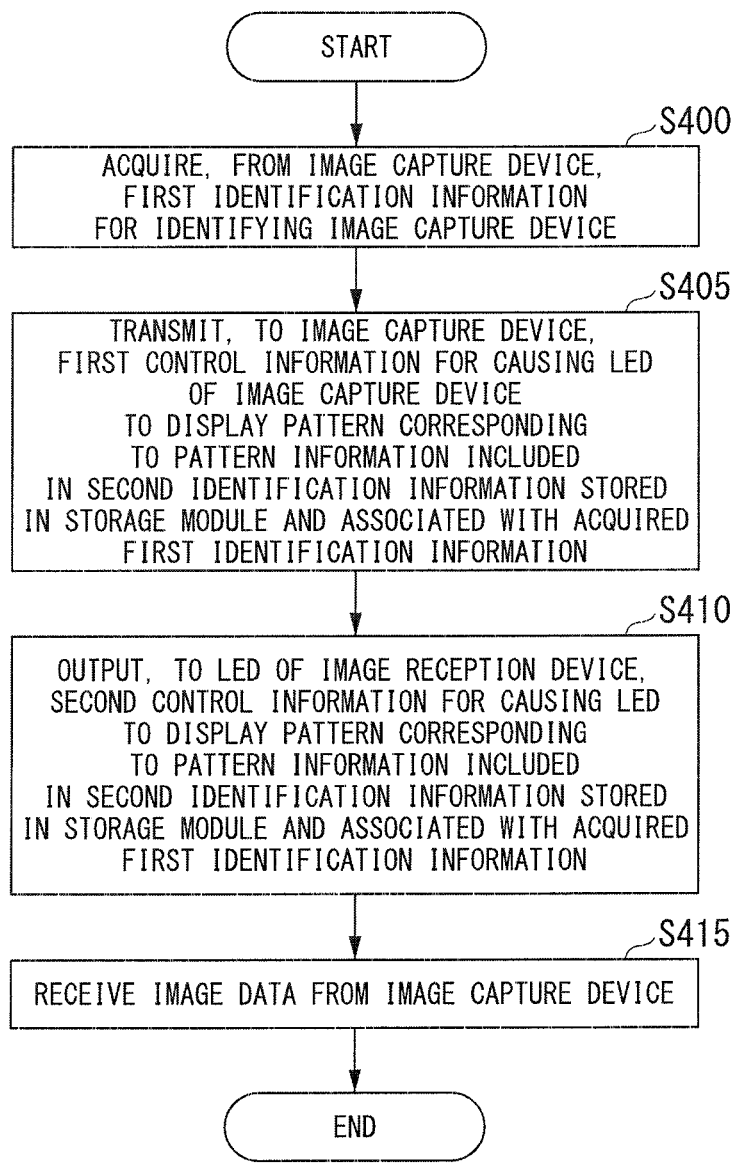
FIG. 14 is a flowchart showing an example of the flow of an operation of an image reception device according to the fourth embodiment of the present invention.

FIG. 14 shows an example of the flow of an operation of the image reception device 20d. The operation of the image reception device 20d will be described with reference to FIG. 14.

The information acquisition unit 201 acquires the first identification information which is used for identifying the image capture device 10d from the image capture device 10d (step S400).

Subsequently, the second communication module 202 transmits first control information which instructs the LED 101d of the image capture device 10d to display a pattern corresponding to the pattern information included in the second identification information to the image capture device 10d (step S405). The second identification information is stored in the storage module 200 and associated with the first identification information acquired in step S400.

Subsequently, the information output unit 204 outputs second control information which instructs the LED 203d of the image reception device 20d to display a pattern corresponding to the pattern information included in the second identification information to the LED 203d (step S410). The second identification information is stored in the storage module 200 and associated with the first identification information acquired in step S400.

Subsequently, the second communication module 202 receives image data from the image capture device 10d (step S415).

The LED 101d of the image capture device 10d displays a pattern corresponding to the pattern information included in the second identification information based on the first control information received from the image reception device 20d. Moreover, the LED 203d of the image reception device 20d displays a pattern corresponding to the pattern information included in the second identification information based on the second control information. When the LED 101d of the image capture device 10d and the LED 203d of the image reception device 20d display the same pattern, the correspondence between the image capture device 10d and the image reception device 20d can be identified.

In the present embodiment, although the LED 101d of the image capture device 10d and the LED 203d of the image reception device 20d display patterns, the display content is not limited to this. For example, the first display interface of the image capture device 10d and the second display interface of the image reception device 20d may display colors, images, characters, symbols, figures, and the like.

In the present embodiment, users can easily understand the correspondence between the image capture device 10d and the image reception device 20d visually. Moreover, since the display 204d of the image reception device 21d may not be used for displaying the second information (pattern), the display 204d can be used for displaying images effectively.

Moreover, because the LED 101d of the image capture device 10d and the LED 203d of the image reception device 20d display a single color, the cost of LEDs can be reduced.

Fifth Embodiment

Next, a fifth embodiment of the present invention will be described. In the present embodiment, an example which uses the configuration of the image capture system shown in FIG. 8 will be described.

Figures 15, 16:
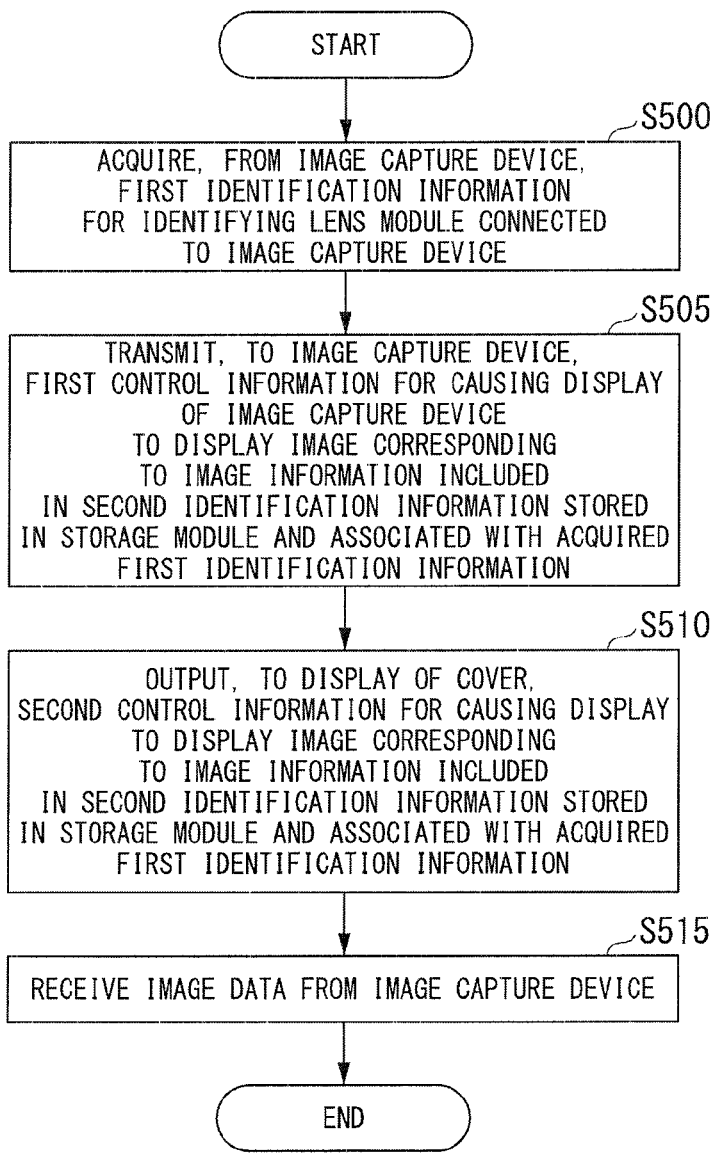
FIG. 15 is a reference diagram showing an example of first identification information and second identification information stored in a storage module in a fifth embodiment of the present invention.
FIG. 16 is a flowchart showing an example of the flow of an operation of an image reception device according to the fifth embodiment of the present invention.

In the present embodiment, the storage module 200 of the image reception device 20c associates and stores the first identification information which is used for identifying the lens module 30c electrically connected to the image capture device 10c and the second identification information. FIG. 15 shows an example of the first identification information and the second identification information stored in the storage module 200 of the image reception device 20c. In the example shown in FIG. 15, the first identification information is a lens module ID. Moreover, the second identification information is image information indicating the image data. In the example shown in FIG. 15, image data 1 is correlated with a lens module ID (lens module 1). Moreover, image data 2 is correlated with a lens module ID (lens module 2). Further, image data 3 is correlated with a lens module ID (lens module 3).

For example, image data generated when image capture was performed by the image capture device 10c in the past are stored in the storage module of the image capture device 10c. Moreover, for example, the second communication module 202 of the image reception device 21c receives image data from the image capture device 10c when the second communication module 202 is connected to the image capture device 10c by communication in order to capture or view images. The image data received by the second communication module 202 is stored in the storage module 200. Moreover, the image information indicating the image data received by the second communication module 202 is stored in the storage module 200 and associated with the first identification information of the lens module 30c. The first identification information of the lens module 30c may be acquired from the image capture device 10c separately from the image data and may be acquired from the image data when the first identification information is appended to the image data.

The second communication module 202 of the image reception device 21c may connect to a network by communication to receive image data from a server on the network. The image data received by the second communication module 202 is stored in the storage module 200. Moreover, the image information indicating the image data received by the second communication module 202 is stored in the storage module 200 and associated with the first identification information of the lens module 30c. The first identification information of the lens module 30c may be acquired from the image capture device 10c separately from the image data and may be acquired from the image data when the first identification information is appended to the image data.

FIG. 16 shows an example of the flow of an operation of the image reception device 21c. The operation of the image reception device 21c will be described with reference to FIG. 16.

The information acquisition unit 201 acquires first identification information which is used for identifying a lens module electrically connected to the image capture device 10c from the image capture device 10c (step S500). For example, the image capture device 10c includes an information generating unit that is used for identifying the type of a lens module to generate the first identification information when the lens module is electrically connected thereto. For example, in step S500, the information acquisition unit 201 acquires the first identification information by receiving the first identification information from the image capture device 10c via the second communication module 202. The first communication module 102 of the image capture device 10c transmits the first identification information to the image reception device 20c when establishing communication connection with the image reception device 20c.

Since the processes of steps S505 to S515 are the same as the processes of steps S305 to S315 in FIG. 10, the description of the processes of steps S505 to S515 will not be provided.

The display 101c of the image capture device 10c displays an image corresponding to the second identification information based on the first control information received from the image reception device 20c. Moreover, the display 203c of the cover 40c displays an image corresponding to the second identification information based on the second control information. When the display 101c of the image capture device 10c and the display 203c of the cover 40c display the same image, the correspondence between the lens module 30c electrically connected to the image capture device 10c and the image reception device 20c can be identified.

The image reception device 20c may include a determining unit that determines whether the lens module 30c electrically connected to the image capture device 10c has been replaced. For example, the information acquisition unit 201 acquires the first identification information from the image capture device 10c repeatedly. The determining unit determines whether the lens module 30c has been replaced by comparing the first identification information acquired presently with the first identification information acquired previously. Specifically, the determining unit determines that the lens module 30c has been replaced when the first identification information acquired presently is not identical to the first identification information acquired previously. When it is determined that the lens module 30c has been replaced, the processes of steps S500 to S510 are performed again.

In the present embodiment, although the display 101c of the image capture device 10c and the display 203c of the cover 40c display images, the display content is not limited to this. For example, the first display interface of the image capture device 10c and the second display interface electrically connected to the image reception device 21c may display colors, characters, symbols, figures, patterns, and the like.

By the same method as the present embodiment, in the image capture systems shown in FIGS. 4, 7, and 11, the correspondence between the lens module electrically connected to the image capture device and the image reception device may be identified.

In the present embodiment, users can easily understand the correspondence between the image reception device 20c and the lens module 30c electrically connected to the image capture device 10c visually. In particular, when a number of lens modules having similar shapes are present, it is easy to identify respective lens modules. Thus, it is possible to prevent the occurrence of a situation in which a lens module that a user does not want to use is electrically connected to an image capture device and the image capture device performs image capture.

Modified Example

Next, a modified example of the fifth embodiment of the present invention will be described. In the present modified example, an example which uses the configuration of the image capture system shown in FIG. 8 will be described.

In the present modified example, the storage module 200 of the image reception device 20c associates and stores the first identification information which is used for identifying a combination of the image capture device 10c and the lens module 30c electrically connected to the image capture device 10c and the second identification information. FIGS. 17A, 17B, and 17C show examples of the first identification information and the second identification information stored in the storage module 200 of the image reception device 20c. In the example shown in FIG. 17A, the first identification information is a combination of an ID (SSID) of the image capture device 10c and a lens module ID. Moreover, the second identification information is image information indicating the image data. In the example shown in FIG. 17A, image data 1 is correlated with a combination of an image capture device ID (AP-1111) and a lens module ID (lens module 1). Moreover, image data 2 is correlated with a combination of an image capture device ID (AP-2222) and a lens module ID (lens module 2). Further, image data 3 is correlated with a combination of an image capture device ID (AP-3333) and a lens module ID (lens module 3).

As shown in FIG. 17B, a plurality of different lens module IDs (lens module 1, lens module 2, and lens module 3) may be correlated with the ID (AP-1111) of the same image capture device. Moreover, as shown in FIG. 17C, the same lens module ID (lens module 1) may be correlated with a plurality of different image capture device IDs (AP-1111, AP-2222, and AP-3333).

For example, image data generated when image capture was performed by the image capture device 10c in the past are stored in the storage module of the image capture device 10c. Moreover, for example, the second communication module 202 of the image reception device 21c receives image data from the image capture device 10c when the second communication module 202 is connected to the image capture device 10c by communication in order to capture or view images. The image data received by the second communication module 202 is stored in the storage module 200. Moreover, the image information indicating the image data received by the second communication module 202 is stored in the storage module 200 and associated with the first identification information of the image capture device 10c and the lens module 30c. The first identification information of the image capture device 10c and the lens module 30c may be acquired from the image capture device 10c separately from the image data and may be acquired from the image data when the first identification information is appended to the image data.

The second communication module 202 of the image reception device 21c may connect to a network by communication to receive image data from a server on the network. The image data received by the second communication module 202 is stored in the storage module 200. Moreover, the image information indicating the image data received by the second communication module 202 is stored in the storage module 200 and associated with the first identification information of the image capture device 10c and the lens module 30c. The first identification information of the image capture device 10c and the lens module 30c may be acquired from the image capture device 10c separately from the image data and may be acquired from the image data when the first identification information is appended to the image data.

Figure 18:
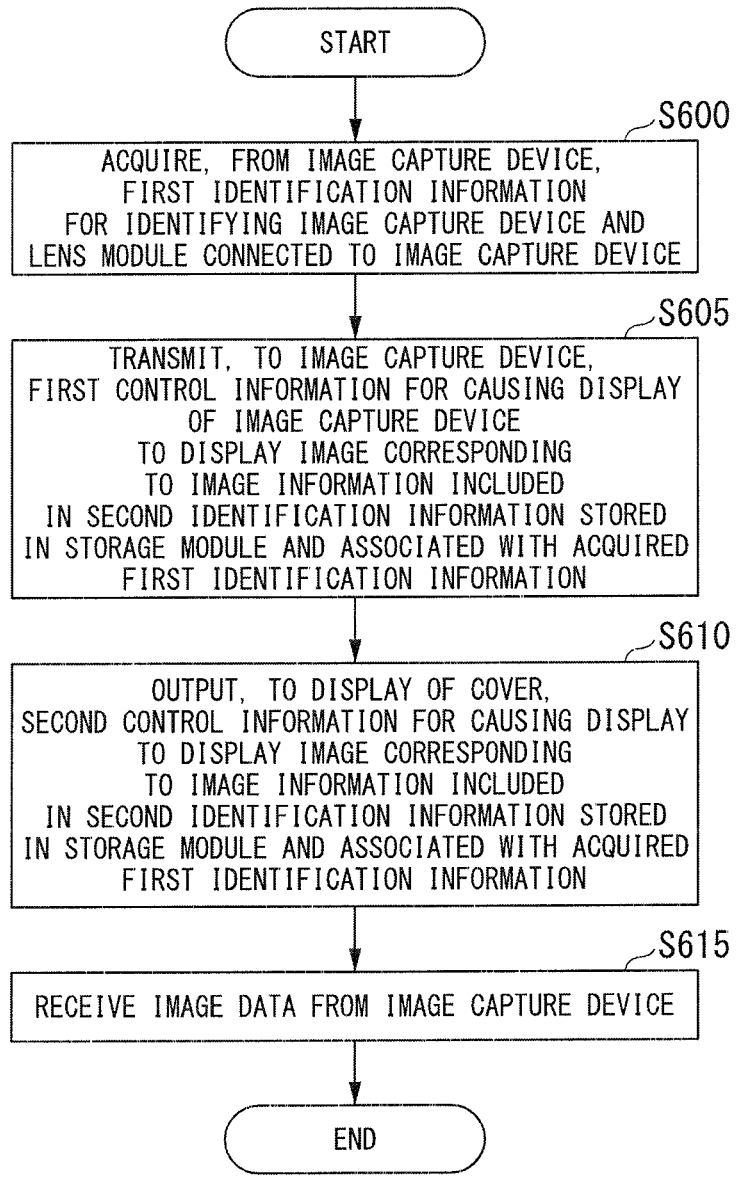
FIG. 18 is a flowchart showing an example of the flow of an operation of an image reception device according to a modified example of the fifth embodiment of the present invention.

FIG. 18 shows an example of the flow of an operation of the image reception device 21c. The operation of the image reception device 21c will be described with reference to FIG. 18.

The information acquisition unit 201 acquires first identification information which is used for identifying the image capture device 10c and the lens module 30c electrically connected to the image capture device 10c from the image capture device 10c (step S600). For example, the image capture device 10c includes an information generating unit that is used for identifying the type of a lens module to generate the first identification information based on the information thereof and the identified lens module information when the lens module is electrically connected thereto. For example, in step S600, the information acquisition unit 201 acquires the first identification information by receiving the first identification information from the image capture device 10c via the second communication module 202. The first communication module 102 of the image capture device 10c transmits the first identification information to the image reception device 20c when establishing communication connection with the image reception device 20c.

Since the processes of steps S605 to S615 are the same as the processes of steps S305 to S315 in FIG. 10, the description of the processes of steps S605 to S615 will not be provided.

The display 101c of the image capture device 10c displays an image corresponding to the second identification information based on the first control information received from the image reception device 20c. Moreover, the display 203c of the cover 40c displays an image corresponding to the second identification information based on the second control information. When the display 101c of the image capture device 10c and the display 203c of the cover 40c display the same image, the correspondence among the image capture device 10c, the lens module 30c electrically connected to the image capture device 10c, and the image reception device 20c can be identified.

In the present modified example, the image reception device 20c may include a determining unit that determines whether the lens module 30c electrically connected to the image capture device 10c has been replaced. A determination method may be the same as the determination method described above.

In the present modified example, although the display 101c of the image capture device 10c and the display 203c of the cover 40c display images, the display content is not limited to this. For example, the first display interface of the image capture device 10c and the second display interface electrically connected to the image reception device 21c may display colors, characters, symbols, figures, patterns, and the like.

By the same method as the present modified example, in the image capture systems shown in FIGS. 4, 7, and 11, the correspondence among the image capture device, the lens module electrically connected to the image capture device, and the image reception device may be identified.

In the present modified example, users can easily understand the correspondence among the image capture device 10c, the lens module 30c electrically connected to the image capture device 10c, and the image reception device 20c visually.

Sixth Embodiment

Next, a sixth embodiment of the present invention will be described. In the present embodiment, an example which uses the image capture system shown in FIG. 4 will be described. In the present embodiment, the image capture device 10a includes a storage module that stores image data.

In the present embodiment, the image capture device 10a includes a plurality of operation modes. The storage module 200 stores second identification information for each operation mode of the image capture device 10a. The second communication module 202 of the image reception device 20a transmits first control information which instructs the LED 101a of the image capture device 10a to display first information according to the operation mode of the image capture device 10a to the image capture device 10a. Moreover, the information output unit 204 of the image reception device 20a outputs second control information which instructs the display 203a of the image reception device 20a to display second information according to the operation mode of the image capture device 10a to the display 203a.

FIGS. 19A and 19B show examples of the first identification information and the second identification information stored in the storage module 200 of the image reception device 20a. The first identification information, the operation mode of the image capture device, and the second identification information are stored in the storage module 200 in a mutually correlated state. In the examples shown in FIGS. 19A and 19B, the first identification information is an ID (SSID) of an image capture device. Moreover, the operation mode of the image capture device is a capturing mode or a viewing mode.

The capturing mode is a mode in which the image reception device 20a receives the image data generated by the image capture device 10a in real time. The viewing mode is a mode in which the image reception device 20a receives the image data stored in the storage module of the image capture device 10a when image capture was performed by the image capture device 10a in the past. In the capturing mode or the viewing mode, an image may be displayed based on the image data received from the image capture device 10a. The capturing mode and the viewing mode are set to the image capture device 10a in an exclusive manner.

In the examples shown in FIGS. 19A and 19B, the second identification information is a combination of color information that designates lightness (brightness) of each color of RGB and pattern information which is used for identifying a pattern. Moreover, the pattern information is blinking or lighting.

In the example shown in FIG. 19A, red (0xff0000) is correlated with an image capture device ID (AP-1111). Moreover, green (0x00ff00) is correlated with an image capture device ID (AP-2222). In all image capture devices, blinking is correlated with the capturing mode as the pattern information, and lighting is correlated with the viewing mode as the pattern information.

Figure 20:
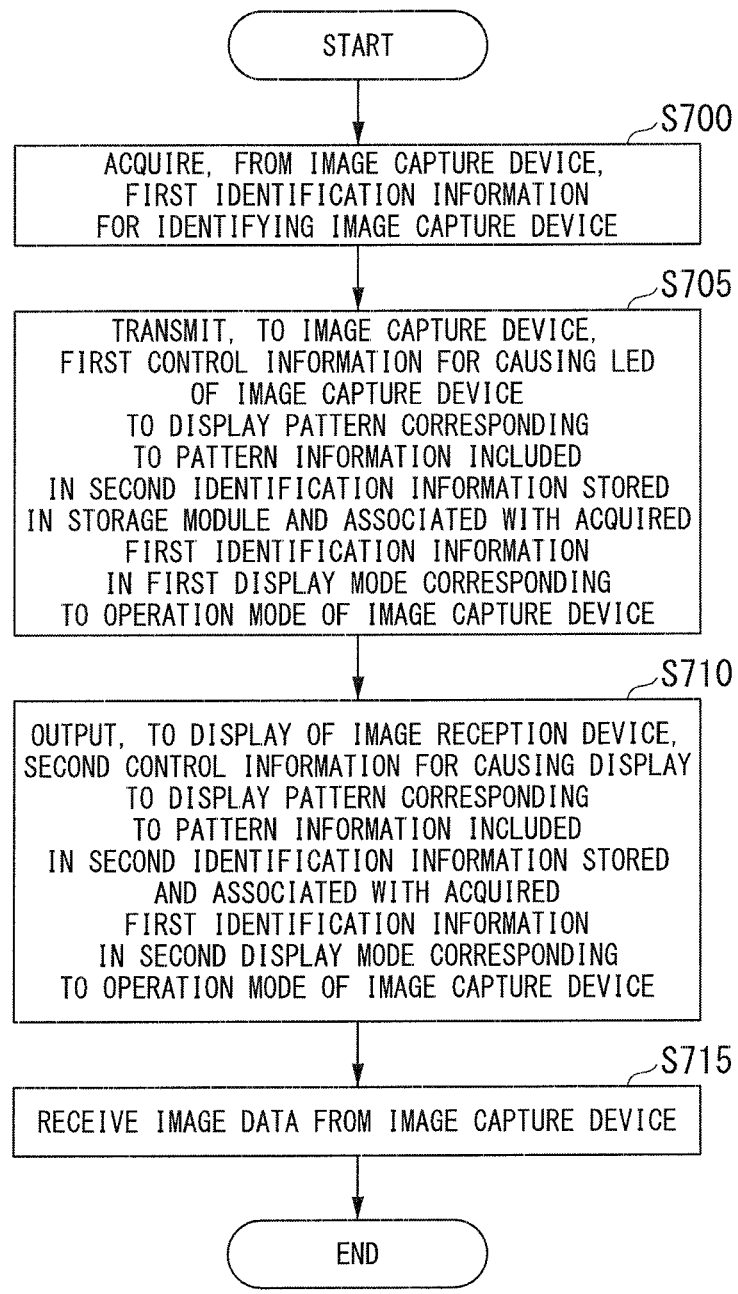
FIG. 20 is a flowchart showing an example of the flow of an operation of an image reception device according to the sixth embodiment of the present invention.

FIG. 20 shows an example of the flow of an operation of the image reception device 20a. The operation of the image reception device 20a will be described with reference to FIG. 20.

The information acquisition unit 201 acquires first identification information which is used for identifying the image capture device 10a from the image capture device 10a (step S700).

Subsequently, the second communication module 202 transmits first control information which instructs the LED 101a of the image capture device 10a, to the image capture device 10a (step S705). The first control information causes the LED 101a of the image capture device 10a to display a pattern corresponding to the pattern information included in the second identification information in a first display mode corresponding to the operation mode of the image capture device 10a. The second identification information is stored in the storage module 200 and associated with the first identification information acquired in step S700.

Subsequently, the information output unit 204 outputs the second control information which instructs the display 203a of the image reception device 20a, to the display 203a (step S710). The second control information causes the display 203a of the image reception device 20a to display a pattern corresponding to the pattern information included in the second identification information in a second display mode corresponding to the operation mode of the image capture device 10a. The second identification information is stored in the storage module 200 and associated with the first identification information acquired in step S700.

Subsequently, the second communication module 202 receives image data from the image capture device 10a (step S715). For example, in step S715, the image capture device 10a operates in the capturing mode or the viewing mode. For example, in step S715, the image data is image data used for displaying a live view image (moving image) for determining composition or image data generated when image capture was performed by the image capture device 10a in the past.

For example, when the image reception device 20a can remotely control the image capture device 10a, the image reception device 20a transmits an operation mode setting command to the image capture device 10a and stores the information on the configured operation mode in the storage module 200 when the operation mode of the image capture device 10a is set for initialization or changed. For example, the information acquisition unit 201 acquires the second identification information and display mode information from the storage module 200 by referring to the operation mode information. The second identification information and the display mode information correspond to a combination of the first identification information of the image capture device 10a acquired in step S700 and the present operation mode of the image capture device 10a. The first control information is generated based on the acquired second identification information and display mode information and is transmitted to the image capture device 10a in step S705. Moreover, the second control information is generated based on the acquired second identification information and display mode information and is output to the display 203a in step S710.

The LED 101a of the image capture device 10a displays a color corresponding to the color information included in the second identification information in a first display mode corresponding to the operation mode of the image capture device 10a based on the first control information received from the image reception device 20a. Moreover, the display 203a of the image reception device 20a displays a color corresponding to the color information included in the second identification information in a second display mode corresponding to the operation mode of the image capture device 10a based on the second control information. For example, when the operation mode of the image capture device 10a is the capturing mode, the LED 101a of the image capture device 10a and the display 203a of the image reception device 20a blink the same color. Moreover, the operation mode of the image capture device 10a is the viewing mode, the LED 101a of the image capture device 10a and the display 203a of the image reception device 20a emit light of the same color continuously.

When the LED 101a of the image capture device 10a and the display 203a of the image reception device 20a display the same color, the correspondence between the image capture device 10a and the image reception device 20a can be identified. Moreover, when the display mode of the color displayed by the LED 101a of the image capture device 10a and the display 203a of the image reception device 20a is changed according to the operation mode of the image capture device 10a, the operation mode of the image capture device 10a can be identified.

In the present embodiment, although the pattern information is different for respective operation modes of the image capture device 10a, the color information may be different for respective operation modes of the image capture device 10a. For example, different items of color information may be used in the capturing mode and the viewing mode, and the same pattern information may be used for the same image capture device 10a regardless of the operation mode.

In the example shown in FIG. 19B, blinking is correlated with the image capture device ID (AP-1111) as the pattern information. Moreover, lighting is correlated with the image capture device ID (AP-2222) as the pattern information. In all image capture devices, red (0xff0000) is correlated with the capturing mode as the color information and green (0x00ff00) is correlated with the viewing mode as the color information.

For example, when the operation mode of the image capture device 10a is the capturing mode, the LED 101a of the image capture device 10a and the display 203a of the image reception device 20a display a first color. Moreover, when the operation mode of the image capture device 10a is the viewing mode, the LED 101a of the image capture device 10a and the display 203a of the image reception device 20a display a second color different from the first color. For example, light of the first color or the second color blinks for the combination of a first image capture device and the image reception device 20a, and light of the first color or the second color is lit for a combination of a second image capture device different from the first image capture device and the image reception device 20a.

In the present embodiment, although the LED 101a of the image capture device 10a and the display 203a of the image reception device 20a display colors, the display content is not limited to this. For example, the first display interface of the image capture device 10a and the second display interface of the image reception device 20a may display images, characters, symbols, figures, patterns, and the like.

In the present embodiment, it has been described that the image reception device 20a includes the second display interface 203 (the display 203a). However, similarly to the image capture system shown in FIG. 2, the image reception device 20a may not include the second display interface 203 but the second display interface 203 may be electrically connected to the image reception device 20a.

In the present embodiment, although the first identification information is information which is used for identifying the image capture device 10a, the first identification information may be information which is used for identifying a lens module electrically connected to the image capture device 10a.

In the present embodiment, users can easily understand the correspondence between the image capture device 10a and the image reception device 20a visually. Moreover, users can easily understand the operation mode of the image capture device 10a visually. For example, users can understand whether the image capture device 10a operates in a desired operation mode. Moreover, for example, when the image capture device 10a operates in the capturing mode and performs display in a blinking mode, a third party near the image capture device 10a can understand that the image capture is performed.

Seventh Embodiment

Figure 21:
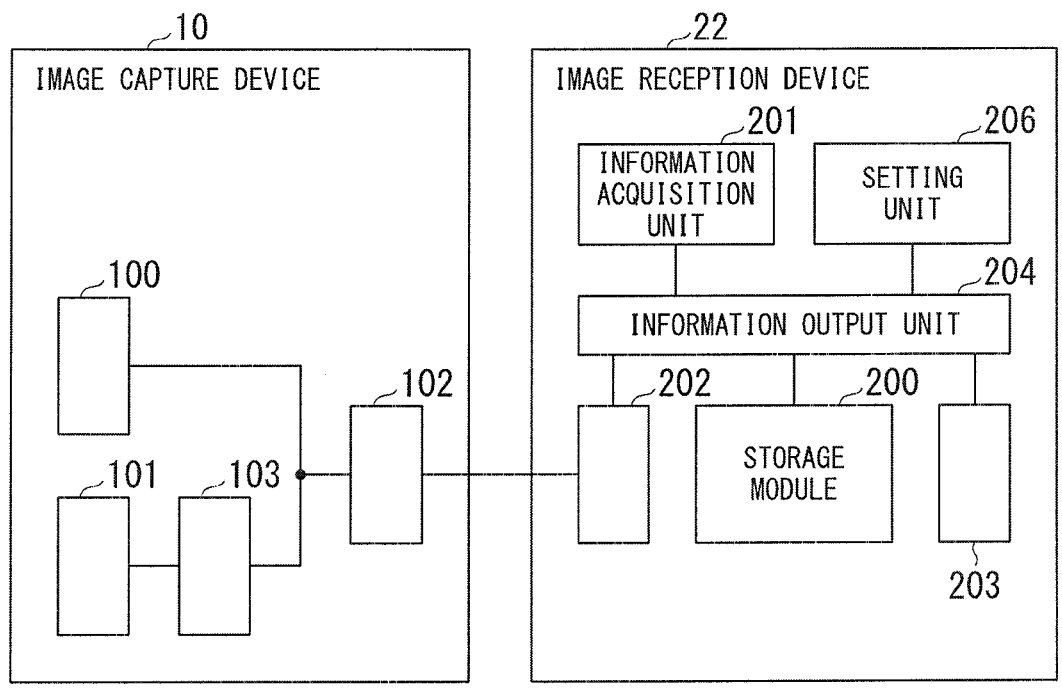
FIG. 21 is a block diagram showing a configuration example of an image capture system according to a seventh embodiment of the present invention.

Next, a seventh embodiment of the present invention will be described. FIG. 21 shows a configuration example of an image capture system according to the present embodiment. The image capture system shown in FIG. 21 includes an image capture device 10 and an image reception device 22. Although FIG. 21 shows one image capture device 10 and one image reception device 22, the image capture system may include two or more image capture devices 10 or two or more image reception devices 22. Since the configuration of the image capture device 10 has been described already, the description thereof will not be provided here.

The image reception device 22 includes a storage module 200, an information acquisition unit 201, a second communication module 202, an information output unit 204, and a setting unit 206. A description of the configurations described earlier will not be provided here. The setting unit 206 causes second identification information different from the second identification information stored in the storage module 200 and associated with the first identification information to be stored in the storage module 200 and associated with the first identification information acquired by the information acquisition unit 201.

In the present embodiment, the information output unit 204 outputs configuration screen information which instructs the second display interface 203 to display a configuration screen to the second display interface 203. The configuration screen includes a plurality of items of second identification information different from the second identification information stored in the storage module 200 and associated with the first identification information. After the second display interface 203 displays the configuration screen, the setting unit 206 selects second identification information based on a select instruction to select any one of the plurality of items of second identification information displayed on the configuration screen. Subsequently, the setting unit 206 causes the selected second identification information to be stored in the storage module 200 and associated with the first identification information acquired by the information acquisition unit 201.

In the present embodiment, an example in which the image capture device 10 includes an LED capable of emitting light of multiple colors as the first display interface 101 will be described. Moreover, in the present embodiment, an example in which the image reception device 22 includes a display as the second display interface 203 will be described. When the LED of the image capture device 10 and the display of the image reception device 22 display the same color, the correspondence between the image capture device 10 and the image reception device 22 is identified.

Figure 22:
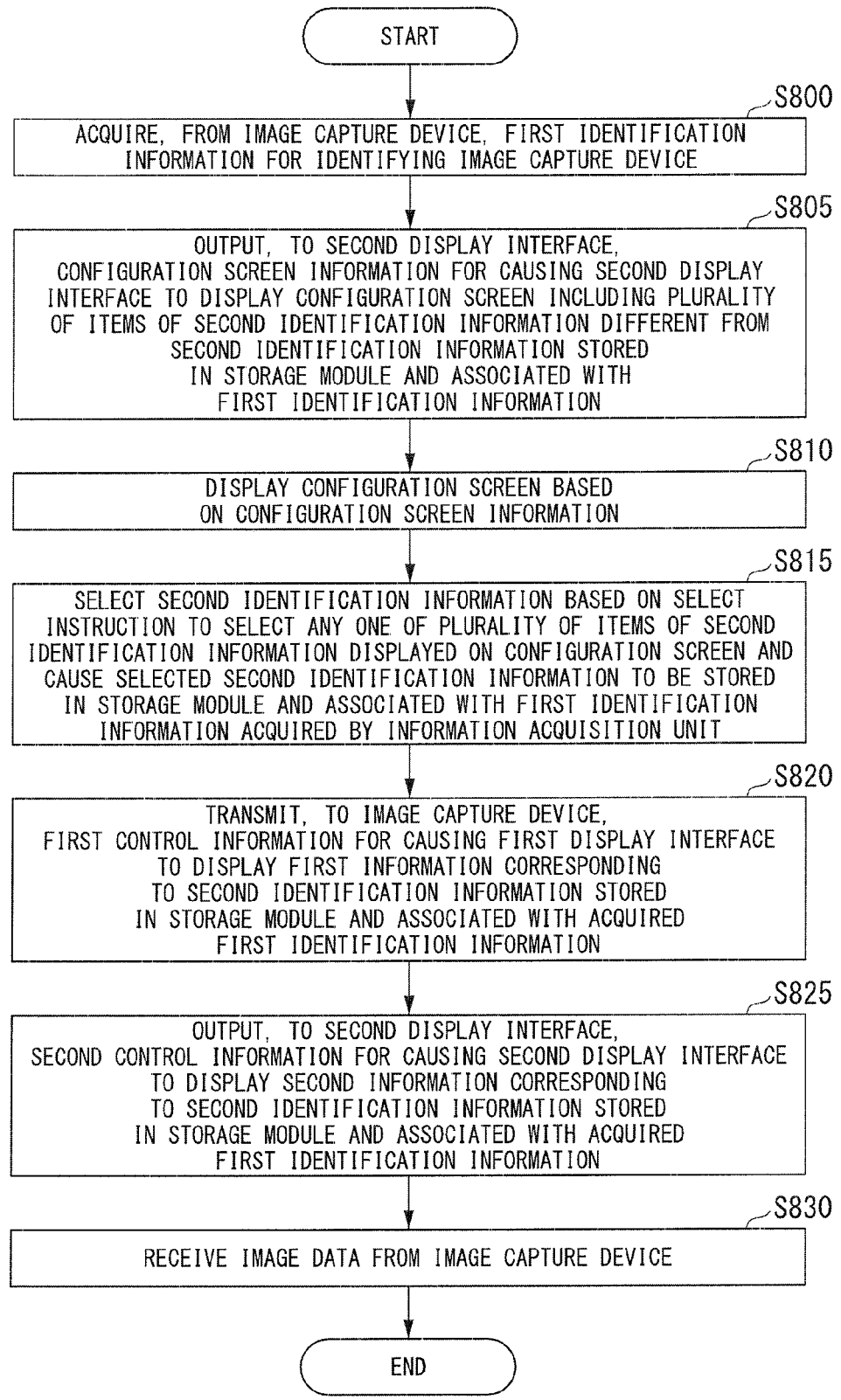
FIG. 22 is a flowchart showing an example of the flow of an operation of an image reception device according to the seventh embodiment of the present invention.

FIG. 22 shows an example of the flow of an operation of the image reception device 22. The operation of the image reception device 22 will be described with reference to FIG. 22.

The information acquisition unit 201 acquires first identification information which is used for identifying the image capture device 10 from the image capture device 10 (step S800).

Subsequently, the information output unit 204 outputs configuration screen information which instructs the second display interface 203 to display a configuration screen to the second display interface 203 (step S805). The configuration screen includes a plurality of items of second identification information different from the second identification information stored in the storage module 200 and associated with the first identification information.

Subsequently, the second display interface 203 displays the configuration screen based on the configuration screen information (step S810).

Figure 23:
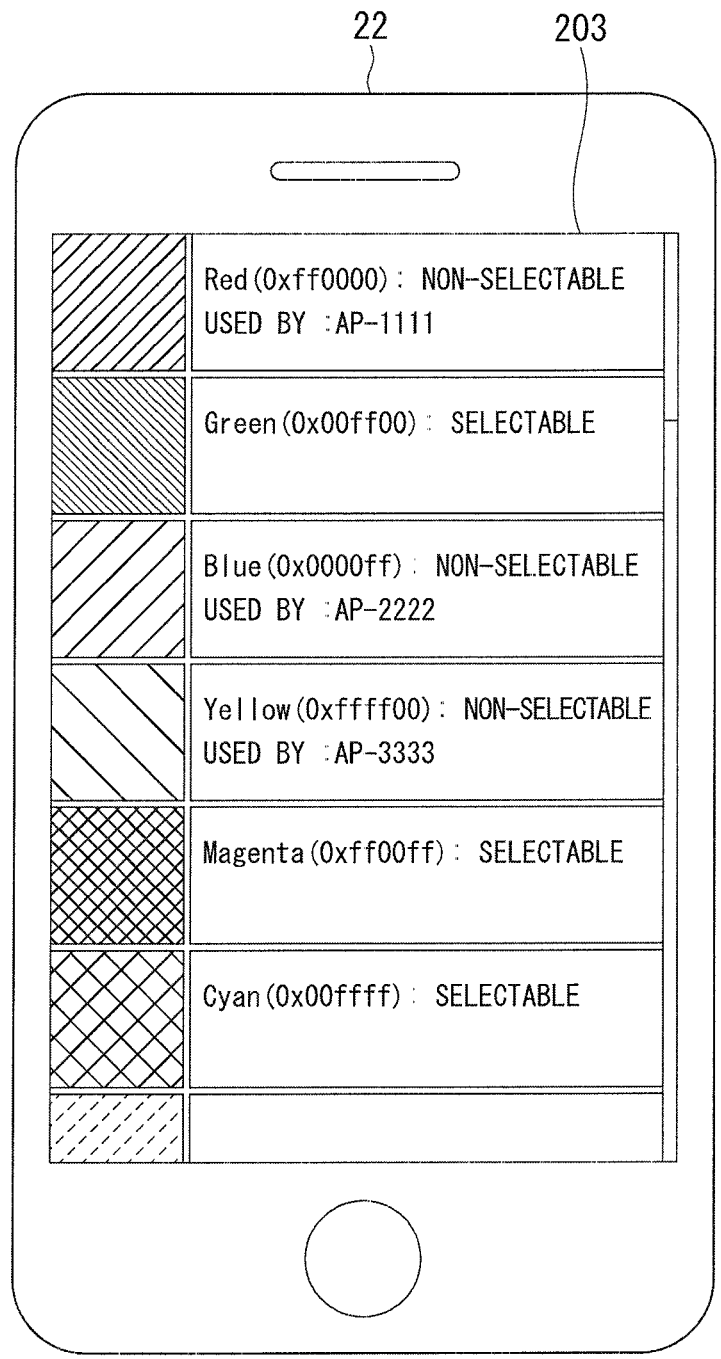
FIG. 23 is a reference diagram showing an example of a configuration screen displayed on a second display interface in the seventh embodiment of the present invention.

FIG. 23 shows an example of the configuration screen displayed on the second display interface 203. A plurality of items of second identification information indicating the colors that the image capture device 10 can use is displayed on the configuration screen. The respective items of second identification information are displayed and associated with information indicating whether the information can be selected. When the second identification information that the image capture device 10 can use is not stored in the storage module 200 and associated with the first identification information of another image capture device 10, information indicating that the information can be selected is displayed. Moreover, when the second identification information that the image capture device 10 can use is stored in the storage module 200 and associated with the first identification information of another image capture device 10, information indicating that the information cannot be selected is displayed. In FIG. 23, although the second identification information that cannot be selected is displayed on the configuration screen together with the second identification information that can be selected, only the second identification information that can be selected may be displayed on the configuration screen.

For example, the image capture device 10 includes a storage module that stores second identification information indicating the colors that the image capture device 10 can use. The second communication module 202 receives the second identification information stored in the storage module of the image capture device 10 from the image capture device 10 when establishing communication connection with the image capture device 10. In step S800, the information acquisition unit 201 receives the second identification information that the second communication module 202 has received from the image capture device 10 from the second communication module 202.

The information output unit 204 compares the second identification information acquired by the information acquisition unit 201 with the second identification information stored in the storage module 200 and associated with the first identification information. When the second identification information acquired by the information acquisition unit 201 is not identical to any one of the items of second identification information stored in the storage module 200 and associated with the first identification information, the information output unit 204 correlates the second identification information acquired by the information acquisition unit 201 with information indicating that the information can be set. Moreover, when the second identification information acquired by the information acquisition unit 201 is identical to any one of the items of second identification information stored in the storage module 200 and associated with the first identification information, the information output unit 204 correlates the second identification information acquired by the information acquisition unit 201 with information indicating that the information cannot be set. In step S805, the information output unit 204 outputs, to the second display interface 203, configuration screen information which instructs the second display interface 203 to display the second identification information associated with information indicating that the information can be set or cannot be set on a configuration screen After the configuration screen is displayed, the setting unit 206 selects the second identification information based on a select instruction to select any one of the plurality of items of second identification information displayed on the configuration screen. Subsequently, the setting unit 206 causes the selected second identification information to be stored in the storage module 200 and associated with the first identification information acquired by the information acquisition unit 201 (step S815). For example, a user inputs a select instruction to select any one of the items of second identification information displayed on the configuration screen to the image reception device 22. The select instruction includes information that designates the second identification information desired by the user. Designating the second identification information correlated with the information indicating that the information cannot be set is inhibited. In step S815, the setting unit 206 selects the second identification information designated by the select instruction.

After the second identification information is stored in the storage module 200, the processes of steps S820 to S830 are performed. Since the processes of steps S820 to S830 are the same as the processes of steps S205 to S215 of FIG. 6, a description of the processes of steps S820 to S830 will not be provided here.

The second identification information displayed on the configuration screen may be information other than the color information. For example, second identification information on images, characters, symbols, figures, patterns, and the like may be displayed on the configuration screen.

In the present embodiment, it has been described that the image reception device 22 includes the second display interface 203. However, similarly to the image capture system shown in FIG. 2, the image reception device 22 may not include the second display interface 203 but the second display interface 203 may be electrically connected to the image reception device 22.

In the present embodiment, although the first identification information is information which is used for identifying the image capture device 10, the first identification information may be information which is used for identifying a lens module electrically connected to the image capture device 10.

In the present embodiment, users can easily understand the correspondence between the image capture device 10 and the image reception device 22 visually. Moreover, the second identification information can be allocated to a new image capture device 10 to which the image reception device 22 has never been connected by communication. That is, the storage module 200 of the image reception device 22 does not need to store the second identification information corresponding to all image capture devices 10 to which the image reception device 22 can connect by communication. Due to this, it is possible to reduce a storage volume necessary for storing the second identification information.

Moreover, by setting the items of second identification information allocated to the image capture devices 10 so as not to overlap, it is possible to set the second identification information so that different image capture devices 10 can be identified reliably. Further, by displaying the configuration screen including items of second identification information and allocating the second identification information selected from the items of second identification information displayed on the configuration screen to the image capture device 10, the user can select the second identification information.

Eighth Embodiment

Next, an eighth embodiment of the present invention will be described. In the present embodiment, an example which uses the image capture system shown in FIG. 4 will be described. In the present embodiment, an example in which the image capture device 10a and the lens module 30a are used as a set will be described. That is, the correspondence of electrical connection between the image capture device 10a and the lens module 30a is identified in advance.

In the present embodiment, a plurality of image capture devices 10a are used, and one image reception device 20a is connected to the plurality of image capture devices 10a simultaneously by communication. For example, the image reception device 20a includes a plurality of second communication modules 202, and the respective second communication modules 202 are connected to different image capture devices 10a by communication. In this case, the plurality of second communication modules 202 receive image data from the image capture devices 10a to which the respective communication modules are connected by communication.

Only one image capture device 10a among the plurality of image capture devices 10a communicates directly with the image reception device 20a. The other image capture devices 10a may communicate with the image reception device 20a via the image capture device 10a that communicates directly with the image reception device 20a so that the plurality of image capture devices 10a and the image reception device 20a are connected by communication. In this case, for example, one image capture device 10a that communicates directly with the image reception device 20a integrates the image data received from the other image capture devices 10a and the image data generated by itself into one item of image data and transmits the integrated image data to the image reception device 20a. One image capture device 10a that communicates directly with the image reception device 20a may transmit the image data received from the other image capture devices 10a and the image data generated by itself to the image reception device 20a in a time-multiplexed manner.

Since the flow of an operation of the image reception device 20a is substantially the same as the flow shown in FIG. 6, the description of the flow of the operation of the image reception device 20a except for step S200 will not be provided.

In step S200, the information acquisition unit 201 acquires a plurality of items of first identification information corresponding to the plurality of image capture devices 10a from the image capture device 10a. When the image reception device 20a is connected to N (N≥2) image capture devices 10a by communication, N items of first identification information are acquired. For example, when the image reception device 20a includes a plurality of second communication modules 202, the information acquisition unit 201 acquires the plurality of items of first identification information from the plurality of image capture devices 10a via the second communication modules 202. Moreover, for example, when only one image capture device 10a of the plurality of image capture devices 10a communicates directly with the image reception device 20a, the first communication module 102 of the image capture device 10a connected to the image reception device 20a by communication receives the first identification information which is used for identifying the other image capture devices 10a from the other image capture devices 10a. Subsequently, the image capture device 10a transmits the first identification information thereof and the first identification information received from the other image capture devices 10a to the image reception device 20a. The information acquisition unit 201 acquires a plurality of items of first identification information from one image capture device 10a via the second communication module 202.

Figure 24:
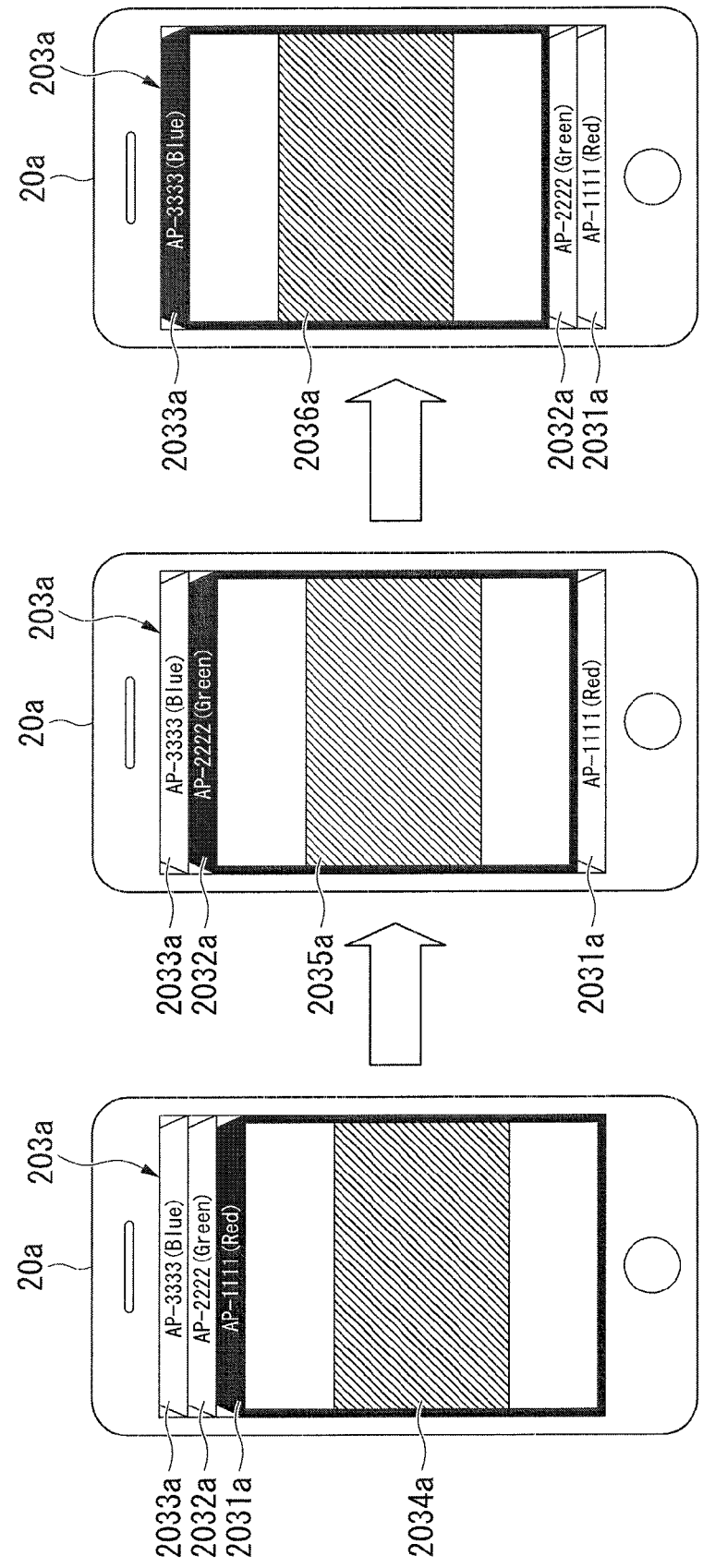
FIG. 24 is a reference diagram showing an example of a screen displayed on a display of an image reception device according to an eighth embodiment of the present invention.

FIG. 24 shows an example of a screen displayed on the display 203a of the image reception device 20a. In the display 203a, title bars 2031a, 2032a, and 2033a are displayed in colors corresponding to the color information included in the second identification information. Moreover, the items of first identification information of three image capture devices 10a are displayed in the title bars 2031a, 2032a, and 2033a. The display 203a is a touch panel and users can input operations via the touch panel.

In the state shown on the leftmost side of FIG. 24, a screen indicated by the title bar 2031a is displayed on the front-most side. In this screen, an image 2034a based on the image data received from the image capture device 10a of which the first identification information (ID) is AP-1111 is displayed. In this case, when a user clicks on the title bar 2032a, the state of the display 203a changes to a state shown in the center of FIG. 24. In this state, a screen indicated by the title bar 2032a is displayed on the front-most side. In this screen, an image 2035a based on the image data received from the image capture device 10a of which the first identification information (ID) is AP-2222 is displayed. In this state, when a user clicks on the title bar 2033a, the state of the display 203a changes to a state shown on the rightmost side of FIG. 24. In this state, the screen indicated by the title bar 2033a is displayed on the front-most side. In this screen, an image 2036a based on the image data received from the image capture device 10a of which the first identification information (ID) is AP-3333 is displayed.

An image received from the image capture device 10a may not be displayed but a title bar only may be displayed. Moreover, the screen displayed on the display 203a may be divided into a plurality of regions, and the images received from the plurality of image capture devices 10a may be displayed in the divided regions.

In the present embodiment, although the LED 101a of the image capture device 10a and the display 203a of the image reception device 20a display colors, the display content is not limited to this. For example, the first display interface of the image capture device 10a and the second display interface of the image reception device 20a may display images, characters, symbols, figures, patterns, and the like.

In the present embodiment, it has been described that the image reception device 20a includes the second display interface 203 (the display 203a). However, similarly to the image capture system shown in FIG. 2, the image reception device 20a may not include the second display interface 203 but the second display interface 203 may be electrically connected to the image reception device 20a.

In the present embodiment, although the first identification information is information which is used for identifying the image capture device 10a, the first identification information may be information which is used for identifying a lens module electrically connected to the image capture device 10a.

In the present embodiment, users can easily understand the correspondence between the image capture device 10a and the image reception device 20a visually. In particular, when the image reception device 20a is connected to a plurality of image capture devices 10a by communication, users can easily understand the correspondence between the plurality of image capture devices 10a and the image reception device 20a visually.

Ninth Embodiment

Figure 25:
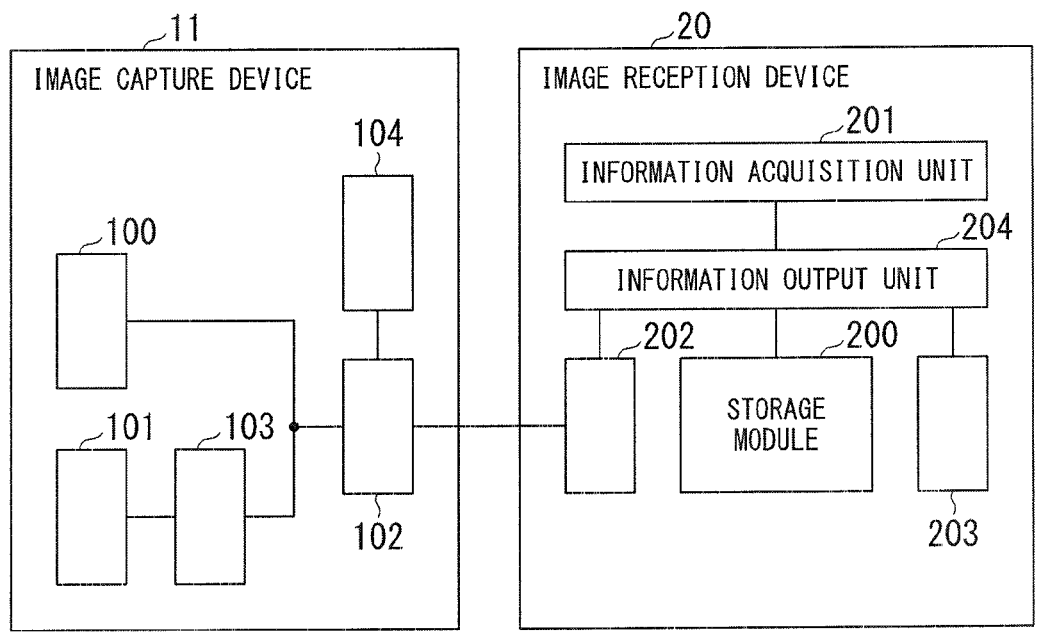
FIG. 25 is a block diagram showing a configuration example of an image capture system according to a ninth embodiment of the present invention.

Next, a ninth embodiment of the present invention will be described. FIG. 25 shows a configuration example of an image capture system according to the present embodiment. The image capture system shown in FIG. 25 includes an image capture device 11 and an image reception device 20. In the present embodiment, an example in which a plurality of image reception devices 20 are connected to one image capture device 11 by communication will be described. Since the configuration of the image reception device 20 has been described already, a description thereof will not be provided here.

The image capture device 10 includes an image capture module 100, a first display interface 101, a first communication module 102, a display control unit 103, and an information allocating unit 104. A description of the configurations which have been described already will not be provided here. The information allocating unit 104 allocates different items of second identification information to the plurality of image reception devices 20. The first communication module 102 transmits the items of second identification information allocated by the information allocating unit 104 to the plurality of image reception devices 20.

Hereinafter, an example of the image capture system shown in FIG. 26 will be described. The image capture system shown in FIG. 26 includes an image capture device 11e and image reception devices 20e1, 20e2, 20e3, and 20e4.

A lens module 30e is electrically connected to the image capture device 11e. Four LEDs 101e are allocated on a surface of the image capture device 11e. The four LEDs 101e are light emitting elements capable of emitting light of a single color. For example, the colors emitted by the four LEDs 101e are red, green, blue, and white. The LED 101e corresponds to the first display interface 101 shown in FIG. 1. In addition to the LED 101e, the image capture device 11e further includes the image capture module 100, the first communication module 102, the display control unit 103, and the information allocating unit 104 shown in FIG. 25. As many as four image reception devices can be connected to the image capture device 11e by communication.

The image reception devices 20e1, 20e2, 20e3, and 20e4 are portable terminals such as a smartphone. A display 203e1 is allocated on a surface of the image reception device 20e1. The same color as any one of the four colors displayed by the LED 101e is displayed in a region 2030e1 of the display 203e1. For example, the region 2030e1 is a title bar of an application. An image based on the image data received from the image capture device 11e is displayed in a region 2031e1 of the display 203e1. The display 203e1 corresponds to the second display interface 203 shown in FIG. 1. In addition to the display 203e1, the image reception device 20e1 further includes the storage module 200, the information acquisition unit 201, the second communication module 202, and the information output unit 204 shown in FIG. 25.

A display 203e2 is allocated on a surface of the image reception device 20e2. The same color as any one of the four colors displayed by the LED 101e is displayed in a region 2030e2 of the display 203e2. For example, the region 2030e2 is a title bar of an application. An image based on the image data received from the image capture device 11e is displayed in a region 2031e2 of the display 203e2. The display 203e2 corresponds to the second display interface 203 shown in FIG. 1. In addition to the display 203e2, the image reception device 20e2 further includes the storage module 200, the information acquisition unit 201, the second communication module 202, and the information output unit 204 shown in FIG. 25.

A cover 40e3 having the same function as the cover 40b is attached to the image reception device 20e3. An LED 203e3 is allocated on a surface of the cover 40e3. The LED 203e3 displays the same color as any one of the four colors displayed by the LED 101e. The LED 203e3 corresponds to the second display interface 203 shown in FIG. 1. A display 204e3 is allocated on a surface of the image reception device 20e3. An image based on the image data received from the image capture device 11e is displayed in a region 2040e3 of the display 204e3. In addition to the LED 203e3 and the display 204e3, the image reception device 20e3 further includes the storage module 200, the information acquisition unit 201, the second communication module 202, and the information output unit 204 shown in FIG. 25.

An LED 203e4 is allocated in an end of the image reception device 20e4. The LED 203e4 displays the same color as any one of the four colors displayed by the LED 101e. The LED 203e4 corresponds to the second display interface 203 shown in FIG. 1. A display 204e4 is allocated on a surface of the image reception device 20e4. An image based on the image data received from the image capture device 11e is displayed in a region 2040e4 of the display 204e4. In addition to the LED 203e4 and the display 204e4, the image reception device 20e4 further includes the storage module 200, the information acquisition unit 201, the second communication module 202, and the information output unit 204 shown in FIG. 25.

The region 2030e1 of the display 203e1, the region 2030e2 of the display 203e2, the LED 203e3, and the LED 203e4 display different colors.

When the LED 101e of the image capture device 11e and the second display interfaces (the region 2030e1 of the display 203e1, the region 2030e2 of the display 203e2, the LED 203e3, and the LED 203e4) corresponding to the image reception devices 20e1, 20e2, 20e3, and 20e4 display the same color, the correspondence between the image capture device 11e and the image reception devices 20e1, 20e2, 20e3, and 20e4 can be identified. The light of the four colors may not be lit simultaneously and the light of respective colors may be lit sequentially in a time-multiplexed manner.

Figure 27:
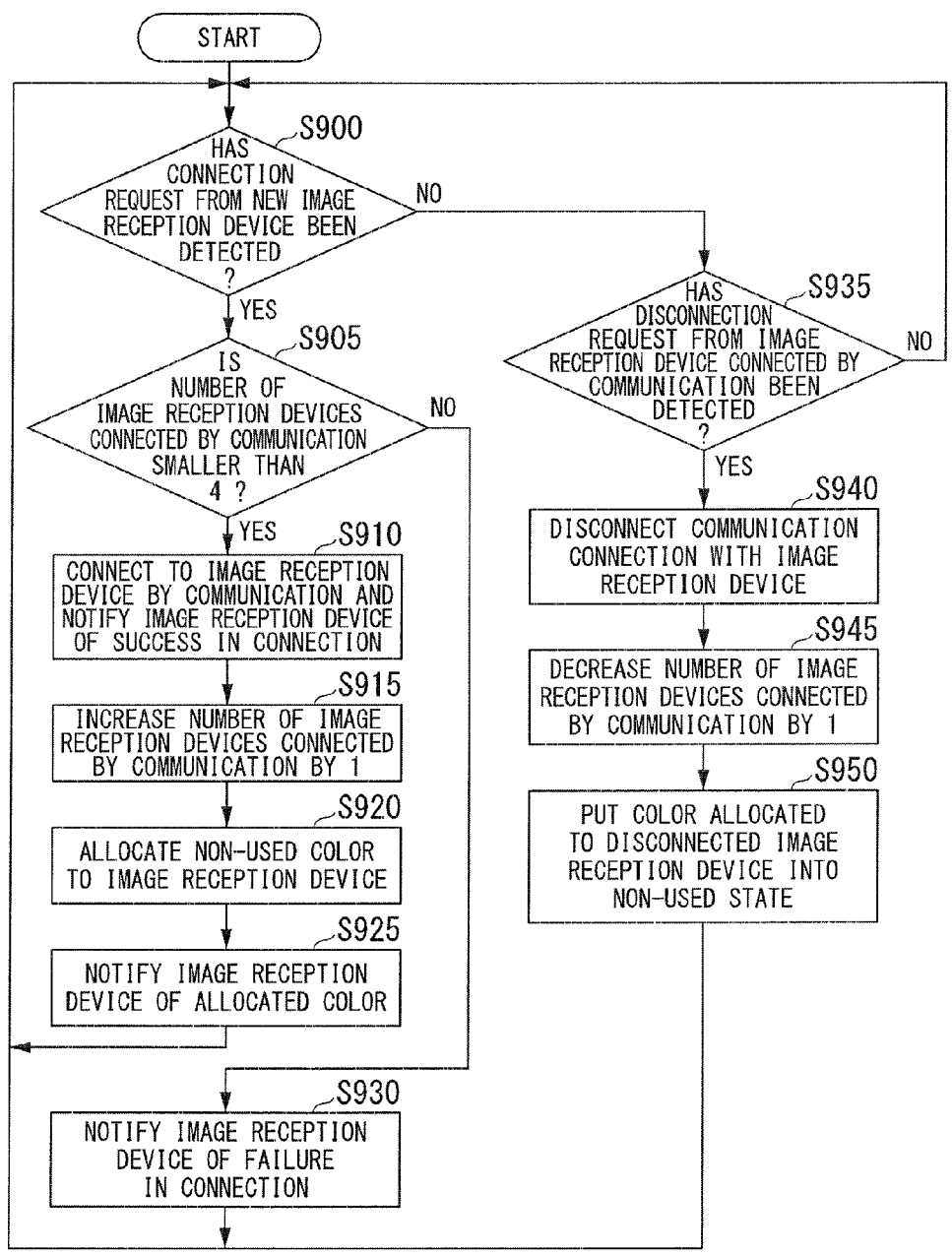
FIG. 27 is a flowchart showing an example of the flow of an operation of an image capture device according to the ninth embodiment of the present invention.

FIG. 27 shows an example of the flow of an operation of the image capture device 11e. The operation of the image capture device 11e relating to allocation of colors to the image reception device will be described with reference to FIG. 27.

When the first communication module 102 detects a connection request (Step S900) by receiving the connection request from a new image reception device different from an image reception device connected by communication and the number of image reception devices connected by communication is smaller than 4 (step S905), the first communication module 102 connects (establishes communication connection with) to the image reception device that has transmitted the connection request by communication and notifies the image reception device of success in connection (step S910). Subsequently, the image capture device 11e increases the number of image reception devices connected by communication by 1 (step S915). The initial value of the number of image reception devices connected by communication immediately after the process starts is 0.

Subsequently, the information allocating unit 104 allocates a color that has not been used to the image reception device connected by communication in step S910. Further, the information allocating unit 104 generates second identification information including color information corresponding to the allocated color (step S920). For example, the image capture device 11e includes a storage module. The information allocating unit 104 causes the second identification information generated in step S920 to be stored in the storage module and associated with the identification information of the image reception device.

Subsequently, the first communication module 102 notifies the image reception device of the allocated color by transmitting the second identification information generated by the information allocating unit 104 to the image reception device connected by communication in step S910 (step S925). Subsequently, a connection request detection operation is performed (step S900) and the process continues.

When the connection request is detected (step S900) and the number of image reception devices connected by communication is 4 (step S905), the first communication module 102 notifies the image reception device that has transmitted the connection request of failure in connection (step S930). Communication connection with this image reception device is not established. Subsequently, a connection request detection operation is performed (step S900) and the process continues.

When the first communication module 102 detects a disconnection request by receiving the disconnection request from the image reception device connected by communication (step S935) rather than receiving a connection request from a new image reception device different from the image reception device connected by communication (step S900), the first communication module 102 disconnects the communication connection with the image reception device connected by communication (step S940).

Subsequently, the image capture device 11e decreases the number of image reception devices connected by communication by 1 (step S945). Subsequently, the information allocating unit 104 puts the color allocated to the image reception device of which the communication connection is disconnected in step S940 into a non-use state (step S950). For example, in step S950, the information allocating unit 104 deletes the identification information of the image reception device of which the communication connection is disconnected and the second identification information corresponding to the allocated color from the storage module. In step S950, the information allocating unit 104 may delete the identification information of the image reception device of which the communication connection is disconnected from the storage module and may add a flag indicating a non-use state to the second identification information corresponding to the allocated color. Subsequently, a connection request detection operation is performed (step S900) and the process continues.

When neither the connection request nor the disconnection request is detected (step S900 and S935), a connection request detection operation is performed again (step S900) and the process continues.

Since the flow of an operation of the image reception devices 20e1, 20e2, 20e3, and 20e4 is substantially the same as the flow shown in FIG. 6, the description of the flow of the operation of the image reception devices 20e1, 20e2, 20e3, and 20e4 will not be provided.

Figure 26:
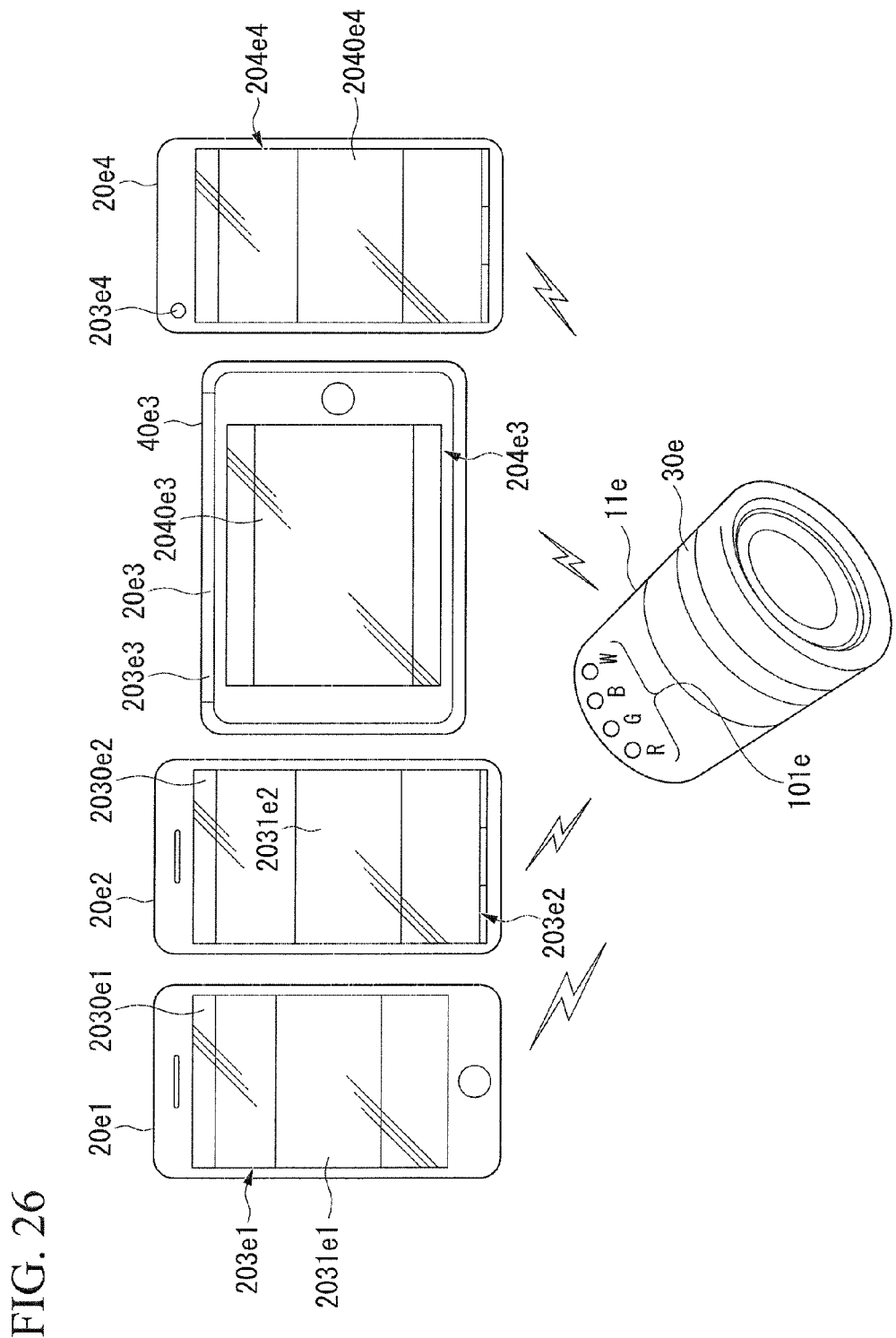
FIG. 26 is an external view showing a configuration example of the image capture system according to the ninth embodiment of the present invention.

In the image capture system shown in FIG. 26, although the LED 101e of the image capture device 11e and the second display interfaces corresponding to the image reception devices 20e1, 20e2, 20e3, and 20e4 display colors, the display content is not limited to this. For example, the first display interface of the image capture device 11e and the second display interfaces corresponding to the image reception devices 20e1, 20e2, 20e3, and 20e4 may display images, characters, symbols, figures, patterns, and the like.

In the present embodiment, although the first identification information is information which is used for identifying the image capture device 11, the first identification information may be information which is used for identifying a lens module electrically connected to the image capture device 11.

In the present embodiment, users can easily understand the correspondence between the image capture device 11 and the image reception device 20 visually. In particular, when a plurality of image reception devices 20 is connected to the image capture device 11 by communication, users can easily understand the correspondence between the image capture device 11 and the plurality of image reception devices 20 visually.

Moreover, since different items of second identification information are allocated to the plurality of image reception devices 20, it is possible to identify different image reception devices 20 reliably.

Tenth Embodiment

Figure 28:
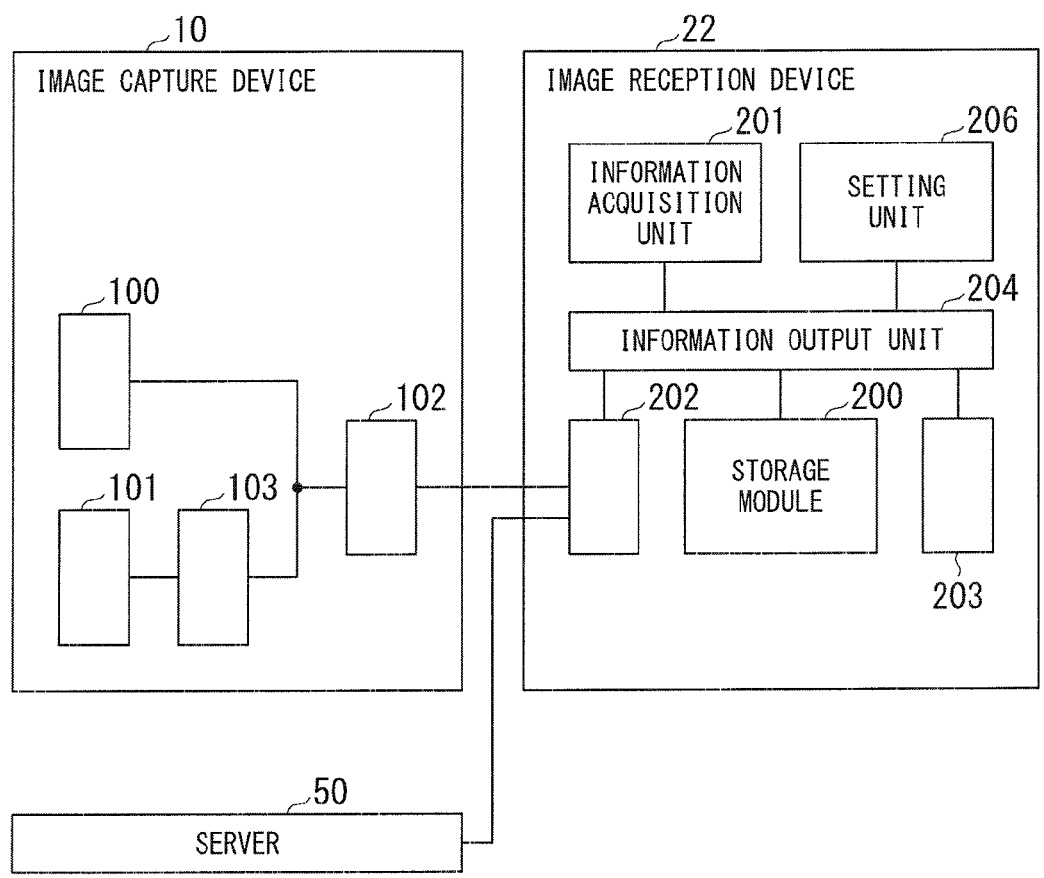
FIG. 28 is a block diagram showing a configuration example of an image capture system according to a tenth embodiment of the present invention.

Next, a tenth embodiment of the present invention will be described. FIG. 28 shows a configuration example of an image capture system according to the present embodiment. The image capture system shown in FIG. 28 includes an image capture device 10, an image reception device 22, and a server 50. Although FIG. 28 shows one image capture device 10 and one image reception device 22, the image capture system may include two or more image capture devices 10 or two or more image reception devices 22. Since the configuration of the image capture device 10 has been described already, the description thereof will not be provided. Moreover, since the configuration of the image reception device 22 has been described already, the description thereof will not be provided here. The server 50 stores second identification information which is used for identifying display content.

The image reception device 22 of the present embodiment includes a setting unit 206 that causes the first identification information and the second identification information to be stored in the storage module 200. The second communication module 202 of the image reception device 22 transmits request information indicating a request for second identification information to the server 50 that stores the second identification information and receives the second identification information from the server 50 which received the request information. The setting unit 206 of the image reception device 22 causes the second identification information received by the second communication module 202 to be stored in the storage module 200 and associated with the first identification information acquired by the information acquisition unit 201.

Moreover, in the present embodiment, the information acquisition unit 201 of the image reception device 22 acquires position information. The second communication module 202 of the image reception device 22 transmits the request information and the position information to the server 50 and receives second identification information corresponding to the position information from the server 50 which received the request information.

For example, the information acquisition unit 201 is a Global Positioning System (GPS) receiver capable of measuring positions autonomously. The information acquisition unit 201 may communicate with surrounding devices via the second communication module 202 to acquire the position information of the image reception device 22 from the surrounding devices.

Figure 29:
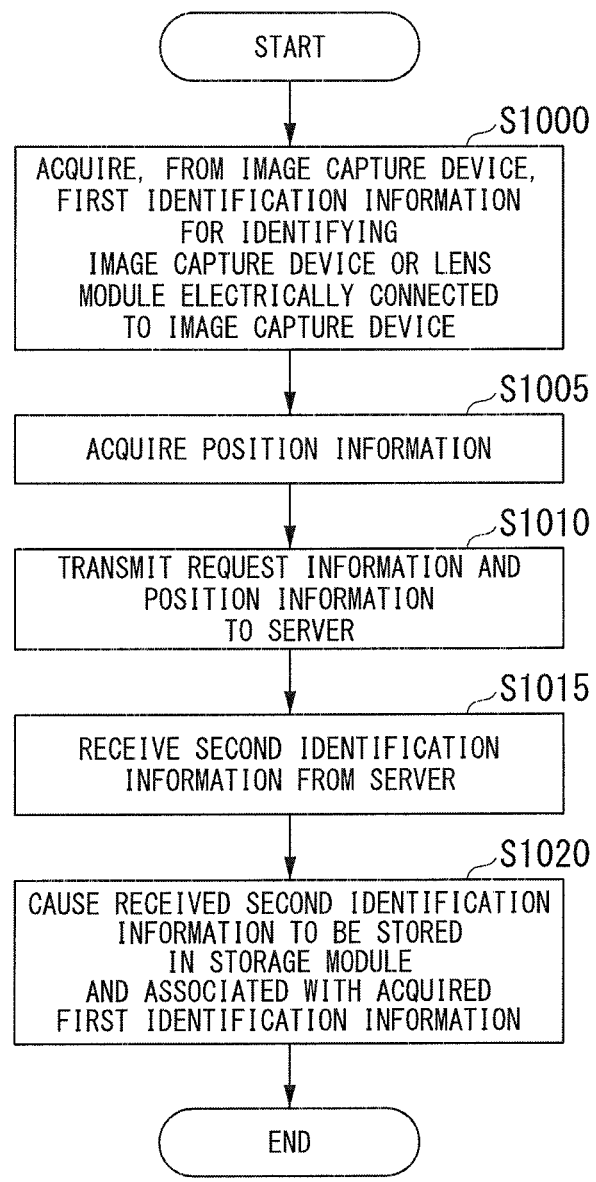
FIG. 29 is a flowchart showing an example of the flow of an operation of an image reception device according to the tenth embodiment of the present invention.

FIG. 29 shows an example of the flow of an operation of the image reception device 22. The operation of the image reception device 22 relating to acquisition of the second identification information will be described with reference to FIG. 29.

The information acquisition unit 201 acquires first identification information which is used for identifying the image capture device 10 or a lens module electrically connected to the image capture device 10 from the image capture device 10 (step S1000). Further, the information acquisition unit 201 acquires position information (step S1005).

Subsequently, the second communication module 202 transmits the request information and the position information to the server 50 (step S1010). For example, in step S1010, the request information to which the position information is added is transmitted.

Subsequently, the second communication module 202 receives the second identification information from the server 50 (step S1015).

Subsequently, the setting unit 206 causes the second identification information received in step S1015 to be stored in the storage module 200 and associated with the first identification information acquired in step S1000.

The first identification information may be acquired in step S1000 after the position information is acquired in step S1005. Moreover, in step S1010, the request information and the position information may be transmitted separately.

Figure 30:
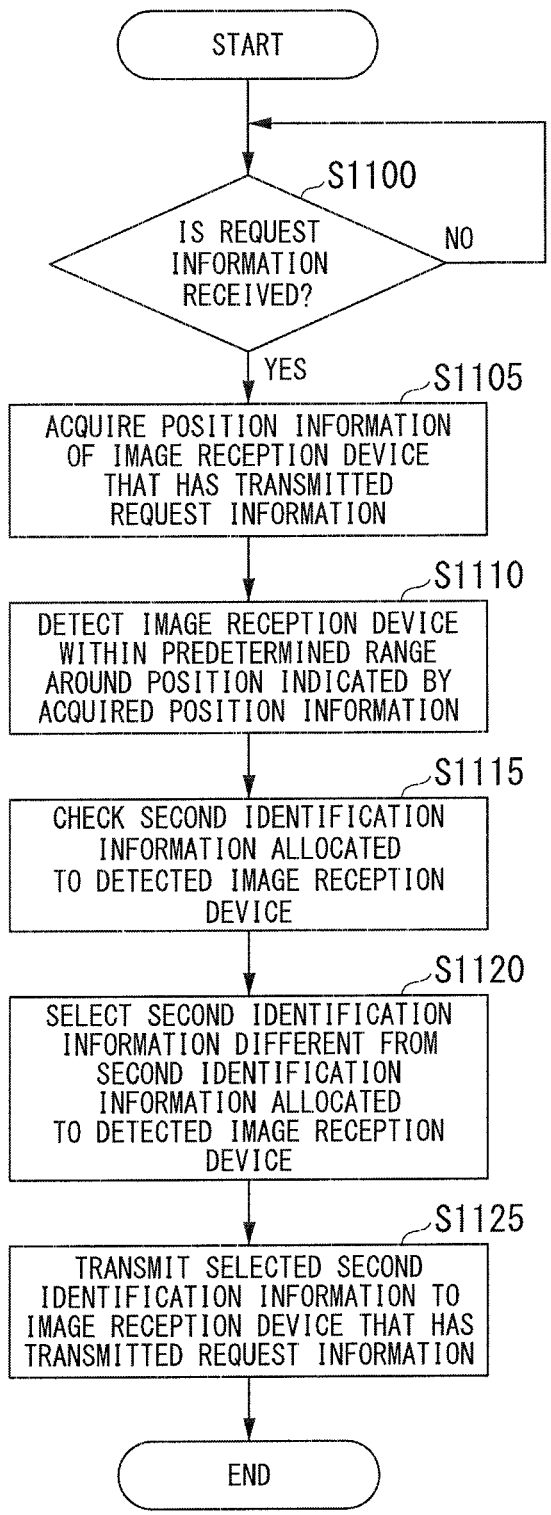
FIG. 30 is a flowchart showing an example of the flow of an operation of a server according to the tenth embodiment of the present invention.

FIG. 30 shows an example of the flow of an operation of the server 50. The operation of the server 50 relating to allocation of the second identification information will be described with reference to FIG. 30.

When the server 50 receives the request information from the image reception device 22 (step S1100), the server 50 acquires the position information of an image reception device that has transmitted the request information (step S1105). For example, when the position information is added to the request information, the position information is acquired from the request information in step S1105.

Subsequently, the server 50 detects the image reception device 22 within a predetermined range around the position indicated by the position information acquired in step S1105 (step S1110). For example, the server 50 includes a storage module that associates and stores the position information received from the image reception device 22 and the second identification information allocated to the image reception device 22. In step S1110, the server 50 calculates the distance between the position indicated by the position information acquired in step S1105 and the position indicated by the position information stored in the storage module. When the calculated distance is equal to or smaller than a predetermined distance (for example, 50 m), the server 50 determines that the image reception device 22 within the predetermined range is detected. In step S1110, it is preferable to detect all image reception devices 22 present within the predetermined range around the position of the image reception device 22 that has transmitted the request information.

Subsequently, the server 50 checks the second identification information allocated to the image reception device 22 detected in step S1110 (step S1115). For example, in step S1115, the server 50 checks the second identification information stored in the storage module and associated with position information indicating a position at which the distance to the position indicated by the position information acquired in step S1105 is determined to be equal to or smaller than the predetermined distance.

Subsequently, the server 50 selects second identification information different from the second identification information allocated to the image reception device detected in step S1110 (step S1120). For example, the storage module of the server 50 stores the second identification information allocated to the image reception device 22. In step S1120, the server 50 selects second identification information different from the second identification information checked in step S1115 among the items of second identification information stored in order to allocate to the image reception device 22.

Subsequently, the server 50 transmits the selected second identification information selected in step S1120 to the image reception device 22 that has transmitted the request information (step S1125).

In the above process, in order to reduce a processing load of the server 50 relating to checking of redundancy of second identification information, the position information is used for checking redundancy of the second identification information for the items of second identification information allocated to the image reception devices 22 within a predetermined range. In contrast, the position information may not be used. That is, the image reception device 22 may not perform the process of step S1005 and may not transmit the position information in step S1010. Moreover, the server 50 may not perform the processes of steps S1105 and S1110, and may select second identification information different from all items of allocated second identification information in step S1120.

Since the flow of an operation of the image reception device 22 relating to display of the second information corresponding to the second identification information is substantially the same as the flow shown in FIG. 3, the description of the flow of the operation of the image reception device 22 will not be provided.

In the present embodiment, users can easily understand the correspondence between the image capture device 10 or a lens module electrically connected to the image capture device 10 and the image reception device 22 visually. Moreover, it is possible to simplify the process in which the image reception device 22 sets the second identification information to the storage module 200. Moreover, it is possible to avoid the redundancy of the second identification information of the image reception devices 22 connected to the same server 50 by communication.

Moreover, since the position information is used, the target image reception device 22 of which the second identification information is checked for redundancy is limited to the image reception devices 22 in the predetermined range around the image reception device 22 that has transmitted the request information. Due to this, it is possible to reduce the processing load of the server 50.

Eleventh Embodiment

Figure 31A:
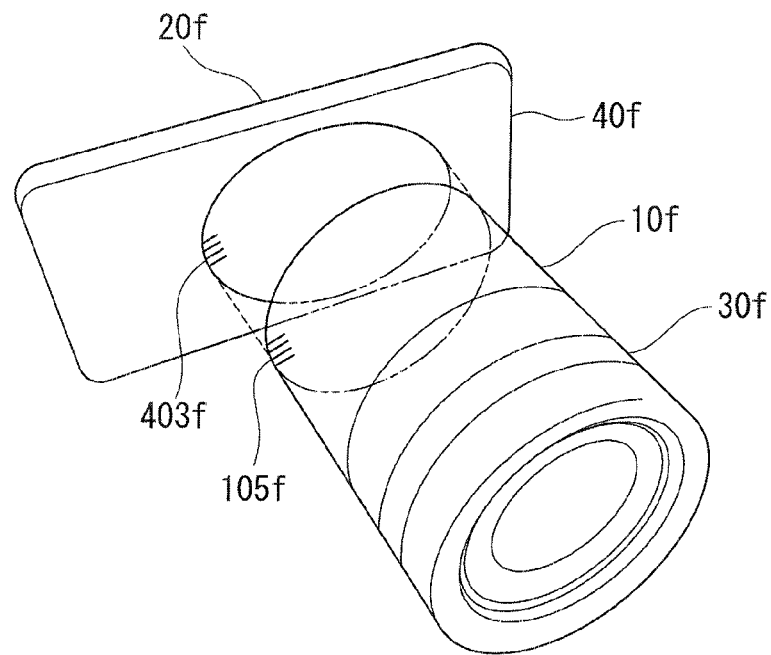
FIG. 31A is an external view showing a configuration example of an image capture system according to an eleventh embodiment of the present invention from the front.
Figure 31B:
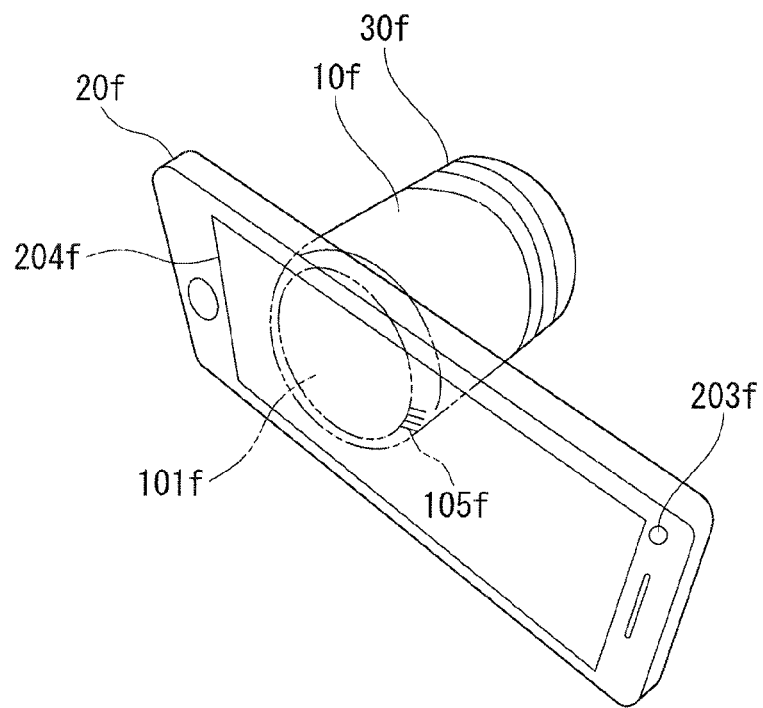
FIG. 31B is an external view showing a configuration example of the image capture system according to the eleventh embodiment of the present invention from behind.

Next, an eleventh embodiment of the present invention will be described. FIGS. 31A and 31B show a configuration example of an image capture system according to the present embodiment. The image capture system shown in FIGS. 31A and 31B includes an image capture device 10$f$, an image reception device 20$f$, and a cover 40$f$. FIG. 31A shows the image capture system when seen from in front of the image reception device 20$f$. FIG. 31B shows the image capture system when seen from behind the image reception device 20$f$.

A lens module 30$f$ is electrically connected to the image capture device 10$f$. An LED 101$f$ capable of emitting light of multiple colors is allocated on a surface of the image capture device 10$f$ opposite to a surface to which the lens module 30$f$ is connected. The LED 101$f$ corresponds to the first display interface 101 shown in FIG. 1. Moreover, a connection terminal 105$f$ is allocated on a surface of the image capture device 10$f$ facing the image reception device 20E In addition to the LED 101$f$ and the connection terminal 105$f$, the image capture device 10$f$ further includes the image capture module 100, the first communication module 102, and the display control unit 103 shown in FIG. 1.

The image reception device 20$f$ is a portable terminal such as a smartphone. A display 204$f$ is allocated on a surface of the image reception device 20$f$. The display 204$f$ displays an image based on the image data received from the image capture device 10$f$. An LED 203$f$ capable of emitting light of multiple colors is allocated in an end of the image reception device 20$f$. The LED 203$f$ corresponds to the second display interface 203 shown in FIG. 1. In addition to the display 204$f$ and the LED 203$f$, the image reception device 20$f$ further includes the storage module 200, the information acquisition unit 201, the second communication module 202, and the information output unit 204 shown in FIG. 1.

For example, the cover 40$f$ is an accessory cover of a smartphone, having the same function as the cover 40$b$. The cover 40$f$ can be fixed in contact with the image reception device 20$f$. A connection terminal 403$f$ is provided in a position of the cover 40$f$ corresponding to the connection terminal 105$f$ of the image capture device 10$f$. The connection terminal 105$f$ and the connection terminal 403$f$ come in physical contact to electrically connect the image capture device 10$f$ and the image reception device 20$f$.

In the present embodiment, when the LED 101$f$ of the image capture device 10$f$ and the LED 203$f$ of the image reception device 20$f$ display the same color, the correspondence between the image capture device 10$f$ or the lens module 30$f$ electrically connected to the image capture device 10$f$ and the image reception device 20$f$ can be identified.

In the present embodiment, the image capture device 10$f$ has a first surface (a surface opposite to the surface to which the lens module 30$f$ is electrically connected). The LED 101$f$ is allocated on the first surface of the image capture device 10$f$. When the connection terminal 105$f$ and the connection terminal 403$f$ are electrically connected, the first surface faces a second surface (a surface opposite to the surface on which the display 204$f$ is allocated) of the image reception device 20$f$, and the image capture device 10$f$ is fixed to the cover 40$f$ (that is, the image reception device 20$f$) in a state in which the LED 101$f$ overlaps the second surface.

In the present embodiment, the image capture device 10$f$ has the connection terminal 105$f$ that comes in contact with the connection terminal 403$f$ of the cover 40$f$ so as to be electrically connected to the image reception device 20$f$ which is an external device via the cover 40$f$. The connection terminal 105$f$ is allocated on a surface of the image capture device 10$f$ facing a direction opposite to an image capture direction of the image capture module 100.

The connection terminal 105$f$ may be configured to connect a short cable. In this case, the connection terminal 105$f$ of the image capture device 10$f$ and the connection terminal 403$f$ of the cover 40$f$ are electrically connected by the cable. As a result, the image capture device 10$f$ can be electrically connected to the image reception device 20$f$ via the cable and the connection terminal 403$f$ of the cover 40$f$.

When the image capture device 10$f$ and the image reception device 20$f$ are electrically connected by the connection terminal 105$f$ and the connection terminal 403$f$, the image capture device 10$f$ and the image reception device 20$f$ communicate via the connection terminal 105$f$ and the connection terminal 403$f$, for example. In this embodiment, the connection terminal 403$f$ of the cover 40$f$ is electrically connected to an earphone jack, a data synchronization terminal, or the like of the image reception device 20$f$. The image capture device 10$f$ and the image reception device 20$f$ may communicate via near-field communication rather than electrically connecting the image capture device 10$f$ and the image reception device 20$f$ by the connection terminal 105$f$ and the connection terminal 403$f$ to allow the image capture device 10$f$ and the image reception device 20$f$ to communicate.

When the image capture device 10$f$ and the image reception device 20$f$ are electrically connected by the connection terminal 105$f$ and the connection terminal 403$f$, the LED 101$f$ of the image capture device 10$f$ is covered by the cover 40$f$. When the image capture device 10$f$ and the image reception device 20$f$ are in contact, it is less necessary to check which image reception device 20$f$ is connected to the image capture device 10$f$ by communication. Thus, no problem occurs even when the LED 101$f$ of the image capture device 10$f$ is covered by the cover 40$f$ and is not visible to users. Moreover, in this case, the LED 101$f$ of the image capture device 10$f$ and the LED 203$f$ of the image reception device 20$f$ may not display information.

When the image capture device 10$f$ and the image reception device 20$f$ are electrically connected by the connection terminal 105$f$ and the connection terminal 403$f$, a thin transparent plate may be fixed to the surface of the image capture device 10$f$ on which the LED 101$f$ is allocated. This enables users to see the color of the LED 101$f$ from a side surface of the thin plate.

In the present embodiment, although the LED 101$f$ of the image capture device 10$f$ and the LED 203$f$ of the image reception device 20*f* display colors, the display content is not limited to this. For example, the first display interface of the image capture device 10*f* and the second display interface of the image reception device 20*f* may display images, characters, symbols, figures, patterns, and the like.

In the present embodiment, it has been described that the image reception device 20*f* includes the second display interface 203 (the LED 203*f*). However, similarly to the image capture system shown in FIG. 2, the image reception device 20*f* may not include the second display interface 203 but the second display interface 203 may be electrically connected to the image reception device 20*f*.

In the present embodiment, users can easily understand the correspondence between the image capture device 10*f* or the lens module 30*f* electrically connected to the image capture device 10*f* and the image reception device 20*f* visually. Moreover, the correspondence between the image capture device 10*f* and the image reception device 20*f* can be understood clearly only when the image capture device 10*f* and the image reception device 20*f* are separated. Since it is not necessary to display the correspondence between the image capture device 10*f* and the image reception device 20*f* when the image capture device 10*f* and the image reception device 20*f* are physically in contact with each other, it is possible to reduce the power consumption of the image capture device 10*f* and the image reception device 20*f*.

Modified Example

Figure 32A:
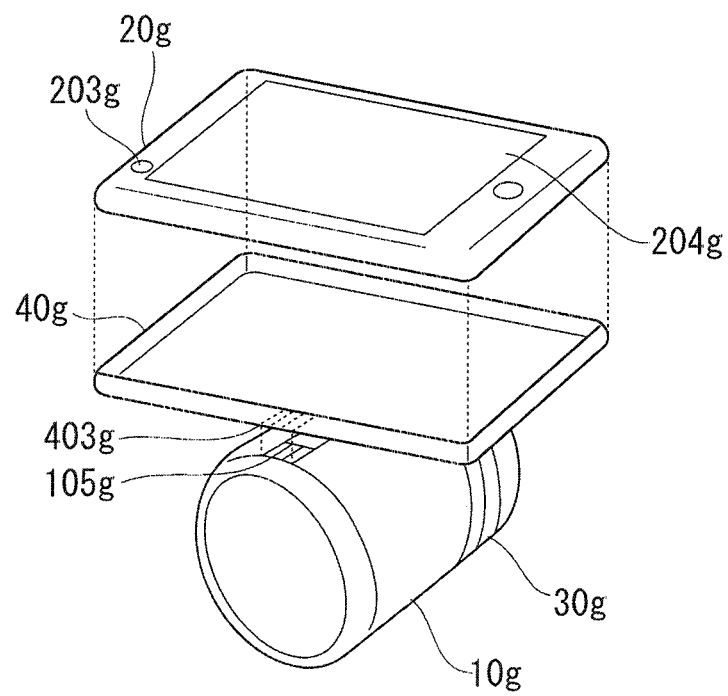
FIG. 32A is an external view showing a configuration example of an image capture system according to a modified example of the eleventh embodiment of the present invention.
Figure 32B:
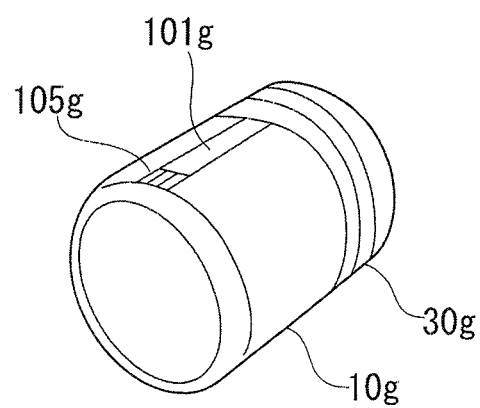
FIG. 32B is an external view showing a configuration example of the image capture system according to the modified example of the eleventh embodiment of the present invention.

Next, a modified example of the eleventh embodiment of the present invention will be described. FIG. 32A shows a configuration example of the image capture system according to the present modified example. The image capture system shown in FIG. 32A includes an image capture device 10*g*, an image reception device 20*g*, and a cover 40*g*. FIG. 32B shows a configuration of the image capture device 10*g* according to the present modified example.

A lens module 30*g* is electrically connected to the image capture device 10*g*. An LED 101*g* capable of emitting light of multiple colors is allocated on a side surface of the image capture device 10*g* facing the image reception device 20*g*. The LED 101*g* corresponds to the first display interface 101 shown in FIG. 1. Moreover, a connection terminal 105*g* is allocated on a side surface of the image capture device 10*g*. In addition to the LED 101*g* and the connection terminal 105*g*, the image capture device 10*g* further includes the image capture module 100, the first communication module 102, and the display control unit 103 shown in FIG. 1.

The image reception device 20*g* is a portable terminal such as a smartphone. A display 204*g* is allocated on a surface of the image reception device 20*g*. The display 204*g* displays an image based on the image data received from the image capture device 10*g*. An LED 203*g* capable of emitting light of multiple colors is allocated in an end of the image reception device 20*g*. The LED 203*g* corresponds to the second display interface 203 shown in FIG. 1. In addition to the display 204*g* and the LED 203*g*, the image reception device 20*g* further includes the storage module 200, the information acquisition unit 201, the second communication module 202, and the information output unit 204 shown in FIG. 1.

For example, the cover 40*g* is an accessory cover of a smartphone, having the same function as the cover 40*b*. The cover 40*g* can be fixed in contact with the image reception device 20*g*. A connection terminal 403*g* is provided in a position of the cover 40*g* corresponding to the connection terminal 105*g* of the image capture device 10*g*. The connection terminal 105*g* and the connection terminal 403*g* come in physical contact to electrically connect the image capture device 10*g* and the image reception device 20*g*. The content described with reference to FIGS. 31A and 31B can be similarly applied to FIGS. 32A and 32B.

In the present modified example, the image capture device 10*g* includes a first surface (side surface). The LED 101*g* is allocated on the first surface of the image capture device 10*g*. When the connection terminal 105*g* and the connection terminal 403*g* are electrically connected, the first surface faces a second surface (a surface opposite to the surface on which the display 204*g* is allocated) of the image reception device 20*g*, and the image capture device 10*g* is fixed to the cover 40*g* (that is, the image reception device 20*g*) in a state in which the LED 101*g* overlaps the second surface.

In the present modified example, the image capture device 10*g* has the connection terminal 105*g* that comes in contact with the connection terminal 403*g* of the cover 40*g* so as to be electrically connected to the image reception device 20*g* which is an external device via the cover 40*g*. The LED 101*g* is allocated on a surface of the image capture device 10*g* facing the same direction as a connection surface (a surface on which the connection terminal 105*g* is allocated) of the connection terminal 105*g*.

The connection terminal 105*g* may be configured to connect a short cable. In this case, the connection terminal 105*g* of the image capture device 10*g* and the connection terminal 403*g* of the cover 40*g* are electrically connected by the cable. As a result, the image capture device 10*g* can be electrically connected to the image reception device 20*g* via the cable and the connection terminal 403*g* of the cover 40*g*. In this case, the LED 101*g* is allocated on a surface of the image capture device 10*g* facing the same direction as a connection surface (a surface on which the connection terminal 105*g* configured to connect the cable is allocated) of the connection terminal 105*g* to which the cable is connected.

(Application to Use Cases)

The respective embodiments can be applied the following use cases.

(Use Case 0)

Wireless connection requires several seconds or longer. In a method in which a camera is activated whenever an image is captured and the camera is connected to a terminal by communication, a photo opportunity may be missed. Thus, users may want to maintain a camera in a constantly operating state such as in a standby mode to maintain wireless connection with a terminal. Further, it is desirable to activate a capturing application on a terminal when it is confirmed that the terminal and the camera are connected by communication before activating the application to allow the camera to recover from the standby mode. In this use case, by applying the respective embodiments appropriately, even when there are a plurality of cameras or terminals, it is possible to immediately understand which terminal is connected to which camera by communication.

(Use Case 1)

When a camera and a terminal each have only one communication interface, the communication connection between the camera and the terminal is limited to one-to-one connection only. When one terminal is switchably connected to a plurality of cameras having different lens modules attached thereto by communication, it is necessary to be able to confirm which camera is connected to the terminal.

Figure 33:
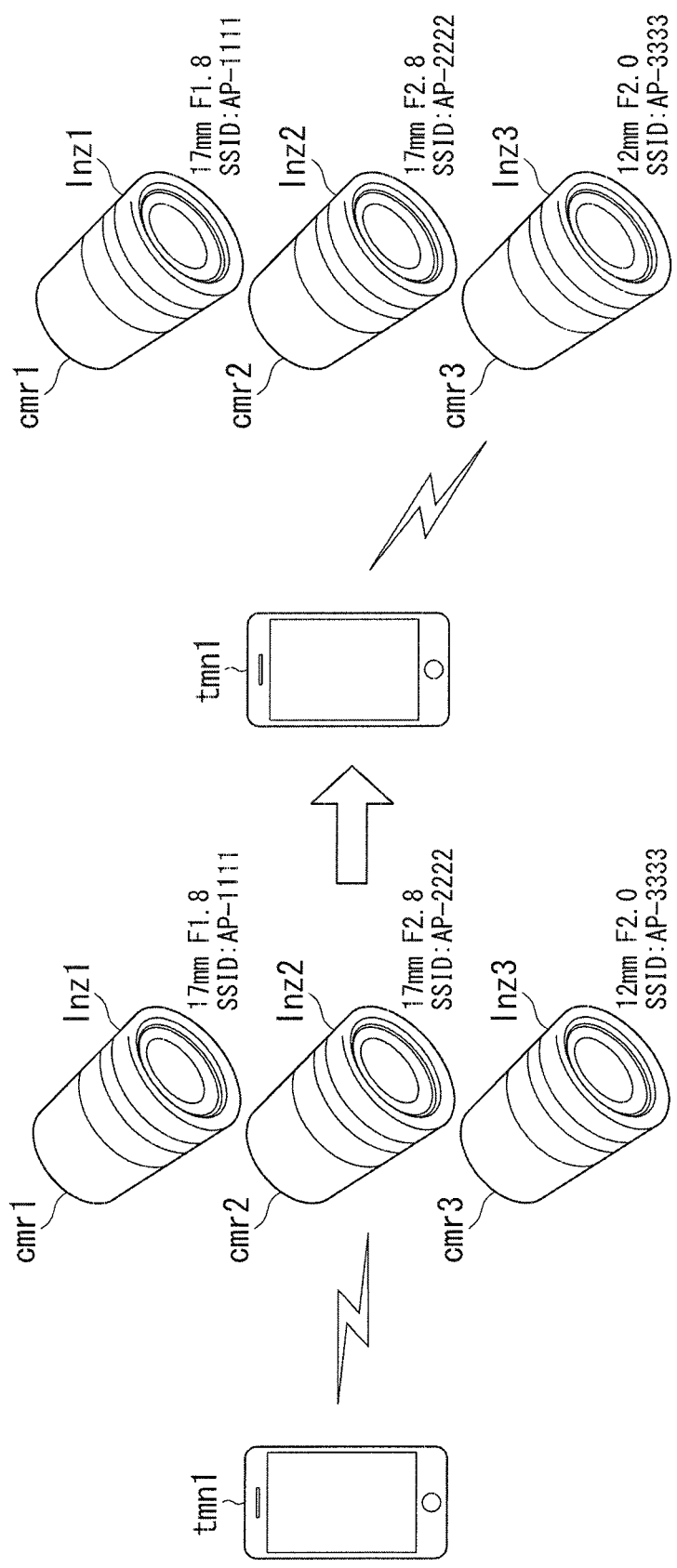
FIG. 33 is a reference diagram showing an example of a system in which one terminal is switchably connected to different camera among a plurality of cameras having different lenses to perform communication.

FIG. 33 shows an example of a system in which one terminal is switchably connected to a plurality of cameras having different lenses attached thereto by communication.

The system shown in FIG. 33 includes one terminal tmn1 and three cameras cmr1, cmr2, and cmr3. Different lens modules lnz1, lnz2, and lnz3 having different combinations of focal length and F-value are attached to the cameras cmr1, cmr2, and cmr3, respectively. FIG. 33 shows an example in which the terminal tmn1 is connected to the camera cmr2 by communication and is then connected to the camera cmr3 by communication by switching the communication connection.

In particular, when a plurality of lenses have the same or similar angles of view, it may be difficult to determine which camera is connected to the terminal by communication just by observing the live view image. When remote capturing is performed in a state in which a camera is not physically in contact with a terminal, users may want to check whether the camera and the terminal are actually connected by communication periodically or constantly. Naturally, even if the camera and the terminal are physically in contact with each other, there is also a possibility that the camera and the terminal are not connected by communication. As a method of checking the state of communication connection between a camera and a terminal, a user may check an image displayed by the terminal with his or her hand in front of a lens. However, this method is inconvenient for checking the connection state periodically, and depending on cases, the camera may be fixed to a place where the user's hand cannot reach.

In this use case, by applying the respective embodiments appropriately, users can easily check the correspondence between the camera and the terminal.

(Use Case 2)

Figure 34:
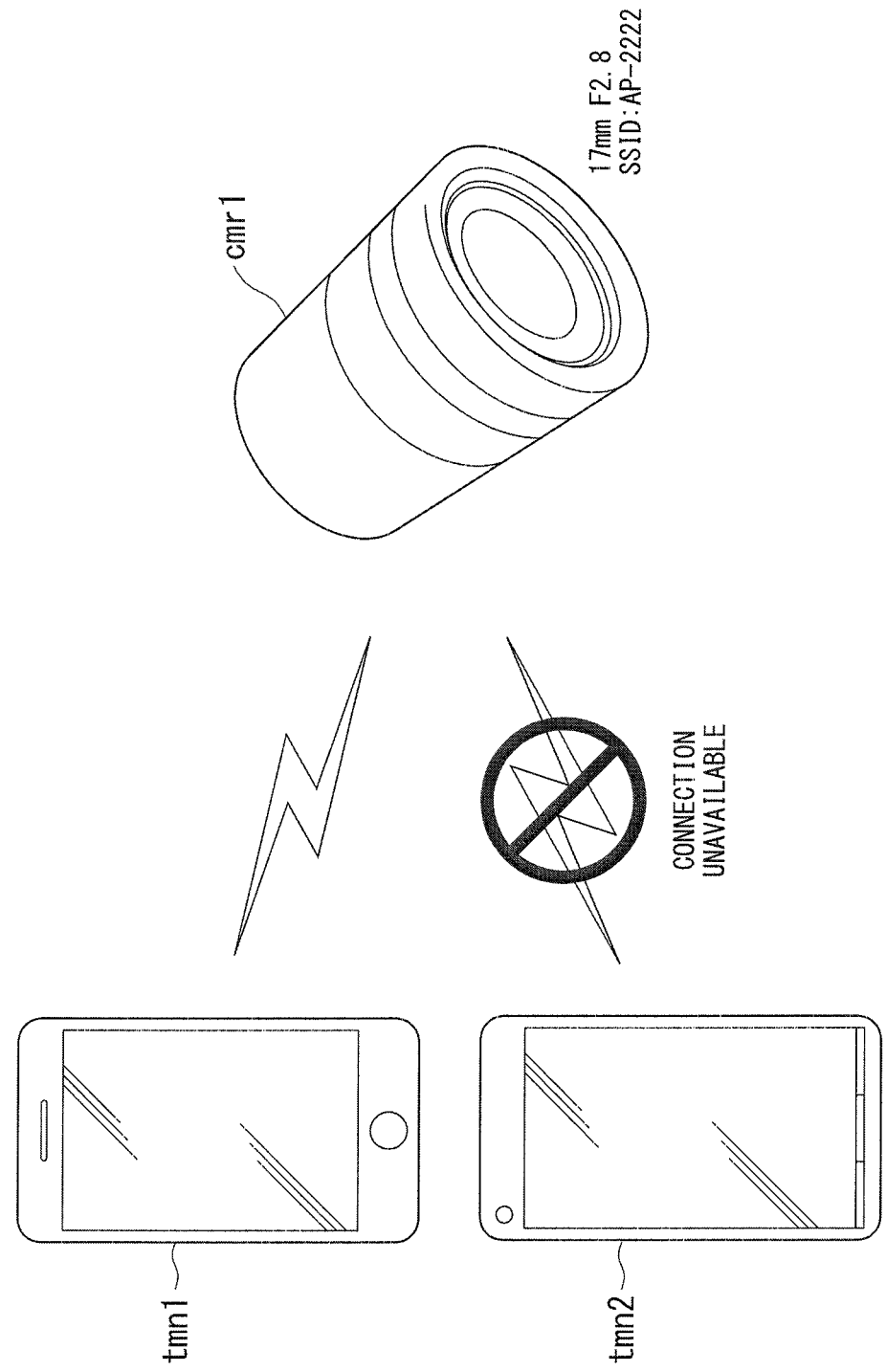
FIG. 34 is a reference diagram showing an example of a system in which a plurality of terminals share a camera.

When a camera and a terminal are connected by communication in one-to-one correspondence, it is not possible to connect another mobile device to the camera by communication when one terminal is connected to the camera by communication. FIG. 34 shows an example of a system in which a plurality of terminals share a camera. The system shown in FIG. 34 includes two terminals tmn1 and tmn2 and one camera cmr1. The camera cmr1 cannot be connected to a plurality of terminals by communication simultaneously. In FIG. 34, since the terminal tmn1 is connected to the camera cmr1 by communication, the terminal tmn2 cannot be connected to the camera cmr1 by communication.

In a system in which a plurality of terminals share a camera, when a certain mobile device is connected to the camera by communication, it is necessary to disconnect the communication connection with a mobile device in which communication connection has already been established in order for another mobile device to be connected to the camera by communication. Due to this, it is necessary to understand which terminal is connected to the camera by communication.

In order for users to understand the correspondence between a camera and a terminal, it is necessary to know a camera ID (SSID) as a wireless access point and to check wireless connection configuration of the terminal. For example, users have to check a configuration screen of the terminal to see whether the terminal is connected to a camera having a desired access point name by communication. Thus, it is not easy to understand the correspondence.

When a user has a plurality of terminals and the plurality of terminals share one camera, the user may be able to check the access points to which the terminals are connected by communication from configuration screens of the respective terminals. However, this method is not convenient as described above. Further, when family members possessing respective terminals share a camera, one of the family members may check the communication connection on a configuration screen of the terminal of the other family member and disconnect the communication connection. Due to this, privacy problems may occur even among families.

In this use case, by applying the respective embodiments appropriately, users can easily check the correspondence between the camera and the terminal. Moreover, the occurrence of privacy problems which may occur when a certain person operates the terminal of another person can be minimized.

(Use Case 3)

When a camera has a plurality of (N) communication modules, communication connection of N terminals to one camera is allowed. In this case, users may want to check which camera is connected to the terminal by communication. In this use case, by applying the respective embodiments appropriately, it is possible to clearly understand which terminal is connected by communication to the camera shared by a plurality of terminals and to confirm that the plurality of terminals share the same image.

(Use Case 4)

When a plurality of (N) cameras can be connected to each other, communication connection of N cameras to one terminal is allowed. The terminal is connected to one camera by communication and is also connected to another camera by communication via the camera. In this case, it is necessary to identify the images of the plurality of cameras on the terminal. In this use case, when the terminal displays the images received from the plurality of cameras switchably, users may want to understand from which camera the image being displayed on the terminal is received periodically including the time of switching the communication connection or constantly. In this use case, by applying the respective embodiments appropriately, users can understand from which camera the image being displayed on the terminal is received.

Moreover, when a terminal has a plurality of (N) communication interfaces, communication connection of N cameras to one terminal is allowed. In this case, by applying the respective embodiments appropriately, users can understand from which camera the image being displayed on the terminal is received.

(Case Including Cable Connection)

Figure 35:
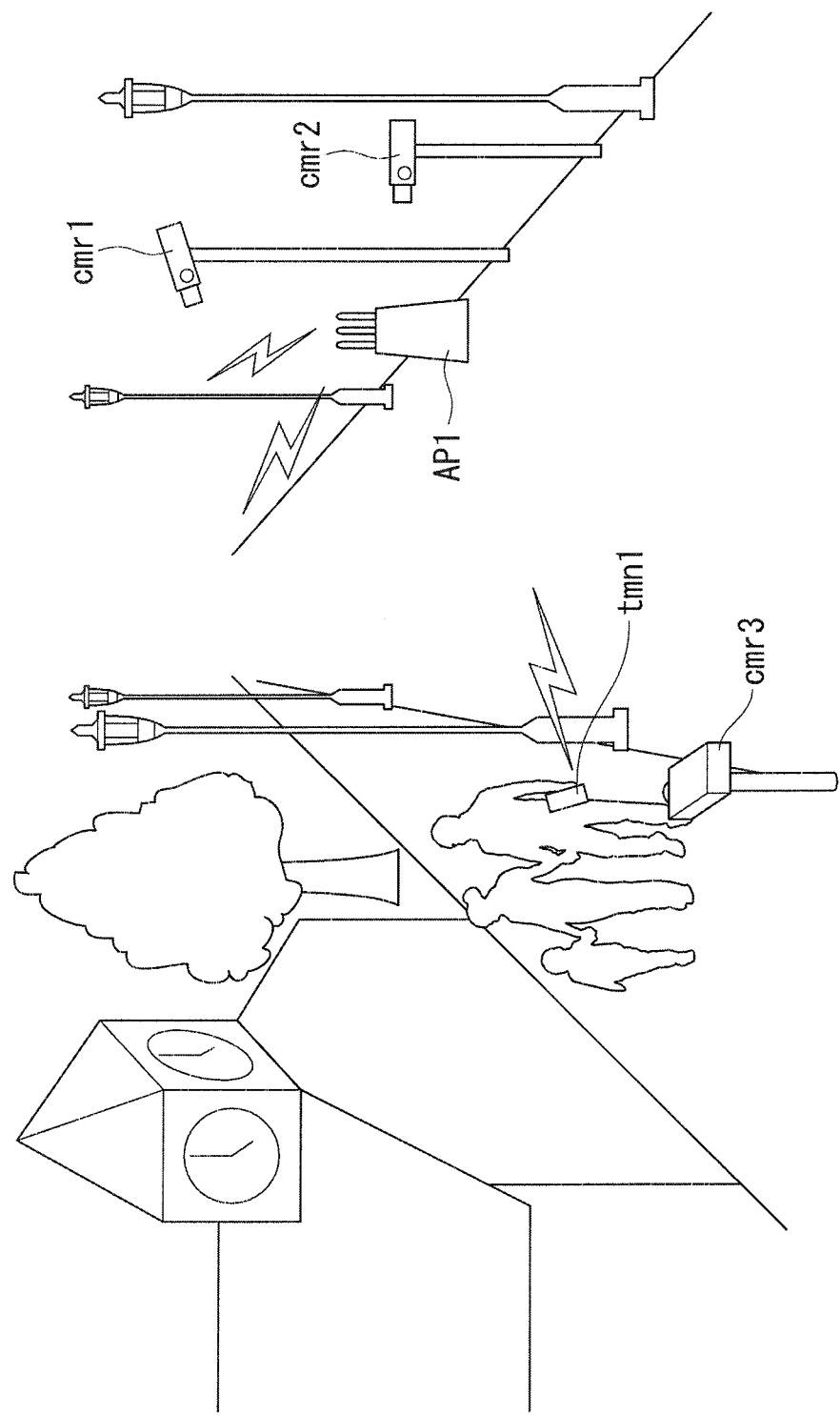
FIG. 35 is a reference diagram showing an example of a system including cameras that communicate via cables.

As an example of this use case, a case in which the camera itself does not have a wireless module may be considered. FIG. 35 shows an example of a system having a camera that performs cable communication. Three stationary cameras cmr1, cmr2, and cmr3 are provided in a photo spot of a tourist site, for example. The respective cameras cmr1, cmr2, and cmr3 are connected to a wireless access point AP1 via cables. A terminal tmn1 of a user connects to the cameras cmr1, cmr2, and cmr3 by communication via the wireless access point AP1. In this use case, by applying the respective embodiments appropriately, users can understand which camera is connected to the terminal by communication. In particular, this effect is remarkable when a plurality of cameras are present in one photo spot.

While preferred embodiments of the invention have been described and shown above, it should be understood that these are exemplary of the invention and are not to be considered as being limited. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image reception device comprising:
a storage module that associates and stores first identification information which is used for identifying an image capture device including an image capture module, a first display interface, and a first communication module, or a lens module electrically connected to the image capture device and second identification information which is used for visually identifying establishment of communication connection between the image capture device and the image reception device;
an information acquisition unit that acquires the first identification information from the image capture device;
a second communication module that transmits, to the image capture device, first control information which instructs the first display interface to display first information corresponding to the second identification information stored in the storage module and associated with the first identification information acquired by the information acquisition unit after the communication connection with the image capture device is established and receives image data from the image capture device; and
an information output unit that outputs second control information which instructs a second display interface to display second information corresponding to the second identification information stored in the storage module and associated with the first identification information acquired by the information acquisition unit to the second display interface after the communication connection with the image capture device is established when the image reception device includes the second display interface or the second display interface is electrically connected to the image reception device.

2. The image reception device according to claim 1,
wherein the image reception device includes the second display interface that displays the second information and an image based on the image data, or
the image reception device includes a third display interface that displays an image based on the image data, and the second display interface is electrically connected to the image reception device, or
the image reception device includes the second display interface and a third display interface that displays an image based on the image data.

3. The image reception device according to claim 1,
wherein the second communication module transmits the first control information to the image capture device after the communication connection with the image capture device is established and before the communication connection with the image capture device expires, and
the information output unit outputs the second control information to the second display interface after the communication connection with the image capture device is established and before the communication connection with the image capture device expires.

4. The image reception device according to claim 1,
wherein the storage module associates and stores the first identification information which is used for identifying a combination of the image capture device and the lens module electrically connected to the image capture device, and the second identification information.

5. The image reception device according to claim 1,
wherein the image capture device includes a plurality of operation modes,
the storage module stores the second identification information for each operation mode of the image capture device,
the second communication module transmits, to the image capture device, the first control information which instructs the first display interface to display the first information according to the operation mode of the image capture device, and
the information output unit outputs, to the second display interface, the second control information which instructs the second display interface to display the second information according to the operation mode of the image capture device.

6. The image reception device according to claim 1, further comprising:
a setting unit which instructs the storage module to store the first identification information acquired by the information acquisition unit and another second identification information associated with the first identification information and different from the second identification information stored in the storage module and associated with the first identification information.

7. The image reception device according to claim 6,
wherein the information output unit further outputs, to the second display interface, configuration screen information which instructs the second display interface to display a configuration screen including a plurality of items of second identification information different from the second identification information stored in the storage module and associated with the first identification information, and
after the second display interface displays the configuration screen, the setting unit selects the second identification information based on a select instruction to select any one of the plurality of items of second identification information displayed on the configuration screen and causes the selected second identification information to be stored in the storage module and associated with the first identification information acquired by the information acquisition unit.

8. The image reception device according to claim 1, further comprising:
a setting unit which instructs the storage module to store the first identification information and the second identification information,
wherein the second communication module further transmits request information indicating a request for the second identification information to a server that stores the second identification information and receives the second identification information from the server which received the request information, and
the setting unit causes the second identification information received by the second communication module to be stored in the storage module and associated with the first identification information acquired by the information acquisition unit.

9. The image reception device according to claim 8,
wherein the information acquisition unit further acquires position information, and
the second communication module transmits the request information and the position information to the server and receives the second identification information corresponding to the position information from the server which received the request information.

10. The image reception device according to claim 1,
wherein the second identification information includes color information,
the second communication module transmits the first control information which instructs the first display interface to display a first color corresponding to the color information included in the second identification information to the image capture device, and
the information output unit outputs the second control information which instructs the second display interface to display a second color corresponding to the color information included in the second identification information to the second display interface.

11. The image reception device according to claim 1,
wherein the second identification information includes image information,
the second communication module transmits the first control information which instructs the first display interface to display a first image corresponding to the image information included in the second identification information to the image capture device, and
the information output unit outputs the second control information which instructs the second display interface to display a second image corresponding to the image information included in the second identification information to the second display interface.

12. The image reception device according to claim 1,
wherein the second identification information includes pattern information which is used for identifying a pattern indicated by a combination of a display period in which predetermined information is displayed and a non-display period in which the predetermined information is not displayed,
the second communication module transmits the first control information which instructs the first display interface to display a first pattern corresponding to the pattern information included in the second identification information to the image capture device after the communication connection with the image capture device is established, and
the information output unit outputs the second control information which instructs the second display interface to display a second pattern corresponding to the pattern information included in the second identification information to the second display interface after the communication connection with the image capture device is established.

13. The image reception device according to claim 12, wherein the information output unit outputs, to the second display interface, the second control information which instructs the second display interface to display the second pattern so that a first display period of the first pattern displayed by the first display interface and a second display period of the second pattern corresponding to the second identification information occur simultaneously or sequentially after the communication connection with the image capture device is established.

14. The image reception device according to claim 12, wherein the second identification information includes first time information indicating the display period and second time information indicating the non-display period.

15. The image reception device according to claim 1, wherein the second communication module is capable of establishing communication connection with only one image capture device that transmits the first control information to the image capture device capable of establishing communication connection with only one image reception device and receives image data from the image capture device.

16. An image capture device comprising:
an image capture module that captures an image to generate image data;
a first display interface;
a first communication module that receives, from an image reception device, first control information which instructs the first display interface to display first information corresponding to second identification information for visually identifying establishment of communication connection between the image capture device and the image reception device, after a communication connection with the image reception device is established, and transmits image data to the image reception device,
wherein the image reception device includes a second communication module and a second display interface, or the image reception device is electrically connected to the second display interface; and
a display control unit which instructs the first display interface to display the first information based on the first control information after the communication connection with the image reception device is established.

17. The image capture device according to claim 16, wherein the first communication module further receives, from another image capture device, first identification information which is used for identifying the image capture device or a lens module electrically connected to the other image capture device, and transmits the received first identification information to the image reception device.

18. The image capture device according to claim 16, further comprising:
an information allocating unit that allocates different items of second identification information to a plurality of image reception devices,
wherein the first communication module further transmits the second identification information allocated by the information allocating unit to the plurality of image reception devices.

19. The image capture device according to claim 16, further comprising a connection terminal configured to electrically connect to an external device.

20. The image capture device according to claim 19, wherein the connection terminal is allocated on a surface of the image capture device facing a direction opposite to an image capture direction of the image capture module.

21. The image capture device according to claim 19, wherein the first display interface is allocated on a surface of the image capture device facing the same direction as a connection surface of the connection terminal.

22. An image capture system comprising:
an image capture device and an image reception device, wherein the image capture device includes:
an image capture module that captures an image to generate image data;
a first display interface;
a first communication module that receives, from the image reception device, first control information which instructs the first display interface to display first information corresponding to second identification information for visually identifying establishment of a communication connection between the image capture device and the image reception device, after the communication connection with the image reception device is established, and transmits the image data to the image reception device; and a display control unit which instructs the first display interface to display the first information based on the first control information after the communication connection with the image reception device is established, and the image reception device includes:

a storage module that associates and stores first identification information which is used for identifying the image capture device or a lens module electrically connected to the image capture device, and the second identification information;

an information acquisition unit that acquires the first identification information from the image capture device;

a second communication module that transmits, to the image capture device, the first control information which instructs the first display interface to display the first information corresponding to the second identification information stored in the storage module and associated with the first identification information acquired by the information acquisition unit after the communication connection with the image capture device is established and receives the image data from the image capture device; and an information output unit that outputs second control information which instructs a second display interface to display second information corresponding to the second identification information stored in the storage module and associated with the first identification information acquired by the information acquisition unit to the second display interface after the communication connection with the image capture device is established when the image reception device includes the second display interface or the second display interface is electrically connected to the image reception device.

23. An image reception method comprising:

a step in which an information acquisition unit acquires first identification information from an image capture device, wherein the first identification is used for identifying the image capture device having an image capture module, a first display interface, and a first communication module, or a lens module electrically connected to the image capture device;

a step in which a second communication module transmits first control information which instructs the first display interface to display first information corresponding to second identification information for visually identifying establishment of communication connection between the image capture device and the image reception device, stored in the storage module and associated with the first identification information acquired by the information acquisition unit to the image capture device after the communication connection with the image capture device is established;

a step in which an information output unit outputs second control information which instructs a second display interface to display second information corresponding to the second identification information stored in the storage module and associated with the first identification information acquired by the information acquisition unit to the second display interface after communication connection with the image capture device is established when the image reception device includes the second display interface or the second display interface is electrically connected to the image reception device; and a step in which the second communication module receives image data from the image capture device.

24. A non-transitory computer-readable medium storing a program having processor-executable instructions which, when executed by at least one processor, cause the at least one processor to execute steps of:

acquiring first identification information from an image capture device which is used for identifying the image capture device having an image capture module, a first display interface, and a first communication module, or a lens module electrically connected to the image capture device;

transmitting first control information by a second communication module after the communication connection with the image capture device is established, wherein the first control information is used for instructing the first display interface to display first information corresponding to second identification information for visually identifying establishment of the communication connection between the image capture device and the image reception device, stored in the storage module and associated with the acquired first identification information to the image capture device;

outputting second control information which instructs a second display interface to display second information corresponding to the second identification information stored in the storage module and associated with the acquired first identification information to the second display interface after communication connection with the image capture device is established when the image reception device includes the second display interface or the second display interface is electrically connected to the image reception device; and receiving image data from the image capture device by the second communication module.

* * * * *